(12) United States Patent
Kato et al.

(10) Patent No.: US 9,235,036 B2
(45) Date of Patent: Jan. 12, 2016

(54) ZOOM LENS AND IMAGING APPARATUS

(71) Applicant: SONY CORPORATION, Tokyo (JP)

(72) Inventors: Takuya Kato, Tokyo (JP); Atsushi Oohata, Tokyo (JP); Hiroki Hagiwara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/282,759

(22) Filed: May 20, 2014

(65) Prior Publication Data
US 2014/0354857 A1    Dec. 4, 2014

(30) Foreign Application Priority Data

May 31, 2013 (JP) .................................. 2013-115347

(51) Int. Cl.
*G02B 15/14* (2006.01)
*G02B 15/173* (2006.01)

(52) U.S. Cl.
CPC .................................. *G02B 15/173* (2013.01)

(58) Field of Classification Search
CPC .... G02B 15/14; G02B 15/173; G02B 13/009; G02B 9/60; G02B 13/001; G02B 13/002; G03B 3/00; G03B 3/10
USPC .......................................... 359/676.684, 695
See application file for complete search history.

(56) References Cited

U.S. PATENT DOCUMENTS

2011/0273780 A1* 11/2011 Hosoi et al. .................. 359/690

FOREIGN PATENT DOCUMENTS

| JP | 2009-282429 A | 12/2009 |
| JP | 2010-014866 A | 1/2010 |

* cited by examiner

*Primary Examiner* — Alicia M Harrington
(74) *Attorney, Agent, or Firm* — Sony Corporation

(57) ABSTRACT

A zoom lens includes a first lens group having positive refractive power, a second lens group having negative refractive power, a third lens group having positive refractive power, a fourth lens group which has negative refractive power and is configured with only a single lens, and a fifth lens group having positive refractive power, which are arranged in order from an object side to an image side. During zooming, at least the first lens group, the second lens group, the third lens group, and the fourth lens group are movable in an optical axis direction. Focusing from infinity to a close range is performed by the fourth lens group being moved in the optical axis direction. At least one of following conditional expressions (1) and (2) is satisfied.

$$-11.0 < \text{Fno}\_w \times Y / \{(1-\beta 4\_w^2) \times \beta 5\_w^2\} < -7.0 \text{ and} \quad (1)$$

$$-11.0 < \text{Fno}\_t \times Y / \{(1-\beta 4\_t^2) \times \beta 5\_t^2\} < -7.0 \quad (2)$$

12 Claims, 33 Drawing Sheets

ZOOM LENS AND IMAGING APPARATUS

CROSS REFERENCE TO RELATED APPLICATIONS

This application claims the benefit of Japanese Priority Patent Application JP 2013-115347 filed May 31, 2013, the entire contents of which are incorporated herein by reference.

BACKGROUND

The present technology relates to a technical field of a zoom lens and an imaging apparatus of a five-group configuration having positive, negative, positive, negative and positive refractive powers in order from an object side to an image side.

In recent years, with the spread of imaging apparatuses such as digital cameras, there has been a demand for a bright open f-number, fast auto-focusing speed, high short-range performance and the like, as well as high image quality, compactness, and a high zoom ratio, and thus a demand for the imaging apparatus is diversified.

In general, there is an optical system of a positive lead as an optical system of a zoom lens satisfying a high zoom ratio. Since a variation in the open f-number from a wide-angle end to a telephoto end can be relatively smaller in the optical system of a positive lead as compared with an optical system of a negative lead and a high zoom ratio can be achieved, it is possible to secure the bright open f-number in an entire zoom range.

As the optical system of a positive lead of the five-group configuration having positive, negative, positive, negative and positive refractive power, for example, there are configurations disclosed in Japanese Unexamined Patent Application Publication No. 2010-14866 and Japanese Unexamined Patent Application Publication No. 2009-282429.

In the configurations disclosed in Japanese Unexamined Patent Application Publication No. 2010-14866 and Japanese Unexamined Patent Application Publication No. 2009-282429, since the size of a first lens group is reduced by an action of negative refractive power of a fourth lens group and zooming is performed by a relatively large number of groups termed the five-group configuration, there is an advantage of easily securing high optical performance in an entire zoom area even when an aperture ratio is enlarged.

SUMMARY

Meanwhile, as a configuration advantageous for a high-speed auto-focusing for which demand is increasing in recent years, it is necessary to reduce the weight of a focusing lens in order to secure a moving speed without enlarging the size of a drive system and to shorten a focus stroke in order to reduce a movement amount.

However, the optical system of a positive lead of the five-group configuration having positive, negative, positive, negative and positive refractive power while securing a good short-distance performance is not proposed.

For example, although a configuration having a high zoom ratio and a large aperture ratio is realized in the zoom lens described in Japanese Unexamined Patent Application Publication No. 2010-14866, a focusing is performed by a fifth lens group configured with a plurality of lenses. Accordingly, the weight of the focus lens is large, and thus the drive system becomes enlarged or it is difficult to perform high-speed focusing.

Meanwhile, in the five-group configuration having positive, negative, positive, negative and positive refractive power, since the effective beam diameter of the fifth lens group is enlarged by an action of the fourth lens group having negative refractive power, the weight of the focus lens group can be reduced by using the fourth lens group having a small effective beam diameter as a focus lens group.

However, in the zoom lens described in Japanese Unexamined Patent Application Publication No. 2009-282429, the fourth lens group is used as the focus lens group but a large aperture ratio is not achieved. In addition, there is a problem in that an action of shifting a focus position depending on the movement of the fourth lens group during focusing is not sufficient for the depth of focus and a focus stroke has to be shortened. Further, there is also a problem of the fluctuations in aberrations being large during focusing.

Therefore, in the zoom lens and the imaging apparatus according to the present technology, it is desirable to miniaturize a focus lens group, to shorten a focus stroke, and to reduce performance degradation in a close range, while securing miniaturization, a high zoom ratio and a large aperture ratio by overcoming the problems described above.

First, according to an embodiment of the present technology, there is provided a zoom lens including: a first lens group having positive refractive power; a second lens group having negative refractive power; a third lens group having positive refractive power; a fourth lens group which has negative refractive power and is configured with only a single lens; and a fifth lens group having positive refractive power, which are arranged in order from an object side to an image side, wherein during zooming, at least the first lens group, the second lens group, the third lens group, and the fourth lens group are movable in an optical axis direction, wherein focusing from infinity to a close range is performed by the fourth lens group being moved in the optical axis direction, and wherein at least one of following conditional expressions (1) and (2) is satisfied.

$$-11.0 < \text{Fno\_}w \times Y / \{(1 - \beta 4\_w^2) \times \beta 5\_w^2\} < -7.0 \text{ and} \quad (1)$$

$$-11.0 < \text{Fno\_}t \times Y / \{(1 - \beta 4\_t^2) \times \beta 5\_t^2\} < -7.0 \quad (2)$$

where,

Fno_w: an open f-number at a wide-angle end,

Fno_t: an open f-number at a telephoto end,

Y: a paraxial image height at the wide-angle end represented by fw×tan ω, when fw and ω respectively represent a focal length and a half angle of view of an entire system at the wide-angle end, β4_w: a lateral magnification of the fourth lens group at the wide-angle end, β4_t: a lateral magnification of the fourth lens group at the telephoto end, β5_w: a lateral magnification of the fifth lens group at the wide-angle end, and β5_t: a lateral magnification of the fifth lens group at the telephoto end.

Thus, while the weight of the focus lens group is reduced and a stop position accuracy during the focusing in the entire zooming range is secured, the focus stroke is reduced.

Second, it is desirable that in the zoom lens, during zooming from the wide-angle end to the telephoto end, the first lens group be moved so as to widen a distance to the second lens group and the third lens group be moved so as to narrow a distance to the second lens group, and the first lens group and the third lens group be respectively positioned on the object side at the telephoto end rather than at the wide-angle end.

Thus, the third lens group has a large zooming function.

Third, it is desirable that in the zoom lens, an aspherical shape of at least one surface be formed in each of the second lens group, the third lens group and the fourth lens group.

Thus, the number of necessary lenses is reduced and an aberration correction is performed appropriately for each lens group.

Fourth, it is desirable that the zoom lens satisfy a following conditional expression (3).

$$-1.3 < f4/f5 < -0.9 \tag{3}$$

Where, f4: a focal length of the fourth lens group, and f5: a focal length of the fifth lens group Thus, aberration caused by the fourth lens group is reduced and an incident angle of a light beam on an imaging plane is reduced.

Fifth, it is desirable that the zoom lens satisfy a following conditional expression (4).

$$0.01 < t4/(f\_w \times f\_t)^{1/2} < 0.045 \tag{4}$$

Where, t4: a center thickness of the fourth lens group, f_w: a focal length of an entire system at the wide-angle end, and f_t: a focal length of an entire system at the telephoto end Thus, the weight of the focus lens group is reduced.

Sixth, it is desirable that in the zoom lens, the third lens group be configured with a single lens having positive refractive power, a cemented lens which is configured with a positive lens and a negative lens and has negative refractive power, and a single lens having positive refractive power, which are arranged in order from an object side to an image side.

Thus, the positive refractive power is shared by three positive lenses and a color aberration is corrected by the negative lens.

Seventh, it is desirable that the zoom lens satisfy a following conditional expression (5).

$$(Fno\_w + Fno\_t)/2 < 3.0 \tag{5}$$

Thus, a large diameter in the entire zooming range is possible.

Eighth, it is desirable that in the zoom lens, the zoom lens have a vibration reduction function by the single lens positioned closest to the image side of the third lens group being displaced in a direction perpendicular to the optical axis, and at least one surface of the single lens positioned closest to the image side be formed as an aspherical surface.

Thus, the weight of the vibration reduction lens group is reduced, and the eccentric amount of the vibration reduction lens group for necessary vibration correction angle is reduced.

Ninth, it is desirable that in the zoom lens, the fifth lens group be fixed in an optical axis direction and configured with two lenses of at least a positive lens and a negative lens.

Thus, it is possible to simplify and to miniaturize the lens-barrel configuration.

Tenth, it is desirable that in the zoom lens, the fifth lens group be movable in an optical axis direction.

Thus, an image plane curvature that varies during zooming is effectively corrected.

Eleventh, in the zoom lens, it is desirable that the fourth lens group be moved in the optical axis direction by a driving force of a piezo element.

Thus, the accuracy of the moving position in the optical axis direction of the fourth lens group increases.

According to another embodiment of the present technology, there is provided an imaging apparatus including: a zoom lens; and an imaging device that converts an optical image formed by the zoom lens into an electrical signal, wherein the zoom lens includes: a first lens group having positive refractive power; a second lens group having negative refractive power; a third lens group having positive refractive power; a fourth lens group which has negative refractive power and is configured with only a single lens; and a fifth lens group having positive refractive power, which are arranged in order from an object side to an image side, wherein during zooming, at least the first lens group, the second lens group, the third lens group, and the fourth lens group are movable in an optical axis direction, wherein focusing from infinity to a close range is performed by the fourth lens group being moved in the optical axis direction, and wherein at least one of following conditional expressions (1) and (2) is satisfied.

$$-11.0 < Fno\_w \times Y/\{(1-\beta4\_w^2) \times \beta5\_w^2\} < -7.0 \text{ and} \tag{1}$$

$$-11.0 < Fno\_t \times Y/\{(1-\beta4\_t^2) \times \beta5\_t^2\} < -7.0 \tag{2}$$

Where,

Fno_w: an open f-number at a wide-angle end,

Fno_t: an open f-number at a telephoto end,

Y: a paraxial image height at the wide-angle end represented by fw×tan ω, when fw and ω respectively represent a focal length and a half angle of view of an entire system at the wide-angle end, $\beta4\_w$: a lateral magnification of the fourth lens group at the wide-angle end, $\beta4\_t$: a lateral magnification of the fourth lens group at the telephoto end, $\beta5\_w$: a lateral magnification of the fifth lens group at the wide-angle end, and $\beta5\_t$: a lateral magnification of the fifth lens group at the telephoto end.

Thus, while the weight of the focus lens group is reduced and a stop position accuracy during the focusing in the entire zooming range is secured, focus stroke is reduced.

According to the zoom lens according to the present technology, it is possible to miniaturize a focus lens group, to shorten a focus stroke, and to reduce performance degradation in a close range, while securing miniaturization, a high zoom ratio and a large aperture ratio.

DETAILED DESCRIPTION OF EMBODIMENTS

Figure 1:
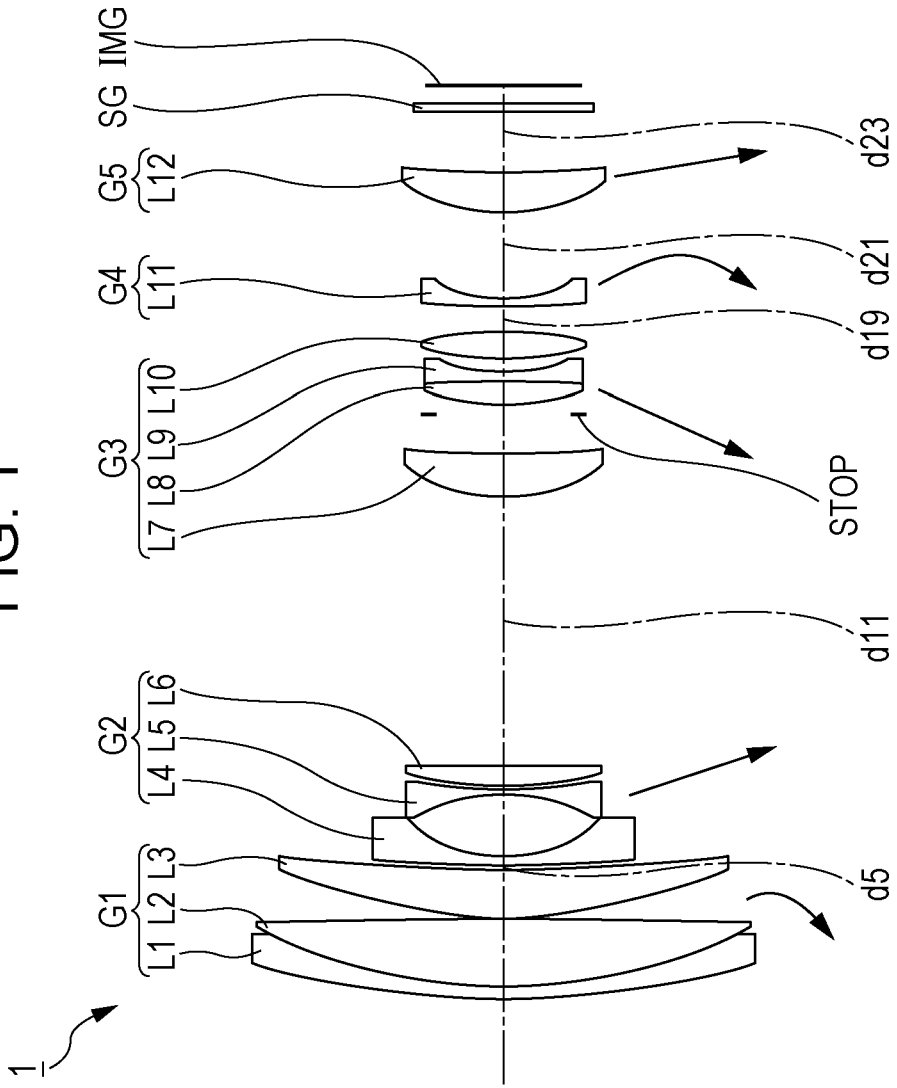
FIG. 1 is a diagram illustrating a lens configuration according to a first embodiment of a zoom lens, and FIG. 1 together with FIGS. 2 to 33 illustrates zoom lenses and imaging apparatuses of the present technology.

Hereinafter, embodiments for implementing a zoom lens and an imaging apparatus of the present technology will be described.

Configuration of Zoom Lens

A zoom lens according to the present technology includes a first lens group having positive refractive power, a second lens group having negative refractive power, a third lens group having positive refractive power, a fourth lens group which has negative refractive power and is configured with only a single lens, and a fifth lens group having positive refractive power, which are arranged in order from an object side to an image side.

Further, in the zoom lens according to the present technology, during zooming, at least the first lens group, the second lens group, the third lens group and the fourth lens group are movable in the optical axis direction, and focusing from infinity to a close range is performed by the fourth lens group being moved in the optical axis direction.

In this manner, in the zoom lens according to the present technology, during focusing, the entire lens system is not moved in the optical axis direction and the fourth lens group configured with only a single lens is moved in the optical axis direction. Accordingly, the weight of the focus lens group is reduced and an actuator for moving the focus lens group is miniaturized, such that it is possible to perform high speed focusing and to reduce the size.

Since the fourth lens group having negative refractive power is smaller in the effective beam diameter than the fifth lens group, it is possible to reduce the weight of the lens and to reduce the size using a lens group that is most suitable for the focusing lens group, by configuring the fourth lens group only with a single lens.

Further, in the zoom lens according to the present technology, at least one of the following conditional expression (1) and the conditional expression (2) is satisfied.

$$-11.0 < Fno\_w \times Y / \{(1-\beta 4\_w^2) \times \beta 5\_w^2\} < -7.0 \text{ and} \quad (1)$$

$$-11.0 < Fno\_t \times Y / \{(1-\beta 4\_t^2) \times \beta 5\_t^2\} < -7.0 \quad (2)$$

Where,

Fno_w: an open f-number at a wide-angle end

Fno_t: an open f-number at a telephoto end

Y: a paraxial image height at the wide-angle end represented by fw×tan ω, when fw and ω respectively represent a focal length and a half angle of view of an entire system at the wide-angle end, β4_w: a lateral magnification of the fourth lens group at the wide-angle end, β4_t: a lateral magnification of the fourth lens group at the telephoto end, β5_w: a lateral magnification of the fifth lens group at the wide-angle end, and β5_t: a lateral magnification of the fifth lens group at the telephoto end.

The conditional expression (1) and the conditional expression (2) are equations respectively defining the movement amount of the focus lens group necessary for moving the focus positions at the wide-angle end and at the telephoto end by a certain depth of focus.

In the conditional expressions, each of $\{(1-\beta 4\_w^2) \times \beta 5\_w^2\}$ and $\{(1-\beta 4\_t^2) \times \beta 5\_t^2\}$ represents a focus sensitivity of the focus lens group (a focal movement amount relative to the movement of the focus lens group), and the open f-number and the paraxial image height are factors for determining the depth of focus.

Since the fourth lens group which is the focus lens group has negative refractive power, the focus sensitivity becomes negative, so that the numerical range in the conditional expression (1) and the conditional expression (2) has a negative value.

Since the movement amount of the focus lens group for moving the focus position by a certain depth of focus is reduced by increasing the numerical values in the conditional expression (1) or the conditional expression (2) to be close to 0 (absolute value decreases), it is possible to reduce the movement amount of the entire focus lens group.

In a case where the numerical values in the conditional expression (1) and the conditional expression (2) are respectively below lower limits, the focus sensitivity of the fourth lens group is reduced, which results in an increase in the focus stroke, the size of a focusing unit, and the focusing time.

In contrast, in a case where the numerical values in the conditional expression (1) and the conditional expression (2) respectively exceed upper limits, the movement amount of the focus lens group can be reduced, but it is not desirable because the accuracy of the stop position necessary for the focus lens group is excessively high, an accurate auto-focusing is difficult, and thus an image quality is degraded.

Further, since the operation amplitude is excessively reduced during a wobbling operation used in a moving picture, it is difficult to perform the wobbling operation.

Moreover, the focus movement amount at the wide-angle end becomes a state of being reduced optimally if the conditional expression (1) is satisfied and the focus movement amount at the telephoto end becomes a state of being reduced optimally if the conditional expression (2) is satisfied. When a conditional expression having a larger value (the absolute value is small) between the numerical values of the conditional expression (1) and the conditional expression (2) satisfies a conditional range, it can be said that the focus stroke can be reduced optimally while securing the stop position accuracy during focusing in the entire zooming range.

In addition, which one of the conditional expression (1) and the conditional expression (2) is satisfied or whether both of them are satisfied significantly depends on the setting of the open f-number at the wide-angle end and the telephoto end.

From the above description, it is most desirable to satisfy at least one of the conditional expression (1) and the conditional expression (2) in terms of the focus sensitivity of the focus lens group in order to shorten the focus stroke.

As described above, the zoom lens according to the present technology includes a first lens group having positive refractive power, a second lens group having negative refractive power, a third lens group having positive refractive power, a fourth lens group which has negative refractive power and is configured with only a single lens, and a fifth lens group having positive refractive power, which are arranged in order from an object side to an image side. Further, during zooming, at least the first lens group, the second lens group, the third lens group, and the fourth lens group are movable in an optical axis direction, focusing from infinity to a close range is performed by the fourth lens group being moved in the optical axis direction, and at least one of following conditional expressions (1) and (2) is satisfied.

Therefore, it is possible to miniaturize a focus lens group, to shorten a focus stroke, and to reduce performance degradation in a close range, while securing miniaturization, a high zoom ratio and a large aperture ratio.

Further, it is desirable that the conditional expression (1) and the conditional expression (2) be respectively set as the following conditional expressions (1)' and (2)'.

$$-11.0 < Fno\_w \times Y / \{(1-\beta 4\_w^2) \times \beta 5\_w^2\} < -8.5 \text{ and} \quad (1)$$

$$-11.0 < Fno\_t \times Y / \{(1-\beta 4\_t^2) \times \beta 5\_t^2\} < -8.5 \quad (2)$$

If the zoom lens satisfies the conditional expression (1)' and the conditional expression (2)', it is possible further to miniaturize a focus lens group, to shorten a focus stroke and to reduce performance degradation in a close range, while further securing miniaturization, a high zoom ratio and a large aperture ratio.

According to the zoom lens according to a first embodiment of the present technology, during zooming from the wide-angle end to the telephoto end, it is desirable that the first lens group be moved so as to widen a distance to the second lens group and the third lens group be moved so as to narrow a distance to the second lens group.

In a positive-negative-positive-negative-positive configuration, it is possible to make the third lens group have a large zooming effect and to secure a high zoom ratio, by each lens group moving as described above during zooming.

In the zoom lens according to an embodiment of the present technology, it is desirable that an aspherical shape of at least one surface be formed in each of the second lens group, the third lens group and the fourth lens group.

Since the aspherical shape of at least one surface is formed in each of the second lens group, the third lens group and the fourth lens group in the zoom lens, it is possible to reduce the number of necessary lenses, which leads to miniaturization, and to reduce degradation in various aberrations during zooming and focusing by appropriately performing an aberration correction for each lens group.

The aspherical shape of the second lens group mainly has a great effect on the correction of various aberrations at the wide-angle end, the aspherical shape of the third lens group has a great effect on the correction of a spherical aberration from the wide-angle end to the telephoto end, and the aspherical shape of the fourth lens group has a great effect on the suppression of the image plane curvature fluctuations in the entire zoom range and a whole object distance range.

Further, in the zoom lens according to an embodiment of the present technology, it is desirable that the following conditional expression (3) be satisfied.

$$-1.3 < f4/f5 < -0.9 \quad (3)$$

where f4: a focal length of the fourth lens group, and f5: a focal length of the fifth lens group The conditional expression (3) is an expression defining a ratio of the refractive power of the fifth lens group to the refractive power of the fourth lens group.

In a case where the refractive power of the fourth lens group exceeds the upper limit of the conditional expression (3) and becomes strong, it is advantageous in terms of an increase in the focus sensitivity of the focus lens group, but in a case of configuring the fourth lens group with a small number of lenses, the aberration caused by the fourth lens group increases and performance degradation during focusing increases. Furthermore, if the number of lenses of the fourth lens group is increased for an aberration correction in the fourth lens group, the weight of the lens is increased and the size of the focus driving system is enlarged. Further, if the refractive power of the fifth lens group to the refractive power of the fourth lens group is too weak, the incident angle of the light beam on the imaging plane is increased, and in particular, an exit pupil position at the wide angle end is close to the imaging plane, so that this case is not desirable.

In contrast, in a case where the refractive power of the fifth lens group is below the lower limit of the conditional expression (3) and becomes strong, since the refractive power of the fifth lens group is too strong, the incident angle of the light beam on the imaging plane is increased, and in particular, an exit pupil position at the telephoto end is close to the imaging plane, so that this case is not desirable. Further, since the effective beam diameter of the fifth lens group at the telephoto end is increased, the size of the fifth lens group is enlarged.

Accordingly, if the zoom lens satisfies the conditional expression (3), it is possible to increase the focus sensitivity of the fourth lens group which is the focus lens group, without any difficulty, and to realize high optical performance from infinity to a short range.

Further, in the zoom lens according to an embodiment of the present technology, it is desirable that the following conditional expression (4) be satisfied.

$$0.01 < t4/(f\_w \times f\_t)^{1/2} < 0.045 \quad (4)$$

Where, t4: a center thickness of the fourth lens group, f_w: a focal length of an entire system at the wide-angle end, and f_t: a focal length of an entire system at the telephoto end If the thickness exceeds the upper limit of conditional expression (4), it is not desirable because the weight of the focus lens group is increased and a focus unit including a drive system is enlarged.

In contrast, if the thickness of the center of the lens is reduced to an extent at which the thickness is below the lower limit of the conditional expression (4), it is difficult to form the lens, or significant deterioration occurs in the yield of formation of the lens.

Accordingly, if the zoom lens satisfies the conditional expression (4), it is possible to reduce the weight of the focus lens group and to form a lens satisfactorily.

In the zoom lens according to an embodiment of the present technology, it is desirable that the third lens group be configured with a single lens having positive refractive power, a cemented lens which is configured with a positive lens and a negative lens and has negative refractive power, and a single lens having positive refractive power, which are arranged in order from an object side to an image side.

By configuring the third lens group with a single lens having positive refractive power, a cemented lens which is configured with a positive lens and a negative lens and has negative refractive power, and a single lens having positive refractive power as described above, the positive refractive power can be shared by three positive lenses, a color aberration can be corrected by the negative lens, a spherical aberration is corrected satisfactorily, and in particular, a spherical aberration which easily occurs in the third lens group located in the vicinity of the diaphragm can be corrected satisfactorily in a case of a large aperture ratio.

Further, it becomes easy to perform an aberration correction by increasing the number of lenses, but increasing the number of lenses leads to an enlargement of the optical system, and thus it is possible to achieve both a satisfactory correction function and miniaturization by configuring the third lens group with four lenses as described above.

Further, in the zoom lens according to an embodiment of the present technology, it is desirable that the following conditional expression (5) be satisfied.

$$(Fno\_w + Fno\_t)/2 < 3.0 \quad (5)$$

Since the refractive power of the fourth lens group becomes unnecessarily strong in order to satisfy the conditional expression (1) or the conditional expression (2) in a range that exceeds the upper limit of the conditional expression (5), the performance maintenance from a close range to infinity during focusing becomes difficult.

Therefore, if the conditional expression (5) is satisfied while at least one of the conditional expression (1) or the conditional expression (2) is satisfied, it is possible to optimize the stroke of the focus lens group by the lens having a large aperture ratio.

In the zoom lens according to an embodiment of the present technology, it is desirable that the zoom lens have a vibration reduction function by the single lens positioned closest to the image side of the third lens group being displaced in a direction perpendicular to the optical axis, and at least one surface of the single lens positioned closest to the image side be formed as an aspherical surface.

Thus, it is possible to reduce the weight of the vibration reduction lens group while securing high optical performance by configuring the zoom lens as described above.

In addition, if securing a sufficient amount of ambient light beam is attempted by achieving a bright open f-number, an effective diameter of each lens is enlarged and the impact of the weight of a drive system for operating a vibration reduction lens group, a focus lens group, and the like on the size of whole lens barrel is increased, but it is possible to reduce the weight by configuring the vibration reduction lens group with one lens as described above.

Further, by arranging the vibration reduction lens group on the object side of the fourth lens group having negative refractive power, it is possible to reduce an eccentric amount of the vibration reduction lens group for a vibration reduction correction angle to be necessary, and to reduce the deterioration in optical performance during vibration reduction.

Furthermore, by forming at least one surface of the single lens to have positive refractive power as an aspherical surface, it is possible to enhance the positive refractive power of the vibration reduction lens group while securing high optical performance and to further reduce the eccentric amount of the vibration reduction lens group, which contributes to miniaturization of the entire lens barrel.

In the zoom lens according to an embodiment of the present technology, it is desirable that the fifth lens group be fixed in the optical axis direction and configured with two lenses of at least a positive lens and a negative lens.

By fixing the fifth lens group in the optical axis direction, it is possible to simplify and miniaturize the lens barrel configuration, to prevent the movement of dust in the vicinity of the imaging device at the time of movement of each lens group during zooming and to prevent reflection of dust in the captured image at the time of a small diaphragm.

Further, by configuring the fifth lens group with two lenses of at least a positive lens and a negative lens, it becomes possible to effectively correct an image plane curvature and a color aberration.

In the zoom lens according to an embodiment of the present technology, it is desirable that the fifth lens group be movable in the optical axis direction.

By making the fifth lens group movable in the optical axis direction, it is possible to reduce the size and improve the optical performance in the optical axis direction of the zoom lens.

In the zoom lens according to an embodiment of the present technology, it is desirable that the fourth lens group be moved in the optical axis direction by a driving force of a piezo element.

By the fourth lens group being moved in the optical axis direction by a driving force of a piezo element, it is possible to increase the accuracy of the movement position in the optical axis direction of the fourth lens group, and to improve the focus sensitivity.

It is desirable that the zoom lens according to the present technology be configured as follows:

First, it is desirable that the first lens group be configured with a negative meniscus lens facing a convex surface toward the object side and a positive lens facing a convex surface toward the object side and include a cemented lens having positive refractive power as a whole. By using a glass material with an Abbe number of 25 or less as the negative meniscus lens, and using a glass material with an Abbe number of 50 or greater as the positive lens, in particular, it is possible to correct satisfactorily on-axis color aberration that occurs largely at the telephoto end.

Second, it is desirable that the second lens group be configured with two or more negative lenses and one positive lens. In this case, it is more desirable that an aspherical shape be formed on at least one surface of the negative lens.

In particular, since the passing position of the light beam is separated from the optical axis at the wide-angle end, if the second lens group has strong negative refractive power, astigmatism occurs noticeably. The astigmatism occurring in the second lens group can be suppressed by the lens group later the fourth lens group, but in this case, the image plane variation due to the movement of the fourth lens group by focusing becomes large.

Therefore, it is desirable to suppress the occurrence of astigmatism by forming an aspherical shape in the negative lens of the second lens group.

Third, it is desirable that the fifth lens group be configured with two or fewer lenses in order to miniaturize the optical system. Further, it is more desirable that an aspherical shape be formed on at least one surface of the positive lens in the fifth lens group.

In the fifth lens group, since the light beam incident on each image height of the imaging plane passes through the different positions of the lens, it is possible to correct satisfactorily, in particular, the image plane curvature of the peripheral image height by the aspherical shape.

Further, the fifth lens group is able to be either fixed or movable in the optical axis direction during zooming. If the fifth lens group is movable in the optical axis direction during zooming (the numerical examples 1, 3, 5, and 8 described below), it is possible to satisfactorily correct the image plane variation during zooming. If the fifth lens group is fixed in the optical axis direction (the numerical examples 2, 4, 6, and 7 described below), it is possible to simplify the structure.

Fourth, it is desirable that a diaphragm be disposed between the second lens group and the third lens group or in the third lens group.

When the diaphragm is disposed between the second lens group and the third lens group, and disposed so as to be moved integrally with the third lens group during zooming (the numerical examples 2, 3, 6, and 7 described below), it is disadvantageous in the full length at the telephoto end, but this is a configuration that is easily assembled in production because a diaphragm unit having the diaphragm and third lens group can be assembled separately.

When the diaphragm is disposed between the second lens group and the third lens group, and disposed so as to be moved independently of the third lens group during zooming (the numerical example 4 described below), a diaphragm unit is disposed at a position spaced from the third lens group at the wide-angle end rather than telephoto end. Such a configuration makes it possible to efficiently shield from a flare component of ambient light at the wide-angle end.

In contrast, when the diaphragm is disposed in the third lens group (the numerical examples 1, 5, and 8 described below), it is advantageous in the reduction of the total length because it is possible to effectively utilize the space before and after the third lens group during zooming.

Specifically, it is possible to reduce the overall length at the telephoto end and to reduce the size by making the distance between the second lens group and the third lens group as close as possible at the telephoto end. It is possible to increase the focus sensitivity of the fourth lens group which is the focus lens group and to shorten the focus movement amount by making the distance between the third lens group and the fourth lens group close at the wide-angle end.

Fifth, with respect to the vibration reduction mechanism, it is desirable that the entirety or a part of the third lens group be displaced in the direction perpendicular to the optical axis.

When a part of the third lens group is displaced (the numerical examples 1, 2, 3, 5, 6, 7, and 8 described below), it is desirable to use a positive lens positioned closest to the image side of the third lens group as the lens to be displaced. Further, it is desirable that at least one surface of the positive lens be formed as an aspherical shape. Thus, it is possible to reduce the weight of the vibration reduction lens group and to suppress the deterioration of the resolution performance at the time of vibration reduction.

When the entire third lens group is displaced (the numerical example 4 described below), it is desirable that in the third lens group, an aspherical shape be configured with only the positive lens positioned closest to the object side. Although it is disadvantageous in terms of the weight by displacing the entirety of the third lens group, it is possible to prevent performance degradation because the vibration reduction function is exhibited in the entire lens group in which the aberration correction is performed satisfactorily.

Numerical Example of Zoom Lens

Below, numerical examples obtained by applying specific numerical values to specific embodiments of the zoom lens according to the present technology will be described with reference to drawings and tables.

The meanings or the like of symbols shown in respective tables and the description below are as follows.

"Surface number" represents a surface number of the i-th surface when counting from the object side to the image side, "R" represents the paraxial radius of curvature of the i-th surface, "D" represents an on-axis surface distance between the i-th surface and the (i+1)-th surface (a thickness of the center of the lens or an air gap), "Nd" represents a refractive index of a d-line (λ=587.6 nm) of a lens or the like starting from the i-th surface, and "vd" represents the Abbe number of the d-line of the lens or the like starting from the i-th surface.

With respect to the "surface number", "ASP" represents that the surface is an aspherical surface, "STOP" represents that it is an opening diaphragm, and with respect to "R", "∞" represents that the surface is a flat surface.

With respect to "D", "di" represents a variable distance.

"κ" represents a conic constant, and "A", "B", "C", and "D" respectively represent the fourth, sixth, eighth and tenth aspherical surface coefficients.

"f" represent a focal length of an entire lens system, "Fno" represents an open f-number, and "ω" represents a half angle of view.

Further, in each Table showing the following aspherical surface coefficients, "E-n" represents an exponential expression with a base of 10, that is, represents "negative nth power of 10"; for example, "0.12345E-5" represents "0.12345×(ten to the negative fifth power)".

In the zoom lenses used in respective embodiments, some lens surfaces are formed as aspherical surfaces. The aspherical shape is defined as the following Expression 1 if "x" is a distance (sag amount) from an apex of a lens surface in the optical axis direction, "y" is a height (image height) in a direction perpendicular to the optical axis direction, "c" is a paraxial curvature (a reciprocal of a radius of curvature) at an apex of a lens, "κ" is a conic constant, and "A", "B", "C", and "D" are respectively the fourth, sixth, eighth, 10th order aspherical surface coefficients.

$$x = \frac{cy^2}{1 + [1 - (1+k)c^2 y^2]^{1/2}} + Ay^4 + By^6 \qquad \text{[Expression 1]}$$

First Embodiment

FIG. 1 is a diagram illustrating a lens configuration of a zoom lens 1 according to a first embodiment of the present technology.

The zoom lens 1 has a zoom ratio of 8.8.

The zoom lens 1 has 12 lenses, and is configured with a first lens group G1 having positive refractive power, a second lens group G2 having negative refractive power, a third lens group G3 having positive refractive power, a fourth lens group G4 having negative refractive power, and a fifth lens group G5 having positive refractive power, which are arranged in order from an object side to an image side.

In the zoom lens 1, during zooming, the first lens group G1, the second lens group G2, the third lens group G3, the fourth lens group G4, and the fifth lens group G5 are moved in an optical axis direction. At the telephoto end rather than at the wide-angle end, the first lens group G1, the third lens group G3, and the fourth lens group G4 are moved to be located on the object side and the second lens group G2 and the fifth lens group G5 are moved to be located on the image side.

The zoom lens 1 is a focusing lens group which performs focusing from infinity to the close range by the fourth lens group G4 being moved in the optical axis direction during focusing.

The first lens group G1 is configured with a cemented lens formed by joining a first lens L1 having negative refractive power and a meniscus shape facing a convex surface toward the object side and a second lens L2 having positive refractive power and a bi-convex shape, and a third lens L3 having positive refractive power and a meniscus shape facing a convex surface toward the object side, which are arranged in order from the object side to the image side.

The second lens group G2 is configured with a fourth lens L4 having negative refractive power and a concave surface facing the image side, a fifth lens L5 having negative refractive power and a bi-concave shape, and a sixth lens L6 having positive refractive power and a convex surface facing the object side, which are arranged in order from the object side to the image side.

The third lens group G3 is configured with a seventh lens L7 having positive refractive power and a convex surface facing the object side, a cemented lens formed by joining an eighth lens L8 having positive refractive power and a bi-convex shape and a ninth lens L9 having negative refractive power and a bi-concave shape, and a 10th lens L10 having positive refractive power and a bi-convex surface, which are arranged in order from the object side to the image side.

The fourth lens group G4 is configured with only an 11st lens L11 having negative refractive power and a concave surface facing the image side.

The fifth lens group G5 is configured with only a 12th lens L12 having positive refractive power and a convex surface facing the object side.

An image plane IMG is disposed on an image side of the fifth lens group G5. A cover glass SG is disposed between the fifth lens group G5 and the image plane IMG.

A diaphragm STOP is disposed between a seventh lens L7 and an eighth lens L8 of the third lens group G3. During zooming, the diaphragm STOP is moved integrally with the third lens group G3 in the optical axis direction.

The 10th lens L10 which is located on the most image side of the third lens group is displaced in a direction perpendicular to the optical axis direction, and thus a vibration reduction function is realized.

Table 1 shows lens data of a numerical example 1 obtained by applying specific numerical values to the zoom lens 1 according to the first embodiment.

TABLE 1

| SURFACE NUMBER | R | D | Nd | vd |
| --- | --- | --- | --- | --- |
| 1 | 59.579 | 0.800 | 1.847 | 23.784 |
| 2 | 32.634 | 4.450 | 1.593 | 68.623 |
| 3 | −468.105 | 0.150 | | |
| 4 | 34.666 | 3.050 | 1.729 | 54.673 |
| 5 | 121.909 | (d5) | | |
| 6(ASP) | 530.647 | 0.400 | 1.773 | 49.466 |
| 7(ASP) | 8.172 | 4.134 | | |

TABLE 1-continued

| SURFACE NUMBER | R | D | Nd | vd |
|---|---|---|---|---|
| 8 | −12.126 | 0.300 | 1.773 | 49.624 |
| 9 | 32.444 | 0.200 | | |
| 10(ASP) | 18.273 | 1.451 | 2.002 | 19.325 |
| 11(ASP) | −568.137 | (d11) | | |
| 12(ASP) | 11.614 | 2.900 | 1.755 | 51.157 |
| 13(ASP) | 483.795 | 2.611 | | |
| 14(STOP) | ∞ | 0.550 | | |
| 15 | 13.591 | 1.503 | 1.593 | 67.001 |
| 16 | −123.172 | 0.500 | 1.847 | 23.784 |
| 17 | 10.567 | 1.050 | | |
| 18(ASP) | 15.267 | 1.686 | 1.697 | 55.460 |
| 19(ASP) | −22.992 | (d19) | | |
| 20(ASP) | 112.283 | 0.350 | 1.525 | 56.238 |
| 21(ASP) | 9.565 | (d21) | | |
| 22(ASP) | 10.603 | 2.760 | 1.729 | 54.041 |
| 23(ASP) | 73.561 | (d23) | | |
| 24 | ∞ | 0.360 | 1.517 | 64.166 |
| 25 | ∞ | 1.201 | | |
| IMG | ∞ | 0.000 | | |

In the zoom lens 1, both surfaces (a sixth surface and a seventh surface) of the fourth lens L4 of the second lens group G2, both surfaces (a 10th surface and an 11st surface) of the sixth lens L6 of the second lens group G2, both surfaces (a 12th surface and a 13th surface) of the seventh lens L7 of the third lens group G3, both surfaces (an 18th surface and a 19th surface) of the 10th lens L10 of the third lens group G3, both surfaces (a 20th surface and a 21st surface) of the 11st lens L11 of the fourth lens group G4, and both surfaces (a 22nd surface and a 23rd surface) of the 12th lens L12 of the fifth lens group G5 are formed as an aspherical surface. The fourth, sixth, eighth, and 10th order aspherical surface coefficients A4, A6, A8, and A10 along with the conic constants κ of the aspherical surfaces in the numerical example 1 are shown in Table 2.

TABLE 2

| SURFACE NUMBER | κ | A | B | C | D |
|---|---|---|---|---|---|
| s6 | 0.00000E+00 | 1.07216E−04 | −7.87026E−07 | −2.65009E−09 | 5.77636E−11 |
| s7 | 0.00000E+00 | −1.23156E−05 | −1.49631E−07 | 5.93023E−08 | −1.28736E−09 |
| s10 | 0.00000E+00 | −1.59994E−04 | −1.19974E−06 | 1.28685E−07 | −2.70904E−09 |
| s11 | 0.00000E+00 | −5.36032E−05 | −2.21903E−06 | 1.23996E−07 | −2.42645E−09 |
| s12 | 0.00000E+00 | 8.36705E−06 | 2.38087E−06 | −5.42950E−08 | 2.33924E−09 |
| s13 | 0.00000E+00 | 1.44820E−04 | 3.18838E−06 | −7.98069E−08 | 3.71335E−09 |
| s18 | 0.00000E+00 | −6.65852E−05 | −2.13739E−06 | 5.34555E−08 | −5.72822E−11 |
| s19 | 0.00000E+00 | 3.40097E−05 | −1.76991E−06 | 4.78610E−08 | 2.14519E−10 |
| s20 | 0.00000E+00 | 3.81121E−04 | −7.02291E−06 | 7.04862E−10 | −1.41841E−10 |
| s21 | 0.00000E+00 | 3.48972E−04 | −1.60653E−06 | −9.42880E−08 | −1.67130E−10 |
| s22 | 0.00000E+00 | −1.38772E−04 | 2.41630E−06 | −1.04634E−08 | 1.20208E−10 |
| s23 | 0.00000E+00 | −1.20115E−04 | 1.79260E−06 | 0.00000E+00 | 0.00000E+00 |

The focal lengths f, the open f-numbers Fno and the half angles of view ω and the variable distances of an entire lens system in the numerical example 1 are shown in Table 3.

TABLE 3

| SURFACE NUMBER | WIDE ANGLE END | INTERMEDIATE FOCAL LENGTH | TELEPHOTO END |
|---|---|---|---|
| f | 5.853 | 17.484 | 51.770 |
| Fno | 1.817 | 2.380 | 2.837 |
| ω | 40.440 | 14.266 | 4.873 |
| d5 | 0.400 | 12.514 | 23.809 |
| d11 | 17.620 | 5.820 | 0.600 |
| d19 | 1.800 | 8.125 | 8.930 |
| d21 | 5.629 | 4.500 | 8.128 |
| d23 | 4.000 | 3.282 | 2.600 |

Figure 2:
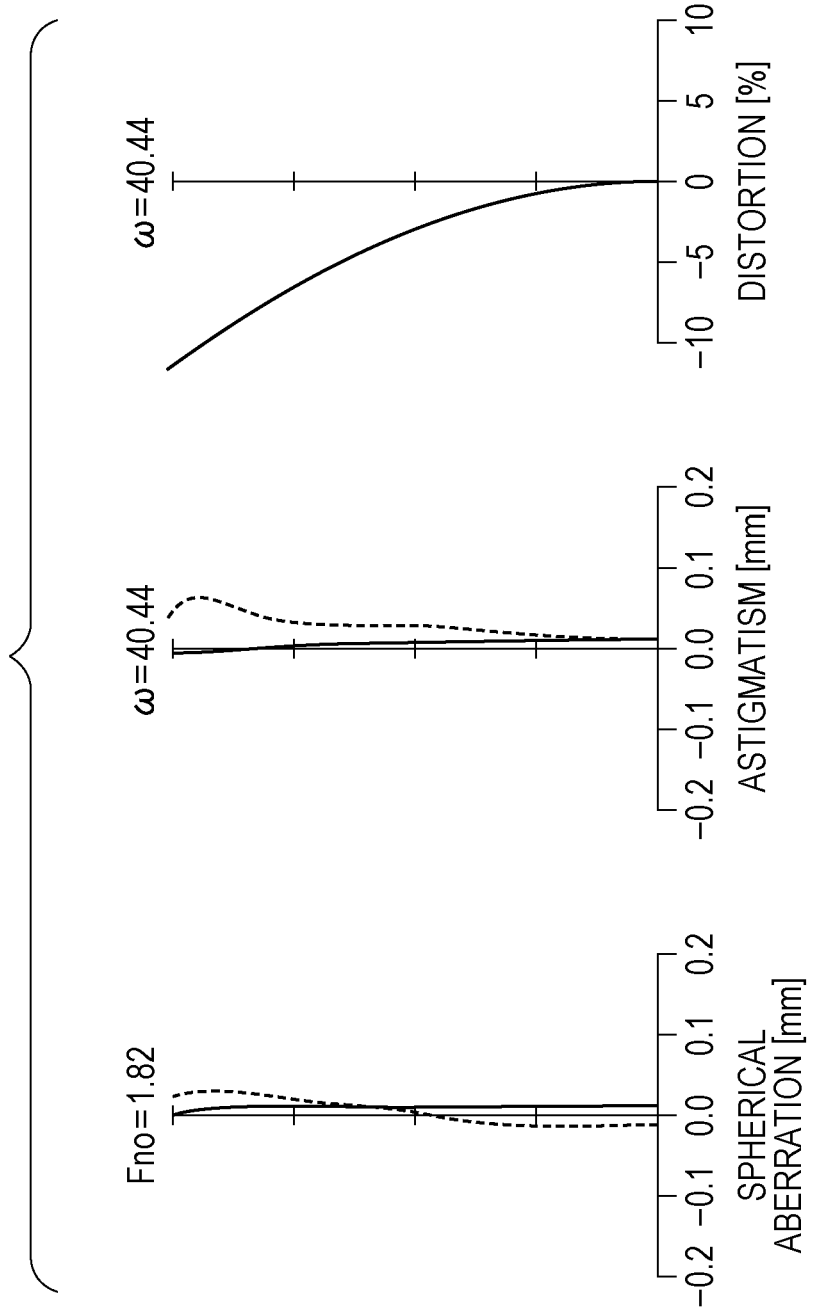
FIG. 2 is a diagram illustrating spherical aberration, astigmatism and distortion at a wide angle end in a numerical example obtained by applying specific numerical values to the first embodiment.
Figure 3:
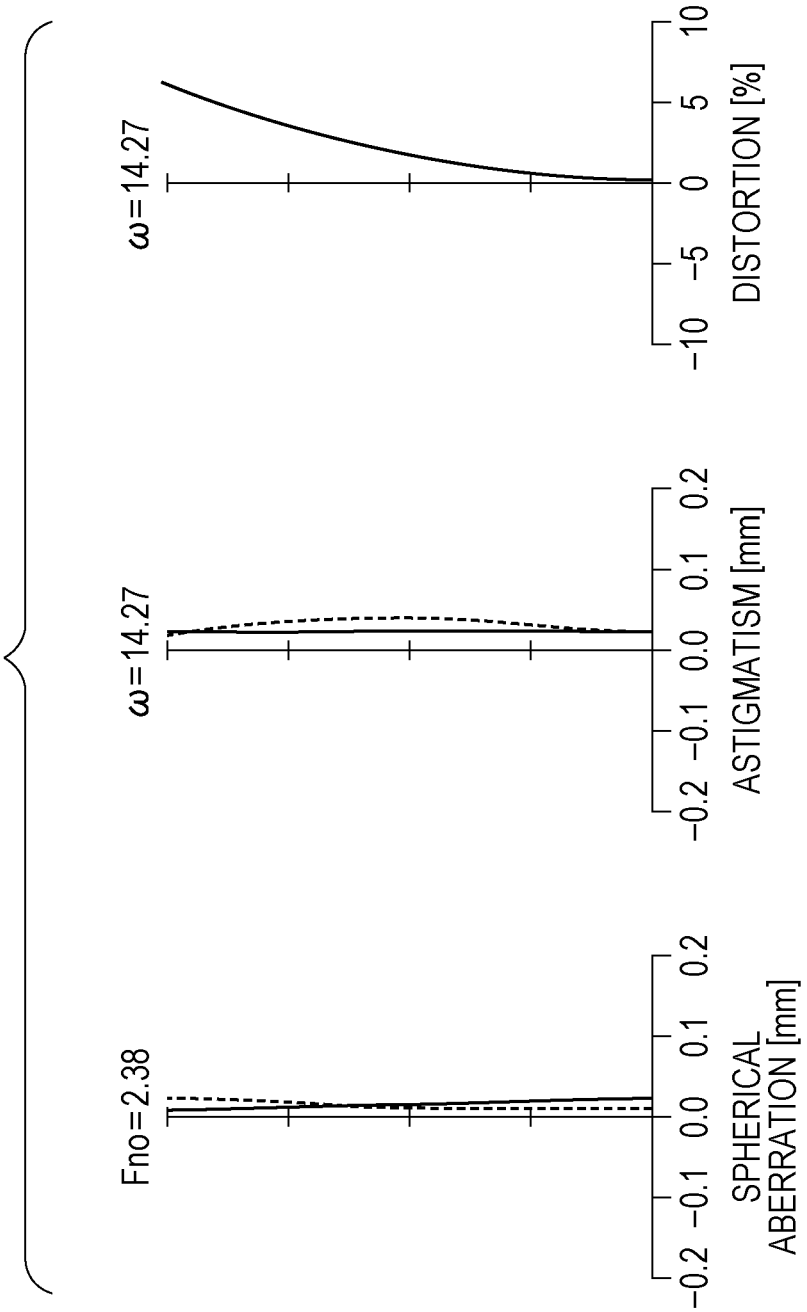
FIG. 3 is a diagram illustrating spherical aberration, astigmatism and distortion at an intermediate focal length in a numerical example obtained by applying specific numerical values to the first embodiment.
Figure 4:
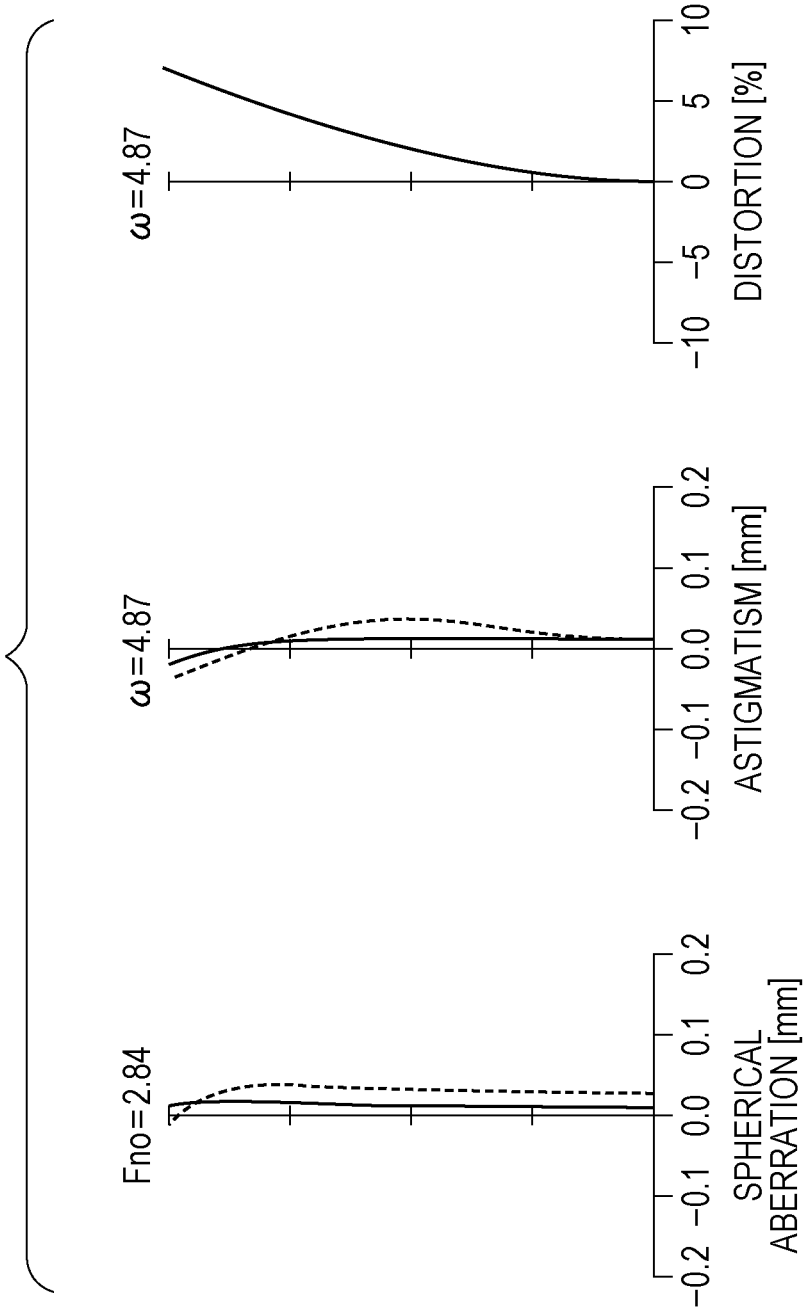
FIG. 4 is a diagram illustrating spherical aberration, astigmatism and distortion at a telephoto end in a numerical example obtained by applying specific numerical values to the first embodiment.

FIG. 2 illustrates spherical aberration, astigmatism and distortion at a wide angle end in the numerical example 1, FIG. 3 illustrates spherical aberration, astigmatism and distortion at an intermediate focal length in the numerical example 1, and FIG. 4 illustrates spherical aberration, astigmatism and distortion at a telephoto end in the numerical example 1.

In FIGS. 2 to 4, in the spherical aberration, a solid line represents a value of a d-line (587.56 nm) and a dashed line represents a value of a g-line (435.84 nm); in the astigmatism, a solid line represents a value of a sagittal image plane of a d-line and a dashed line represents a value of a meridional image plane of a d-line; and in the distortion, a solid line represents a value of the d-line.

From the aberration diagrams, in the numerical example 1, it is apparent that aberrations are well corrected and an excellent image forming performance is achieved, and high resolution performance is realized while securing miniaturization, a high zoom ratio and a large aperture ratio.

Second Embodiment

Figure 5:
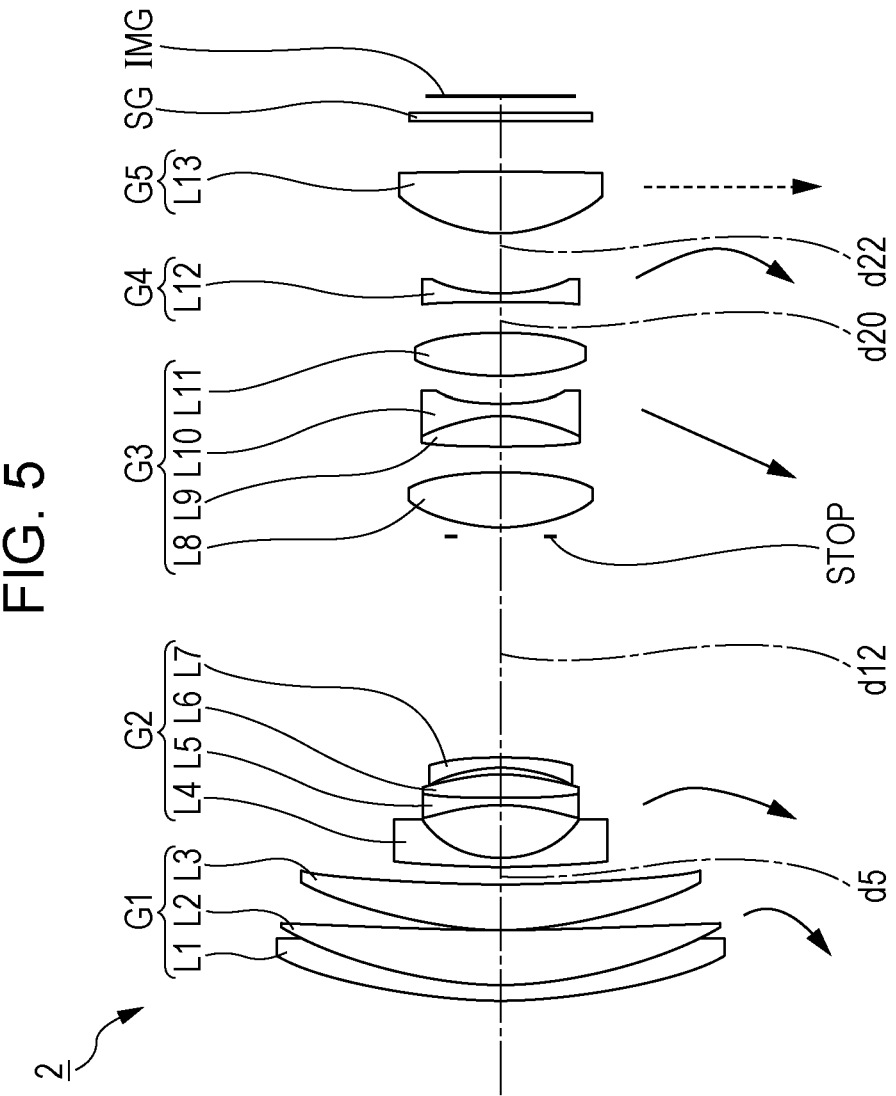
FIG. 5 is a diagram illustrating a lens configuration according to a second embodiment of a zoom lens.

FIG. 5 is a diagram illustrating a lens configuration of a zoom lens 2 according to a second embodiment of the present technology.

The zoom lens 2 has a zoom ratio of 7.2.

The zoom lens 2 has 13 lenses, and is configured with a first lens group G1 having positive refractive power, a second lens group G2 having negative refractive power, a third lens group G3 having positive refractive power, a fourth lens group G4 having negative refractive power, and a fifth lens group G5 having positive refractive power, which are arranged in order from an object side to an image side.

In the zoom lens 2, during zooming, the first lens group G1, the second lens group G2, the third lens group G3, and the fourth lens group G4 are moved in an optical axis direction. At the telephoto end rather than at the wide-angle end, the first lens group G1, the second lens group G2, the third lens group G3, and the fourth lens group G4 are moved to be located on the object side.

The zoom lens 2 is a focusing lens group which performs focusing from infinity to the close range by the fourth lens group G4 being moved in the optical axis direction during focusing.

The first lens group G1 is configured with a cemented lens formed by joining a first lens L1 having negative refractive power and a meniscus shape facing a convex surface toward the object side and a second lens L2 having positive refractive power and a convex surface facing the object side, and a third lens L3 having positive refractive power and a meniscus shape facing a convex surface toward the object side, which are arranged in order from the object side to the image side.

The second lens group G2 is configured with a fourth lens L4 having negative refractive power and a concave surface facing the image side, a cemented lens formed by joining a fifth lens L5 having negative refractive power and a bi-concave shape and a sixth lens L6 having positive refractive power and a bi-convex shape, and a seventh lens L7 having negative refractive power and a concave surface facing the object side, which are arranged in order from the object side to the image side.

The third lens group G3 is configured with an eighth lens L8 having positive refractive power and a bi-convex shape, a cemented lens formed by joining a ninth lens L9 having positive refractive power and a bi-convex shape and a 10th lens L10 having negative refractive power and a bi-concave shape, and an 11st lens L11 having positive refractive power and a bi-convex shape, which are arranged in order from the object side to the image side.

The fourth lens group G4 is configured with only a 12th lens L12 having negative refractive power and a bi-concave shape.

The fifth lens group G5 is configured with only a 13th lens L13 having positive refractive power and a bi-convex shape.

An image plane IMG is disposed on an image side of the fifth lens group G5. A cover glass SG is disposed between the fifth lens group G5 and the image plane IMG.

A diaphragm STOP is disposed between the second lens group G2 and the third lens group G3. During zooming, the diaphragm STOP is moved integrally with the third lens group G3 in the optical axis direction. During zooming, a bright open f-number similar to that at the wide-angle end is secured even at the telephoto end by setting the diameter of the diaphragm STOP to be larger at the telephoto end rather than at the wide-angle end.

The 11st lens L11 which is located on the most image side of the third lens group is displaced in a direction perpendicular to the optical axis direction, and thus a vibration reduction function is realized.

Table 4 shows lens data of a numerical example 2 obtained by applying specific numerical values to the zoom lens 2 according to the second embodiment.

TABLE 4

| SURFACE NUMBER | R | D | Nd | νd |
|---|---|---|---|---|
| 1 | 63.110 | 1.300 | 1.847 | 23.784 |
| 2 | 46.279 | 6.380 | 1.497 | 81.607 |
| 3 | 394.957 | 0.200 | | |
| 4 | 51.087 | 4.520 | 1.593 | 67.001 |
| 5 | 162.561 | (d5) | | |
| 6(ASP) | 61.741 | 0.800 | 1.801 | 45.449 |
| 7(ASP) | 9.670 | 6.110 | | |
| 8 | −26.161 | 0.800 | 1.729 | 54.673 |
| 9 | 76.564 | 2.636 | 1.946 | 17.984 |
| 10 | −22.704 | 1.022 | | |
| 11(ASP) | −14.907 | 0.900 | 1.821 | 24.058 |
| 12(ASP) | −40.507 | (d12) | | |
| 13(STOP) | ∞ | 1.000 | | |
| 14(ASP) | 16.903 | 6.200 | 1.592 | 67.022 |
| 15(ASP) | −31.363 | 2.761 | | |
| 16 | 58.327 | 3.393 | 1.593 | 67.001 |
| 17 | −18.745 | 1.000 | 1.750 | 35.040 |
| 18 | 17.238 | 3.127 | | |
| 19(ASP) | 18.762 | 5.018 | 1.619 | 63.854 |
| 20(ASP) | −26.287 | (d20) | | |
| 21(ASP) | −64.658 | 0.950 | 1.697 | 55.460 |
| 22(ASP) | 25.790 | (d22) | | |
| 23(ASP) | 23.151 | 6.700 | 1.619 | 63.854 |
| 24(ASP) | −55.643 | 4.403 | | |
| 25 | ∞ | 0.300 | 1.5168 | 64.1664 |
| 26 | ∞ | 1.950 | | |
| 27 | ∞ | 0.500 | 1.5168 | 64.1664 |
| 28 | ∞ | 1.000 | | |
| IMG | ∞ | 0.000 | | |

In the zoom lens 2, both surfaces (a sixth surface and a seventh surface) of the fourth lens L4 of the second lens group G2, both surfaces (an 11st surface and a 12th surface) of the seventh lens L7 of the second lens group G2, both surfaces (a 14th surface and a 15th surface) of the eighth lens L8 of the third lens group G3, both surfaces (a 19th surface and a 20th surface) of the 11st lens L11 of the third lens group G3, both surfaces (a 21st surface and a 22nd surface) of the 12th lens L12 of the fourth lens group G4, and both surfaces (a 23rd surface and 24th surface) of the 13th lens L13 of the fifth lens group G5 are formed as an aspherical surface. The fourth, sixth, eighth, and 10th order aspherical surface coefficients A4, A6, A8, and A10 along with the conic constants κ of the aspherical surfaces in the numerical example 2 are shown in Table 5.

TABLE 5

| SURFACE NUMBER | κ | A | B | C | D |
|---|---|---|---|---|---|
| s6 | 0.00000E+00 | −2.75812E−05 | 2.91614E−07 | −1.41906E−09 | 2.03175E−12 |
| s7 | 0.00000E+00 | −5.14648E−05 | 1.99850E−08 | 8.37245E−10 | 3.01957E−11 |
| s11 | 0.00000E+00 | 1.90001E−05 | 1.74336E−07 | −1.90465E−09 | 0.00000E+00 |
| s12 | 0.00000E+00 | −1.95880E−05 | 1.72613E−09 | −2.23415E−09 | 0.00000E+00 |
| s14 | 0.00000E+00 | −3.62335E−05 | 1.03012E−07 | −3.50669E−09 | 2.45123E−11 |
| s15 | 0.00000E+00 | 1.38299E−05 | 1.12930E−07 | −3.96021E−09 | 3.06444E−11 |
| s19 | 0.00000E+00 | −3.80443E−05 | 8.52088E−08 | −4.24643E−09 | 1.41913E−11 |
| s20 | 0.00000E+00 | 1.22701E−05 | 1.69010E−07 | −4.50441E−09 | 1.17494E−11 |
| s21 | 0.00000E+00 | 6.44216E−05 | −2.11076E−07 | −3.53459E−09 | 2.28899E−11 |
| s22 | 0.00000E+00 | 6.47971E−05 | −3.96005E−07 | 7.88268E−10 | −1.33499E−11 |

TABLE 5-continued

| SURFACE NUMBER | κ | A | B | C | D |
|---|---|---|---|---|---|
| s23 | 0.00000E+00 | 4.21143E−05 | −9.96603E−09 | 3.65241E−10 | 4.47630E−12 |
| s24 | 0.00000E+00 | 1.30790E−04 | −5.52051E−07 | 3.40903E−09 | −2.62197E−12 |

The focal lengths f, the open f-numbers Fno and the half angles of view ω and the variable distances of an entire lens system in the numerical example 2 are shown in Table 6.

TABLE 6

| SURFACE NUMBER | WIDE ANGLE END | INTERMEDIATE FOCAL LENGTH | TELEPHOTO END |
|---|---|---|---|
| f | 9.255 | 24.802 | 66.298 |
| Fno | 2.921 | 2.924 | 2.894 |
| ω | 41.161 | 16.807 | 6.388 |
| d5 | 1.850 | 19.096 | 40.838 |
| d12 | 24.084 | 9.885 | 4.784 |
| d20 | 2.978 | 7.172 | 7.416 |
| d22 | 6.786 | 16.187 | 25.835 |

Figure 6:
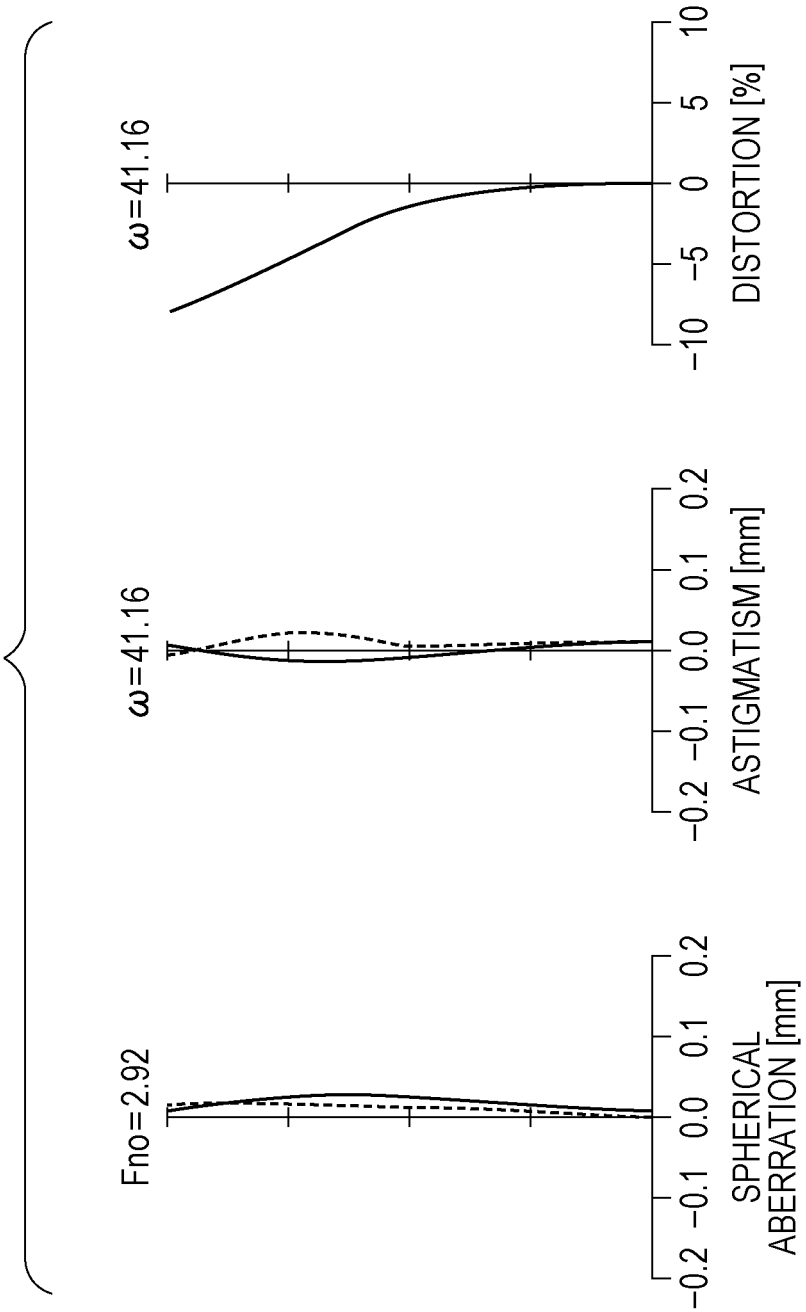
FIG. 6 is a diagram illustrating spherical aberration, astigmatism and distortion at a wide angle end in a numerical example obtained by applying specific numerical values to the second embodiment.
Figure 7:
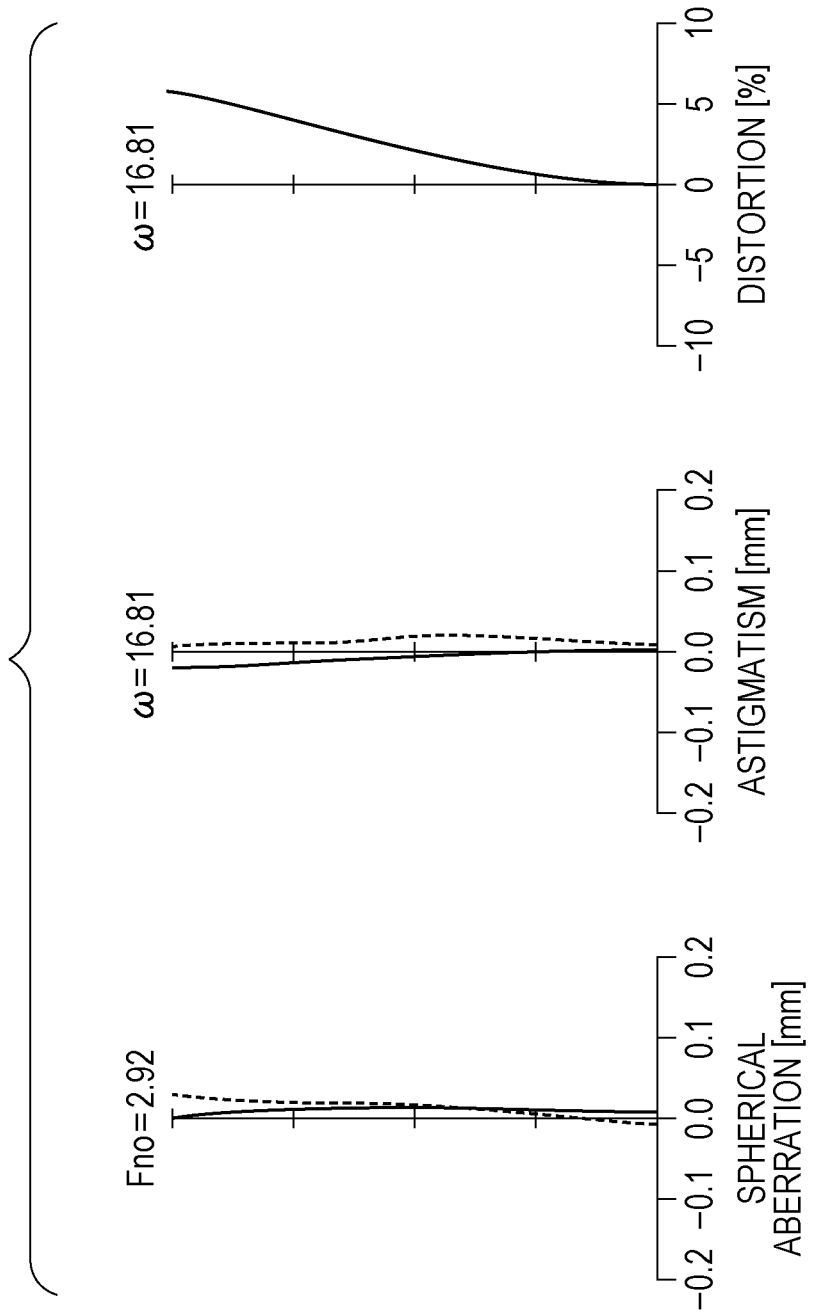
FIG. 7 is a diagram illustrating spherical aberration, astigmatism and distortion at an intermediate focal length in a numerical example obtained by applying specific numerical values to the second embodiment.
Figure 8:
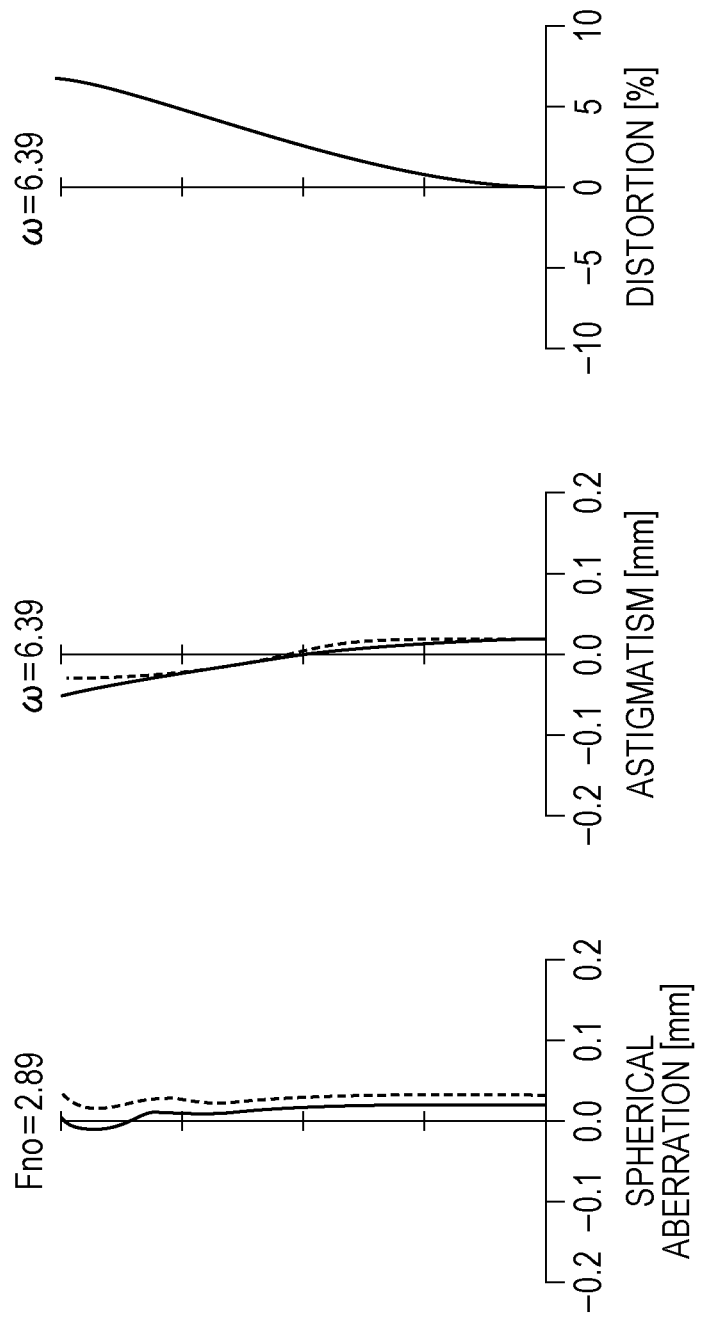
FIG. 8 is a diagram illustrating spherical aberration, astigmatism and distortion at a telephoto end in a numerical example obtained by applying specific numerical values to the second embodiment.

FIG. 6 illustrates spherical aberration, astigmatism and distortion at a wide angle end in the numerical example 2, FIG. 7 illustrates spherical aberration, astigmatism and distortion at an intermediate focal length in the numerical example 2, and FIG. 8 illustrates spherical aberration, astigmatism and distortion at a telephoto end in the numerical example 2.

In FIGS. 6 to 8, in the spherical aberration, a solid line represents a value of a d-line (587.56 nm) and a dashed line represents a value of a g-line (435.84 nm); in the astigmatism, a solid line represents a value of a sagittal image plane of a d-line and a dashed line represents a value of a meridional image plane of a d-line; and in the distortion, a solid line represents a value of the d-line.

From the aberration diagrams, in the numerical example 2, it is apparent that aberrations are well corrected and an excellent image forming performance is achieved, and high resolution performance is realized while securing miniaturization, a high zoom ratio and a large aperture ratio.

Third Embodiment

Figure 9:
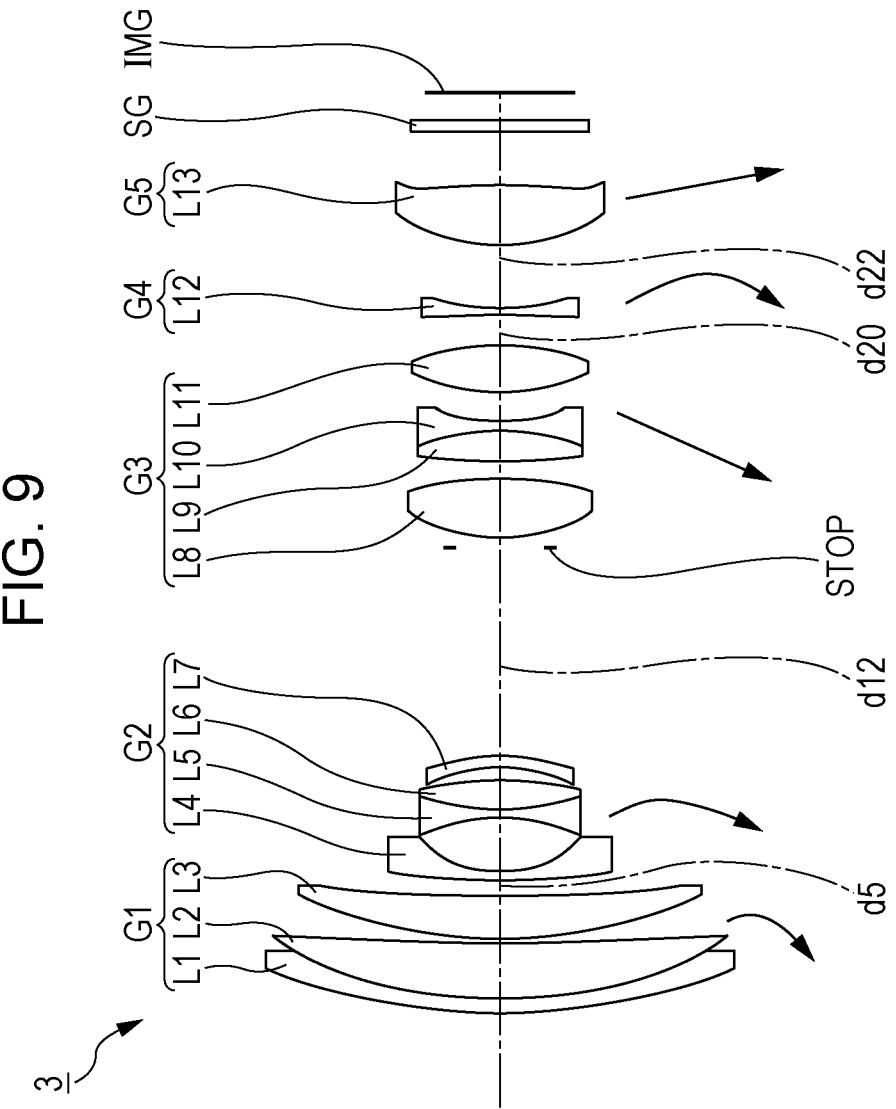
FIG. 9 is a diagram illustrating a lens configuration according to a third embodiment of a zoom lens.

FIG. 9 is a diagram illustrating a lens configuration of a zoom lens 3 according to a third embodiment of the present technology.

The zoom lens 3 has a zoom ratio of 7.2.

The zoom lens 3 has 13 lenses, and is configured with a first lens group G1 having positive refractive power, a second lens group G2 having negative refractive power, a third lens group G3 having positive refractive power, a fourth lens group G4 having negative refractive power, and a fifth lens group G5 having positive refractive power, which are arranged in order from an object side to an image side.

In the zoom lens 3, during zooming, the first lens group G1, the second lens group G2, the third lens group G3, the fourth lens group G4, and the fifth lens group G5 are moved in an optical axis direction. At the telephoto end rather than at the wide-angle end, the first lens group G1, the second lens group G2, the third lens group G3, and the fourth lens group G4 are moved to be located on the object side, and the fifth lens group G5 is moved to be located on the image side.

The zoom lens 3 is a focusing lens group which performs focusing from infinity to the close range by the fourth lens group G4 being moved in the optical axis direction during focusing.

The first lens group G1 is configured with a cemented lens formed by joining a first lens L1 having negative refractive power and a meniscus shape facing a convex surface toward the object side and a second lens L2 having positive refractive power and a convex surface facing the object side, and a third lens L3 having positive refractive power and a meniscus shape facing a convex surface toward the object side, which are arranged in order from the object side to the image side.

The second lens group G2 is configured with a fourth lens L4 having negative refractive power and a concave surface facing the image side, a cemented lens formed by joining a fifth lens L5 having negative refractive power and a bi-concave shape and a sixth lens L6 having positive refractive power and a bi-convex shape, and a seventh lens L7 having negative refractive power and a concave surface facing the object side, which are arranged in order from the object side to the image side.

The third lens group G3 is configured with an eighth lens L8 having positive refractive power and a bi-convex shape, a cemented lens formed by joining a ninth lens L9 having positive refractive power and a bi-convex shape and a 10th lens L10 having negative refractive power and a bi-concave shape, and an 11st lens L11 having positive refractive power and a bi-convex shape, which are arranged in order from the object side to the image side.

The fourth lens group G4 is configured with only a 12th lens L12 having negative refractive power and a bi-concave shape.

The fifth lens group G5 is configured with only a 13th lens L13 having positive refractive power and a bi-convex shape.

An image plane IMG is disposed on an image side of the fifth lens group G5. A cover glass SG is disposed between the fifth lens group G5 and the image plane IMG.

A diaphragm STOP is disposed between the second lens group G2 and the third lens group G3. During zooming, the diaphragm STOP is moved integrally with the third lens group G3 in the optical axis direction. During zooming, a bright open f-number similar to that at the wide-angle end is secured even at the telephoto end by setting the diameter of the diaphragm STOP to be larger at the telephoto end rather than at the wide-angle end.

The 11st lens L11 which is located on the most image side of the third lens group is displaced in a direction perpendicular to the optical axis direction, and thus a vibration reduction function is realized.

Table 7 shows lens data of a numerical example 3 obtained by applying specific numerical values to the zoom lens 3 according to the third embodiment.

TABLE 7

| SURFACE NUMBER | R | D | Nd | vd |
|---|---|---|---|---|
| 1 | 66.939 | 1.300 | 1.847 | 23.784 |
| 2 | 46.735 | 6.430 | 1.497 | 81.607 |
| 3 | 760.633 | 0.200 | | |
| 4 | 52.448 | 4.520 | 1.618 | 63.395 |
| 5 | 189.265 | (d5) | | |
| 6(ASP) | 169.668 | 0.800 | 1.820798 | |
| 7(ASP) | 11.963 | 5.761 | | |
| 8 | −18.065 | 0.800 | 1.713 | 53.938 |
| 9 | 22.438 | 3.088 | 1.92286 | 20.880 |
| 10 | −34.434 | 1.506 | | |
| 11 | −15.064 | 0.960 | 1.846664 | 23.784 |
| 12 | −24.632 | (d12) | | |
| 13(STOP) | ∞ | 1.000 | | |
| 14(ASP) | 16.345 | 6.200 | 1.58913 | 61.250 |
| 15(ASP) | −36.229 | 1.915 | | |
| 16 | 44.388 | 3.255 | 1.593493 | 67.001 |
| 17 | −23.297 | 1.000 | 1.8061 | 33.269 |
| 18 | 17.727 | 3.134 | | |
| 19(ASP) | 19.341 | 5.018 | 1.618806 | 63.854 |
| 20(ASP) | −26.006 | (d20) | | |
| 21(ASP) | −124.664 | 0.950 | 1.696799 | 55.460 |
| 22(ASP) | 24.475 | (d22) | | |
| 23(ASP) | 24.011 | 6.191 | 1.618806 | 63.854 |
| 24(ASP) | −66.227 | (d24) | | |
| 25 | ∞ | 0.800 | 1.5168 | 64.1664 |
| 26 | ∞ | 2.950 | | |
| IMG | ∞ | 0.000 | | |

In the zoom lens 3, both surfaces (a sixth surface and a seventh surface) of the fourth lens L4 of the second lens group G2, both surfaces (an 14th surface and a 15th surface) of the eighth lens L8 of the third lens group G3, both surfaces (a 19th surface and a 20th surface) of the 11st lens L11 of the third lens group G3, both surfaces (a 21st surface and a 22nd surface) of the 12th lens L12 of the fourth lens group G4, and both surfaces (a 23rd surface and 24th surface) of the 13th lens L13 of the fifth lens group G5 are formed as an aspherical surface. The fourth, sixth, eighth, and 10th order aspherical surface coefficients A4, A6, A8, and A10 along with the conic constants κ of the aspherical surfaces in the numerical example 3 are shown in Table 8.

TABLE 8

| SURFACE NUMBER | κ | A | B | C | D |
|---|---|---|---|---|---|
| s6 | 0.00000E+00 | 9.94203E−07 | 3.23768E−07 | −1.82147E−09 | 4.28594E−12 |
| s7 | 0.00000E+00 | −3.54280E−05 | 2.32200E−07 | 2.50114E−09 | 1.29333E−11 |
| s14 | 0.00000E+00 | −3.51039E−05 | 1.05491E−07 | −3.12515E−09 | 2.31633E−11 |
| s15 | 0.00000E+00 | 1.36309E−05 | 1.40143E−07 | −3.79144E−09 | 3.06209E−11 |
| s19 | 0.00000E+00 | −3.58715E−05 | 1.20498E−07 | −3.33625E−09 | 1.49397E−11 |
| s20 | 0.00000E+00 | 1.49444E−05 | 1.51744E−07 | −3.17160E−09 | 1.23302E−11 |
| s21 | 0.00000E+00 | 5.76922E−05 | −3.30627E−07 | −5.52421E−10 | 2.75632E−11 |
| s22 | 0.00000E+00 | 5.66406E−05 | −3.55355E−07 | 9.20819E−10 | 2.57746E−11 |
| s23 | 0.00000E+00 | 3.04019E−05 | −6.79836E−08 | 1.11977E−09 | 5.92608E−12 |
| s24 | 0.00000E+00 | 1.00160E−04 | −4.92497E−07 | 3.72115E−09 | 5.97608E−12 |

The focal lengths f, the open f-numbers Fno and the half angles of view ω and the variable distances of an entire lens system in the numerical example 3 are shown in Table 9.

TABLE 9

| SURFACE NUMBER | WIDE ANGLE END | INTERMEDIATE FOCAL LENGTH | TELEPHOTO END |
|---|---|---|---|
| f | 9.255 | 24.758 | 66.297 |
| Fno | 2.876 | 2.855 | 2.955 |
| ω | 41.160 | 16.754 | 6.383 |
| d5 | 1.800 | 19.124 | 39.585 |
| d12 | 22.532 | 9.096 | 4.784 |
| d20 | 2.978 | 8.167 | 8.085 |
| d22 | 6.786 | 15.242 | 26.269 |
| d24 | 6.072 | 5.155 | 3.500 |

Figure 10:
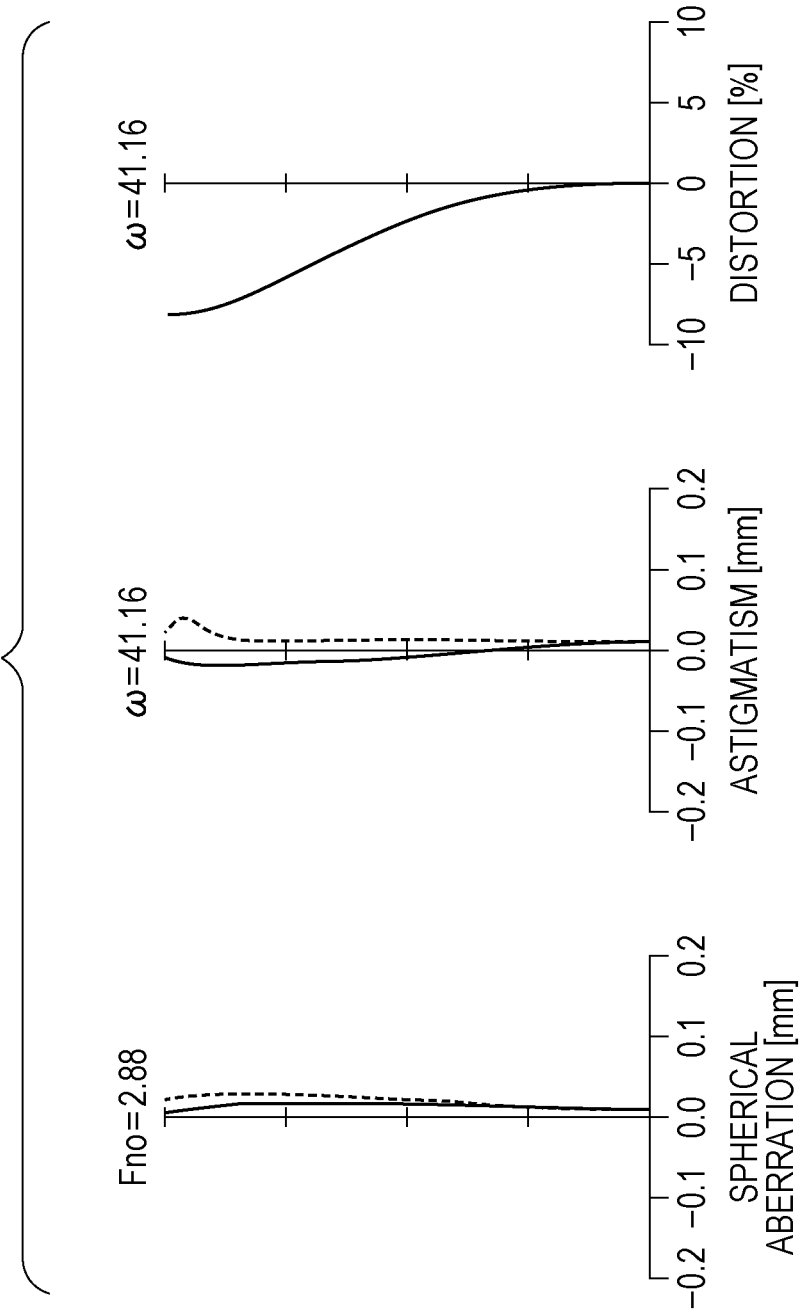
FIG. 10 is a diagram illustrating spherical aberration, astigmatism and distortion at a wide angle end in a numerical example obtained by applying specific numerical values to the third embodiment.
Figure 11:
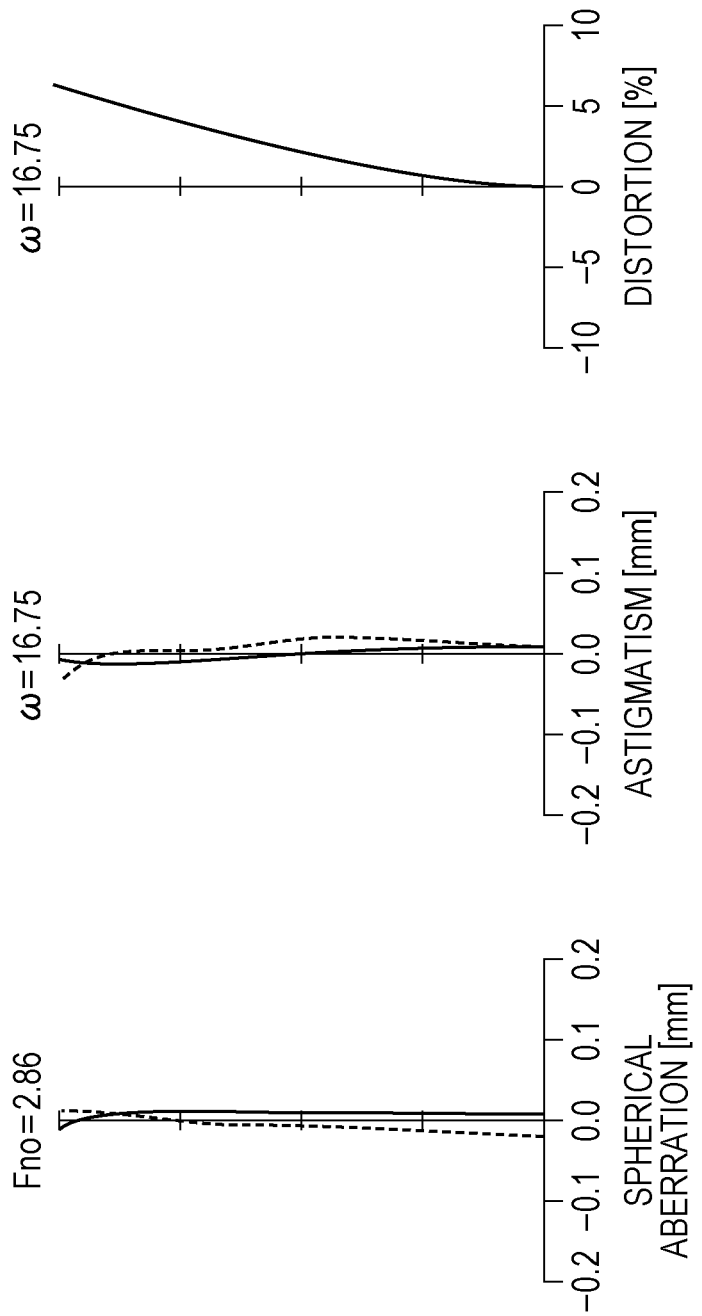
FIG. 11 is a diagram illustrating spherical aberration, astigmatism and distortion at an intermediate focal length in a numerical example obtained by applying specific numerical values to the third embodiment.
Figure 12:
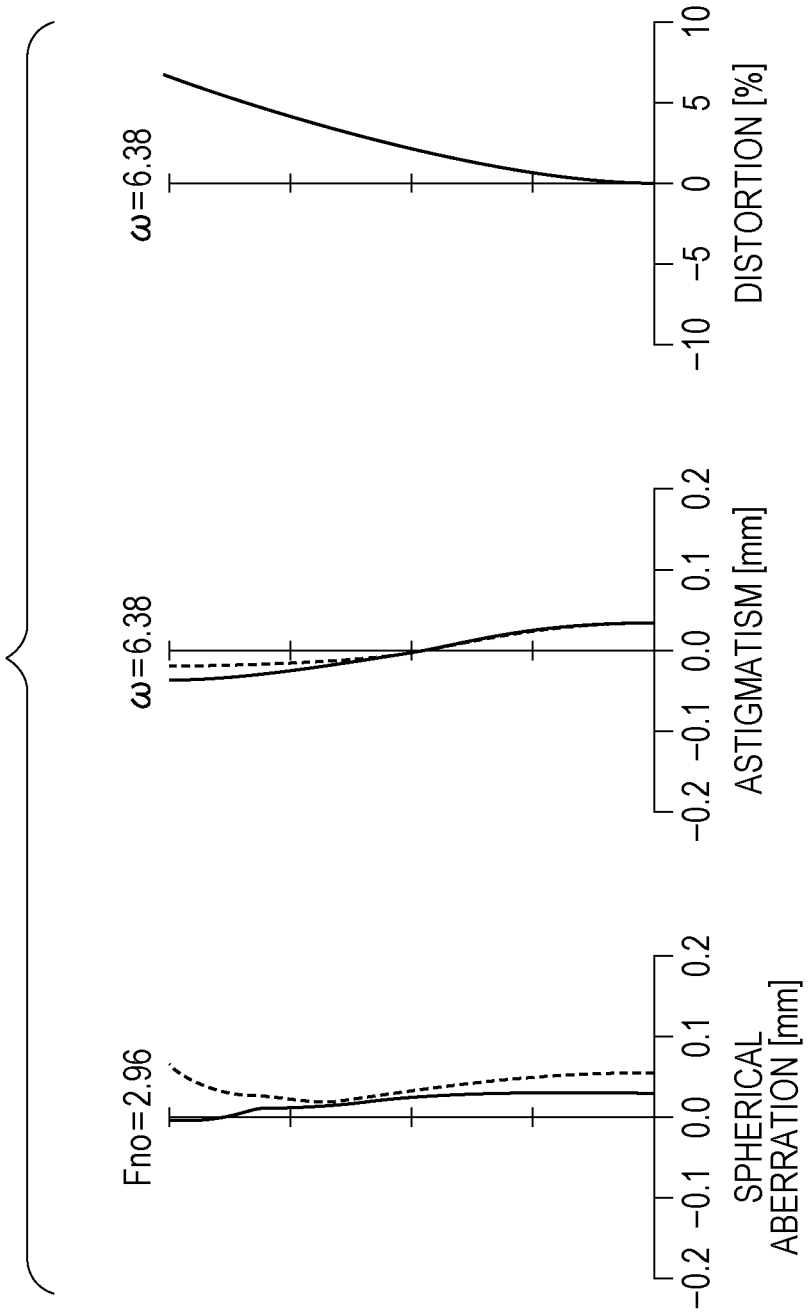
FIG. 12 is a diagram illustrating spherical aberration, astigmatism and distortion at a telephoto end in a numerical example obtained by applying specific numerical values to the third embodiment.

FIG. 10 illustrates spherical aberration, astigmatism and distortion at a wide angle end in the numerical example 3, FIG. 11 illustrates spherical aberration, astigmatism and distortion at an intermediate focal length in the numerical example 3, and FIG. 12 illustrates spherical aberration, astigmatism and distortion at a telephoto end in the numerical example 3.

In FIGS. 10 to 12, in the spherical aberration, a solid line represents a value of a d-line (587.56 nm) and a dashed line represents a value of a g-line (435.84 nm); in the astigmatism, a solid line represents a value of a sagittal image plane of a d-line and a dashed line represents a value of a meridional image plane of a d-line; and in the distortion, a solid line represents a value of the d-line.

From the aberration diagrams, in the numerical example 3, it is apparent that aberrations are well corrected and an excellent image forming performance is achieved, and high resolution performance is realized while securing miniaturization, a high zoom ratio and a large aperture ratio.

Fourth Embodiment

Figure 13:
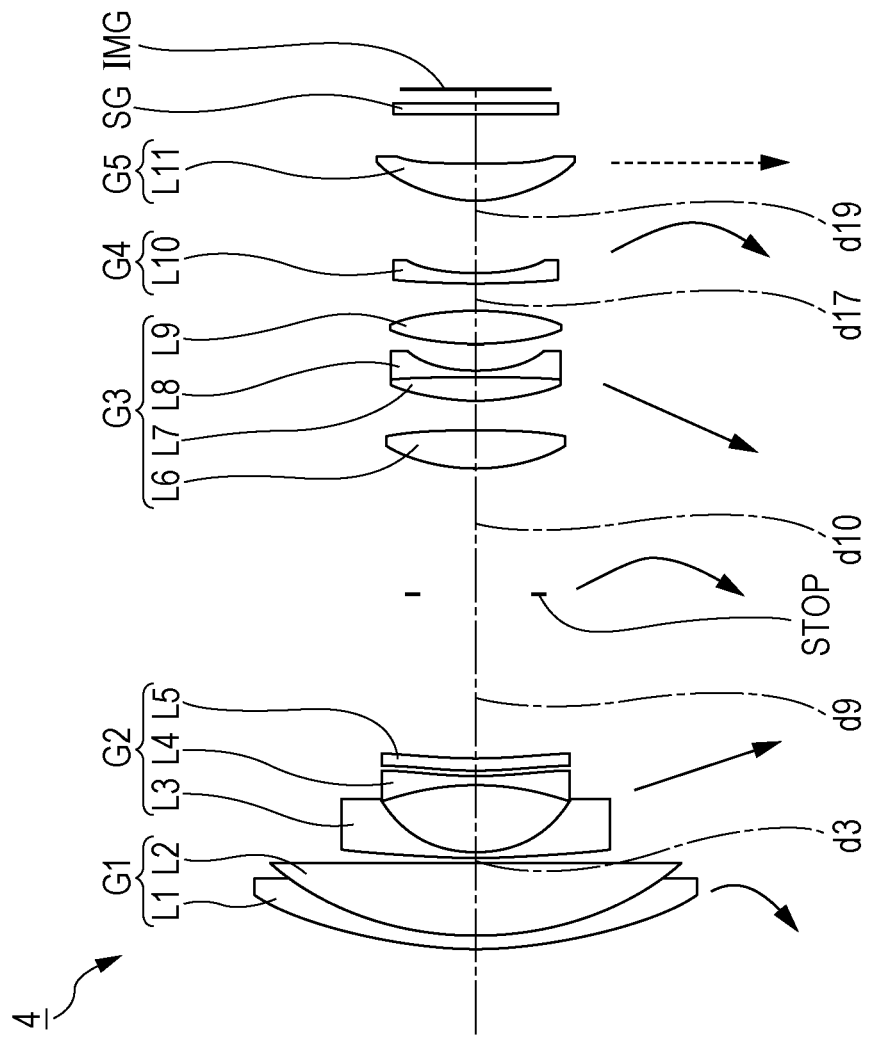
FIG. 13 is a diagram illustrating a lens configuration according to a fourth embodiment of a zoom lens.

FIG. 13 is a diagram illustrating a lens configuration of a zoom lens 4 according to a fourth embodiment of the present technology.

The zoom lens 4 has a zoom ratio of 7.1. The zoom lens 4 has 11 lenses, and is configured with a first lens group G1 having positive refractive power, a second lens group G2 having negative refractive power, a third lens group G3 having positive refractive power, a fourth lens group G4 having negative refractive power, and a fifth lens group G5 having positive refractive power, which are arranged in order from an object side to an image side.

In the zoom lens 4, during zooming, the first lens group G1, the second lens group G2, the third lens group G3, and the fourth lens group G4 are moved in an optical axis direction. At the telephoto end rather than at the wide-angle end, the first lens group G1, the third lens group G3, and the fourth lens group G4 are moved to be located on the object side, and second lens group G2 is moved to be located on the image side.

The zoom lens 4 is a focusing lens group which performs focusing from infinity to the close range by the fourth lens group G4 being moved in the optical axis direction during focusing.

The first lens group G1 is configured with a cemented lens formed by joining a first lens L1 having negative refractive power and a meniscus shape facing a convex surface toward the object side and a second lens L2 having positive refractive power and a convex surface facing the object side, in which the first lens L1 is located on the object side and the second lens L2 is located on the image side.

The second lens group G2 is configured with a third lens L3 having negative refractive power and a concave surface facing the image side, a fourth lens L4 having negative refractive power and a bi-concave shape, and a fifth lens L5 having positive refractive power and a convex surface facing the object side, which are arranged in order from the object side to the image side.

The third lens group G3 is configured with a sixth lens L6 having positive refractive power and a bi-convex shape, a cemented lens formed by joining a seventh lens L7 having positive refractive power and a bi-convex shape and an eighth lens L8 having negative refractive power and a bi-concave shape, and a ninth lens L9 having positive refractive power and a bi-convex shape, which are arranged in order from the object side to the image side.

The fourth lens group G4 is configured with only a 10th lens L10 having negative refractive power and a bi-concave shape.

The fifth lens group G5 is configured with only an 11th lens L11 having positive refractive power and a convex surface facing the object side.

An image plane IMG is disposed on an image side of the fifth lens group G5. A cover glass SG is disposed between the fifth lens group G5 and the image plane IMG.

A diaphragm STOP is disposed between the second lens group G2 and the third lens group G3. During zooming, the diaphragm STOP is moved in the optical axis direction independently of the third lens group G3.

The whole of the third lens group is displaced in a direction perpendicular to the optical axis direction, and thus a vibration reduction function is realized.

Table 10 shows lens data of a numerical example 4 obtained by applying specific numerical values to the zoom lens 4 according to the fourth embodiment.

TABLE 10

| SURFACE NUMBER | R | D | Nd | vd |
|---|---|---|---|---|
| 1 | 29.746 | 0.850 | 1.923 | 20.880 |
| 2 | 21.732 | 4.750 | 1.729 | 54.041 |
| 3(ASP) | 1314.144 | (d3) | | |
| 4(ASP) | 274.205 | 0.450 | 1.755 | 51.157 |
| 5(ASP) | 7.894 | 4.745 | | |
| 6 | −15.677 | 0.400 | 1.773 | 49.624 |
| 7 | 31.966 | 0.200 | | |
| 8(ASP) | 16.996 | 1.359 | 2.002 | 19.325 |
| 9(ASP) | 85.901 | (d9) | | |
| 10(STOP) | ∞ | (d10) | | |
| 11(ASP) | 11.139 | 2.599 | 1.729 | 54.041 |
| 12(ASP) | −35.341 | 2.052 | | |
| 13 | 20.078 | 1.401 | 1.593 | 67.001 |
| 14 | −95.181 | 0.500 | 1.805 | 25.456 |
| 15 | 8.665 | 1.804 | | |
| 16 | 17.268 | 2.100 | 1.697 | 55.459 |
| 17 | −19.840 | (d17) | | |
| 18(ASP) | −37.242 | 0.450 | 1.583 | 59.460 |
| 19(ASP) | 17.444 | (d19) | | |
| 20(ASP) | 8.911 | 2.570 | 1.592 | 67.022 |
| 21 | 42.250 | 3.422 | | |
| 22 | ∞ | 0.500 | 1.517 | 64.166 |
| 23 | ∞ | 1.000 | | |
| IMG | ∞ | 0.000 | | |

In the zoom lens 4, a surface (a third surface) on the image side of the second lens L2 of the first lens group G1, both surfaces (a fourth surface and a fifth surface) of the third lens L3 of the second lens group G2, both surfaces (an eighth surface and a ninth surface) of the fifth lens L5 of the second lens group G2, both surfaces (an 11st surface and a 12th surface) of the sixth lens L6 of the third lens group G3, both surfaces (an 18th surface and a 19th surface) of the 10th lens L10 of the fourth lens group G4, and a surface (a 20th surface) on the object side of the 11th lens L11 of the fifth lens group G5 are formed as an aspherical surface. The fourth, sixth, eighth, and 10th order aspherical surface coefficients A4, A6, A8, and A10 along with the conic constants κ of the aspherical surfaces in the numerical example 4 are shown in Table 11.

TABLE 11

| SURFACE NUMBER | κ | A | B | C | D |
|---|---|---|---|---|---|
| s3 | 0.00000E+00 | 2.01934E−06 | 3.89475E−10 | −3.13694E−12 | 0.00000E+00 |
| s4 | 0.00000E+00 | 2.40239E−04 | −2.07101E−06 | 6.18404E−10 | 2.58343E−11 |
| s5 | 0.00000E+00 | 1.13479E−04 | 1.39574E−06 | 1.47253E−07 | −9.53399E−10 |
| s8 | 0.00000E+00 | −3.90414E−04 | −1.87861E−06 | 1.81159E−07 | −6.43740E−09 |
| s9 | 0.00000E+00 | −2.73664E−04 | −3.68670E−06 | 1.34485E−07 | −4.75132E−09 |
| s11 | 0.00000E+00 | −7.94057E−05 | 4.02527E−07 | −9.87611E−09 | 1.37889E−11 |
| s12 | 0.00000E+00 | 1.14951E−04 | 4.73934E−07 | −2.06274E−08 | 1.68531E−10 |
| s18 | 0.00000E+00 | 9.29981E−04 | −1.37884E−05 | 9.10604E−08 | 3.03935E−10 |
| s19 | 0.00000E+00 | 8.55116E−04 | −4.22516E−06 | 0.00000E+00 | 0.00000E+00 |
| s20 | 0.00000E+00 | −2.15895E−04 | 5.00992E−06 | −5.09437E−08 | 5.24808E−10 |

The focal lengths f, the open f-numbers Fno and the half angles of view ω and the variable distances of an entire lens system in the numerical example 4 are shown in Table 12.

TABLE 12

| SURFACE NUMBER | WIDE ANGLE END | INTERMEDIATE FOCAL LENGTH | TELEPHOTO END |
|---|---|---|---|
| f | 5.781 | 15.463 | 41.250 |
| Fno | 1.849 | 3.021 | 3.558 |
| ω | 40.699 | 16.583 | 6.336 |
| d3 | 0.400 | 10.477 | 21.888 |
| d9 | 10.728 | 6.824 | 1.500 |
| d10 | 8.500 | 0.000 | 0.000 |
| d17 | 2.000 | 7.209 | 9.440 |
| d19 | 4.994 | 4.530 | 6.738 |

Figure 14:
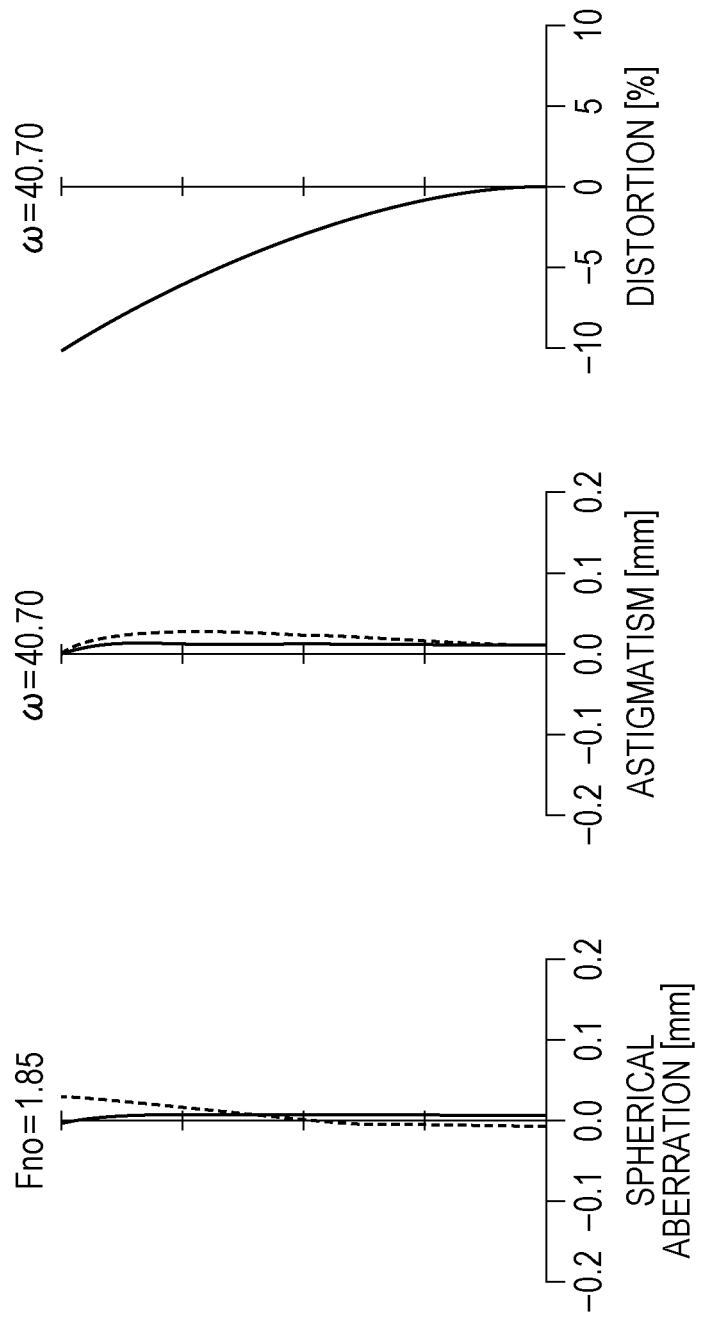
FIG. 14 is a diagram illustrating spherical aberration, astigmatism and distortion at a wide angle end in a numerical example obtained by applying specific numerical values to the fourth embodiment.
Figure 15:
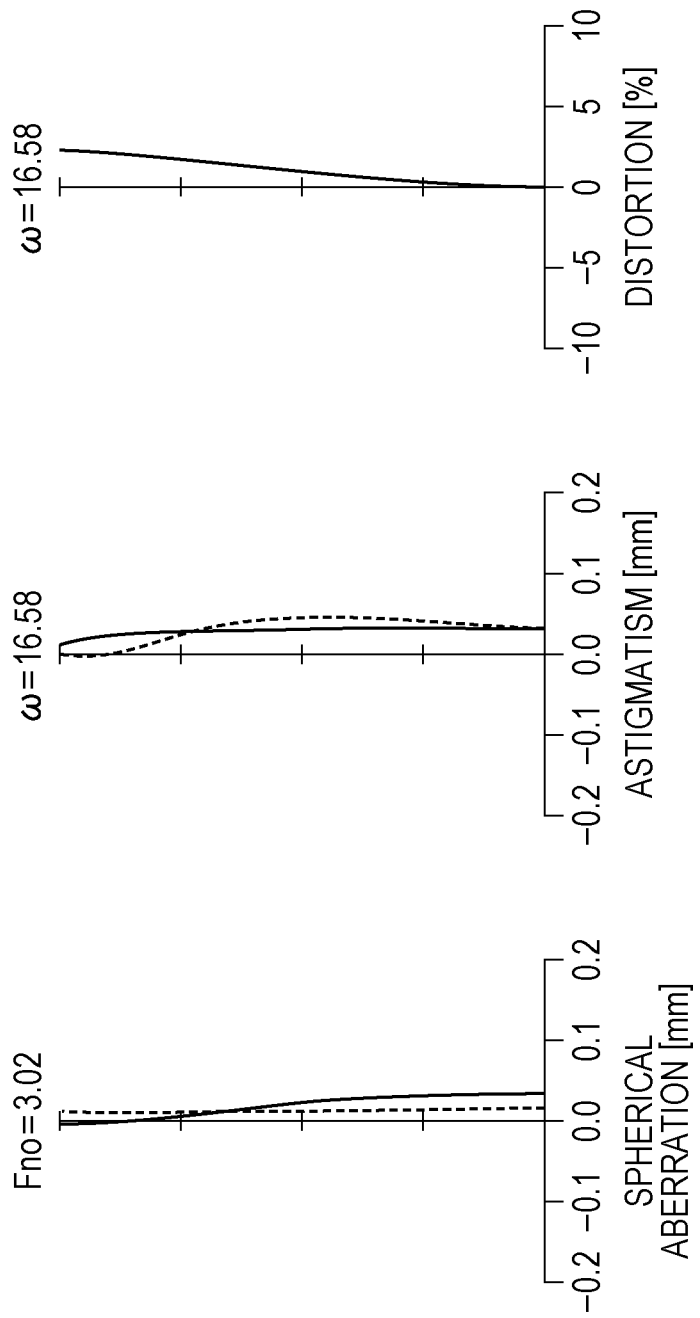
FIG. 15 is a diagram illustrating spherical aberration, astigmatism and distortion at an intermediate focal length in a numerical example obtained by applying specific numerical values to the fourth embodiment.
Figure 16:
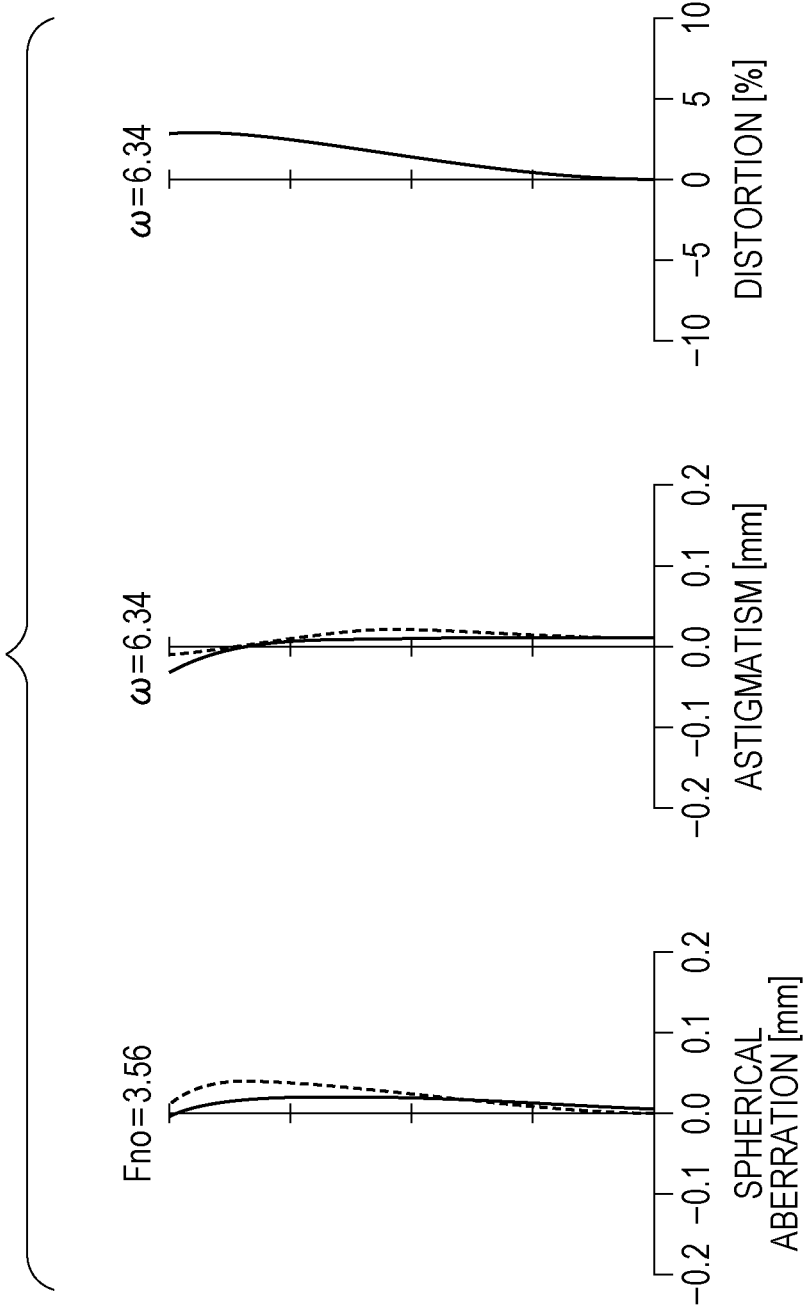
FIG. 16 is a diagram illustrating spherical aberration, astigmatism and distortion at a telephoto end in a numerical example obtained by applying specific numerical values to the fourth embodiment.

FIG. 14 illustrates spherical aberration, astigmatism and distortion at a wide angle end in the numerical example 4, FIG. 15 illustrates spherical aberration, astigmatism and distortion at an intermediate focal length in the numerical example 4, and FIG. 16 illustrates spherical aberration, astigmatism and distortion at a telephoto end in the numerical example 4.

In FIGS. 14 to 16, in the spherical aberration, a solid line represents a value of a d-line (587.56 nm) and a dashed line represents a value of a g-line (435.84 nm); in the astigmatism, a solid line represents a value of a sagittal image plane of a d-line and a dashed line represents a value of a meridional image plane of a d-line; and in the distortion, a solid line represents a value of the d-line.

From the aberration diagrams, in the numerical example 4, it is apparent that aberrations are well corrected and an excellent image forming performance is achieved, and high resolution performance is realized while securing miniaturization, a high zoom ratio and a large aperture ratio.

Fifth Embodiment

Figure 17:
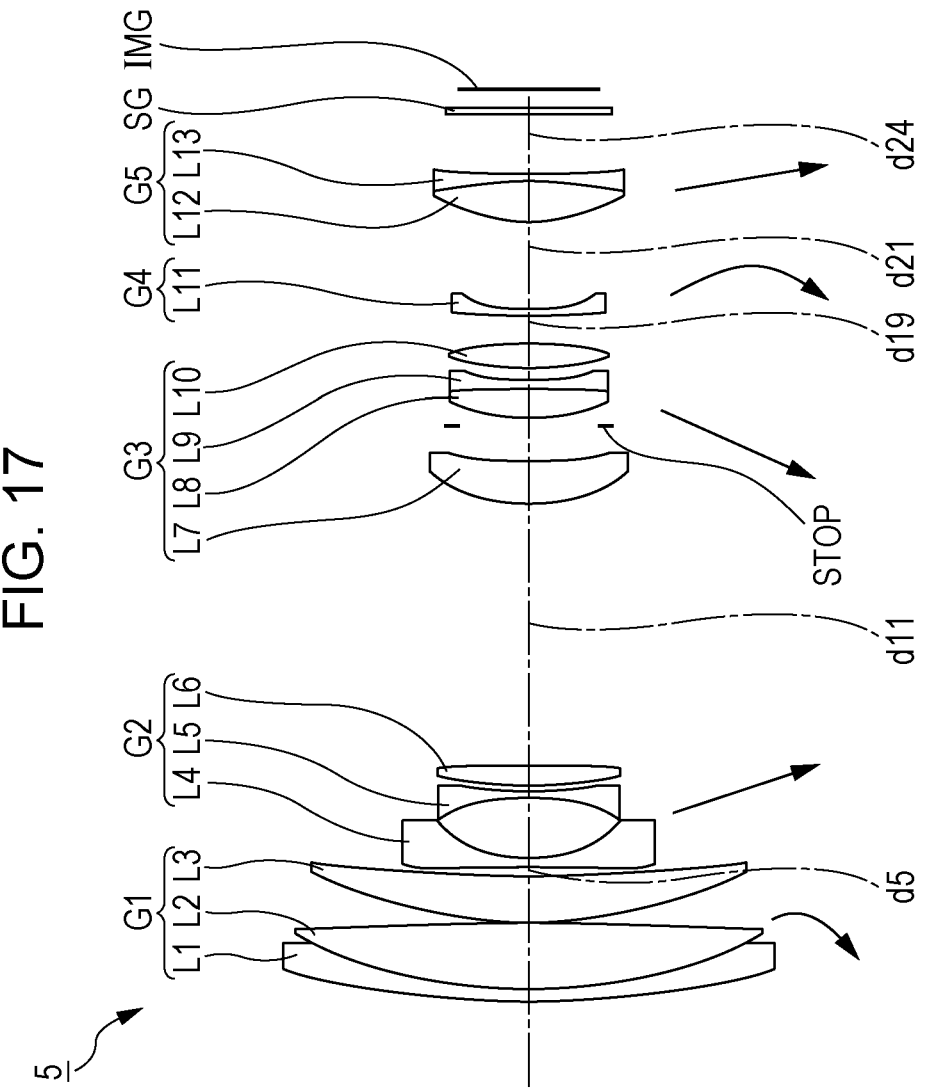
FIG. 17 is a diagram illustrating a lens configuration according to a fifth embodiment of a zoom lens.

FIG. 17 is a diagram illustrating a lens configuration of a zoom lens 5 according to a fifth embodiment of the present technology.

The zoom lens 5 has a zoom ratio of 8.8.

The zoom lens 5 has 13 lenses, and is configured with a first lens group G1 having positive refractive power, a second lens group G2 having negative refractive power, a third lens group G3 having positive refractive power, a fourth lens group G4 having negative refractive power, and a fifth lens group G5 having positive refractive power, which are arranged in order from an object side to an image side.

In the zoom lens 5, during zooming, the first lens group G1, the second lens group G2, the third lens group G3, the fourth lens group G4, and the fifth lens group G5 are moved in an optical axis direction. At the telephoto end rather than at the wide-angle end, the first lens group G1, the third lens group G3, and the fourth lens group G4 are moved to be located on the object side, and the second lens group G2 and the fifth lens group G5 are moved to be located on the image side.

The zoom lens 5 is a focusing lens group which performs focusing from infinity to the close range by the fourth lens group G4 being moved in the optical axis direction during focusing.

The first lens group G1 is configured with a cemented lens formed by joining a first lens L1 having negative refractive power and a meniscus shape facing a convex surface toward the object side and a second lens L2 having positive refractive power and a bi-convex shape, and a third lens L3 having positive refractive power and a meniscus shape facing a convex surface toward the object side, which are arranged in order from the object side to the image side.

The second lens group G2 is configured with a fourth lens L4 having negative refractive power and a bi-concave shape, a fifth lens L5 having negative refractive power, and a bi-concave shape, and a sixth lens L6 having positive refractive power and a bi-convex shape, which are arranged in order from the object side to the image side.

The third lens group G3 is configured with a seventh lens L7 having positive refractive power and a convex surface facing the object side, a cemented lens formed by joining an eighth lens L8 having positive refractive power and a bi-convex shape and a ninth lens L9 having negative refractive power and a bi-concave shape, and a 10th lens L10 having positive refractive power and a bi-convex shape, which are arranged in order from the object side to the image side.

The fourth lens group G4 is configured with only an 11st lens L11 having negative refractive power and a concave surface facing the image side.

The fifth lens group G5 is configured with a cemented lens formed by joining a 12th lens L12 having positive refractive power and a bi-convex shape and a 13th lens L13 having negative refractive power and a bi-concave shape, the 12th lens L12 is located on the object side and the 13th lens L13 is located on the image side.

An image plane IMG is disposed on an image side of the fifth lens group G5. A cover glass SG is disposed between the fifth lens group G5 and the image plane IMG.

A diaphragm STOP is disposed between the seventh lens L7 and the eighth lens L8 of the third lens group G3. During zooming, the diaphragm STOP is moved integrally with the third lens group G3 in the optical axis direction.

The 10th lens L10 which is located on the most image side of the third lens group is displaced in a direction perpendicular to the optical axis direction, and thus a vibration reduction function is realized.

Table 13 shows lens data of a numerical example 5 obtained by applying specific numerical values to the zoom lens 5 according to the fifth embodiment.

TABLE 13

| SURFACE NUMBER | R | D | Nd | νd |
|---|---|---|---|---|
| 1 | 62.872 | 0.800 | 1.847 | 23.784 |
| 2 | 34.099 | 4.450 | 1.593 | 68.623 |
| 3 | −285.110 | 0.150 | | |
| 4 | 33.005 | 3.000 | 1.697 | 55.459 |
| 5 | 108.345 | (d5) | | |
| 6(ASP) | −240.224 | 0.450 | 1.773 | 49.466 |
| 7(ASP) | 8.675 | 4.392 | | |
| 8 | −11.132 | 0.400 | 1.773 | 49.624 |
| 9 | 44.068 | 0.200 | | |
| 10(ASP) | 22.286 | 1.451 | 2.002 | 19.325 |
| 11(ASP) | −93.724 | (d11) | | |
| 12(ASP) | 12.118 | 2.900 | 1.755 | 51.157 |
| 13(ASP) | 317.053 | 2.366 | | |
| 14(STOP) | ∞ | 0.550 | | |
| 15 | 12.492 | 1.720 | 1.593 | 67.001 |
| 16 | −177.579 | 0.500 | 1.847 | 23.784 |
| 17 | 10.606 | 1.106 | | |
| 18(ASP) | 16.571 | 1.758 | 1.697 | 55.460 |
| 19(ASP) | −22.367 | (d19) | | |
| 20(ASP) | 53.438 | 0.350 | 1.619 | 63.854 |
| 21(ASP) | 9.864 | (d21) | | |

TABLE 13-continued

| SURFACE NUMBER | R | D | Nd | νd |
|---|---|---|---|---|
| 22(ASP) | 11.639 | 2.760 | 1.773 | 49.466 |
| 23 | −33.483 | 0.500 | 1.689 | 31.160 |
| 24 | 81.461 | (d24) | | |
| 25 | ∞ | 0.360 | 1.5168 | 64.1664 |
| 26 | ∞ | 1.201 | | |
| IMG | ∞ | 0.000 | | |

In the zoom lens 5, both surfaces (a sixth surface and a seventh surface) of the fourth lens L4 of the second lens group G2, both surfaces (a 10th surface and a 11st surface) of the sixth lens L6 of the second lens group G2, both surfaces (a 12th surface and a 13th surface) of the seventh lens L7 of the third lens group G3, both surfaces (an 18th surface and a 19th surface) of the 10th lens L10 of the third lens group G3, both surfaces (a 20th surface and a 21st surface) of the 11st lens L11 of the fourth lens group G4, and a surface (a 22nd surface) on the object side of the 12th lens L12 of the fifth lens group G5 are formed as an aspherical surface. The fourth, sixth, eighth, and 10th order aspherical surface coefficients A4, A6, A8, and A10 along with the conic constants κ of the aspherical surfaces in the numerical example 5 are shown in Table 14.

TABLE 14

| SURFACE NUMBER | κ | A | B | C | D |
|---|---|---|---|---|---|
| s6 | 0.00000E+00 | 1.45026E−04 | −6.98977E−07 | −3.59112E−09 | 5.22387E−11 |
| s7 | 0.00000E+00 | −9.74880E−07 | 6.20538E−07 | 3.21131E−08 | −2.48904E−10 |
| s10 | 0.00000E+00 | −1.37507E−04 | −1.40163E−07 | 6.25709E−08 | −5.42091E−10 |
| s11 | 0.00000E+00 | −3.64160E−05 | −1.02960E−06 | 4.62611E−08 | −1.16123E−10 |
| s12 | 0.00000E+00 | 1.83850E−05 | 2.75954E−06 | −7.28030E−08 | 2.29908E−09 |
| s13 | 0.00000E+00 | 1.45631E−04 | 3.66804E−06 | −1.09042E−07 | 3.72539E−09 |
| s18 | 0.00000E+00 | −5.87944E−05 | −2.56360E−06 | 1.13057E−07 | −2.45714E−09 |
| s19 | 0.00000E+00 | 3.89035E−05 | −2.59275E−06 | 1.21894E−07 | −2.52668E−09 |
| s20 | 0.00000E+00 | 1.77696E−04 | −2.82963E−06 | −3.38045E−09 | 1.30903E−11 |
| s21 | 0.00000E+00 | 1.63498E−04 | −1.20219E−06 | −1.78302E−08 | −2.05768E−10 |
| s22 | 0.00000E+00 | −5.54780E−05 | 1.25533E−06 | −1.34096E−08 | 7.35027E−11 |

The focal lengths f, the open f-numbers Fno and the half angles of view ω and the variable distances of an entire lens system in the numerical example 5 are shown in Table 15.

TABLE 15

| SURFACE NUMBER | WIDE ANGLE END | INTERMEDIATE FOCAL LENGTH | TELEPHOTO END |
|---|---|---|---|
| f | 5.866 | 17.498 | 51.770 |
| Fno | 1.702 | 2.205 | 2.638 |
| ω | 39.742 | 14.274 | 4.860 |
| d5 | 0.500 | 12.410 | 23.805 |
| d11 | 17.683 | 5.453 | 0.600 |
| d19 | 1.750 | 7.959 | 8.261 |
| d21 | 5.853 | 4.500 | 9.077 |
| d24 | 4.000 | 3.651 | 2.600 |

Figure 18:
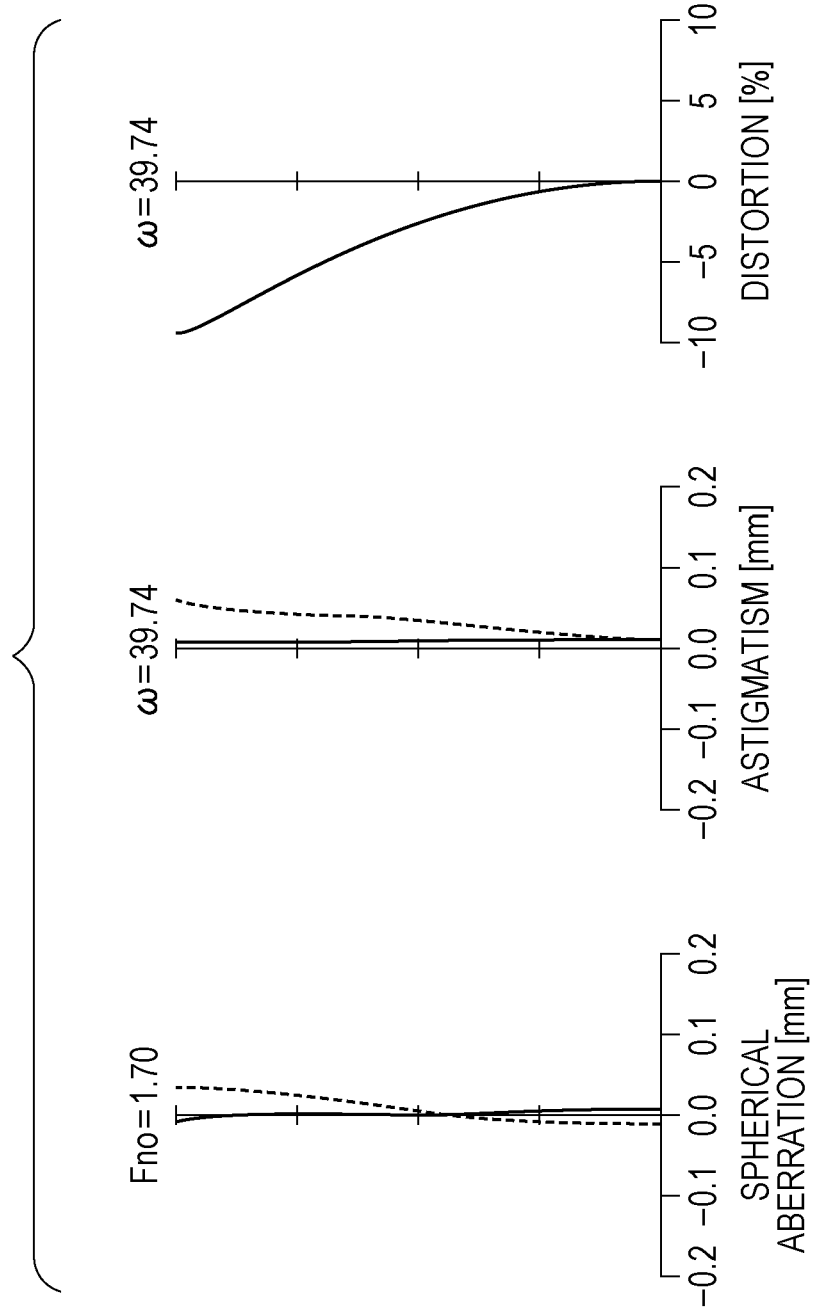
FIG. 18 is a diagram illustrating spherical aberration, astigmatism and distortion at a wide angle end in a numerical example obtained by applying specific numerical values to the fifth embodiment.
Figure 19:
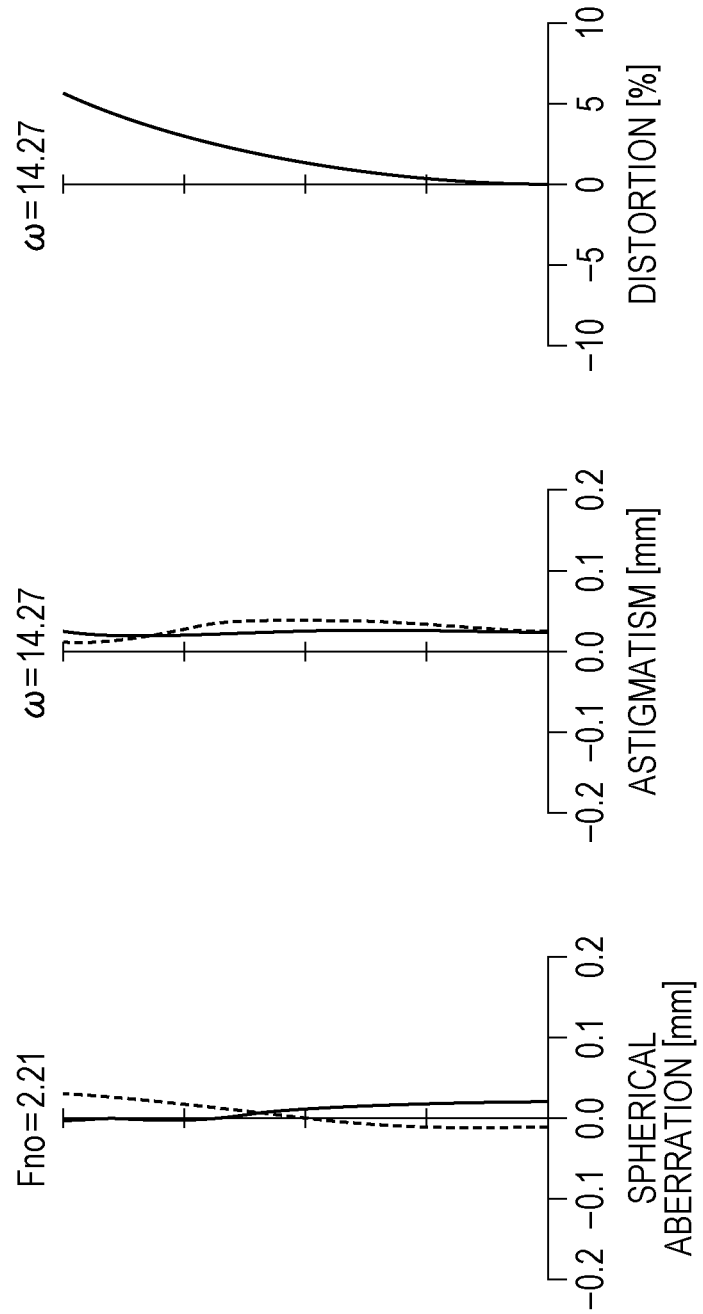
FIG. 19 is a diagram illustrating spherical aberration, astigmatism and distortion at an intermediate focal length in a numerical example obtained by applying specific numerical values to the fifth embodiment.
Figure 20:
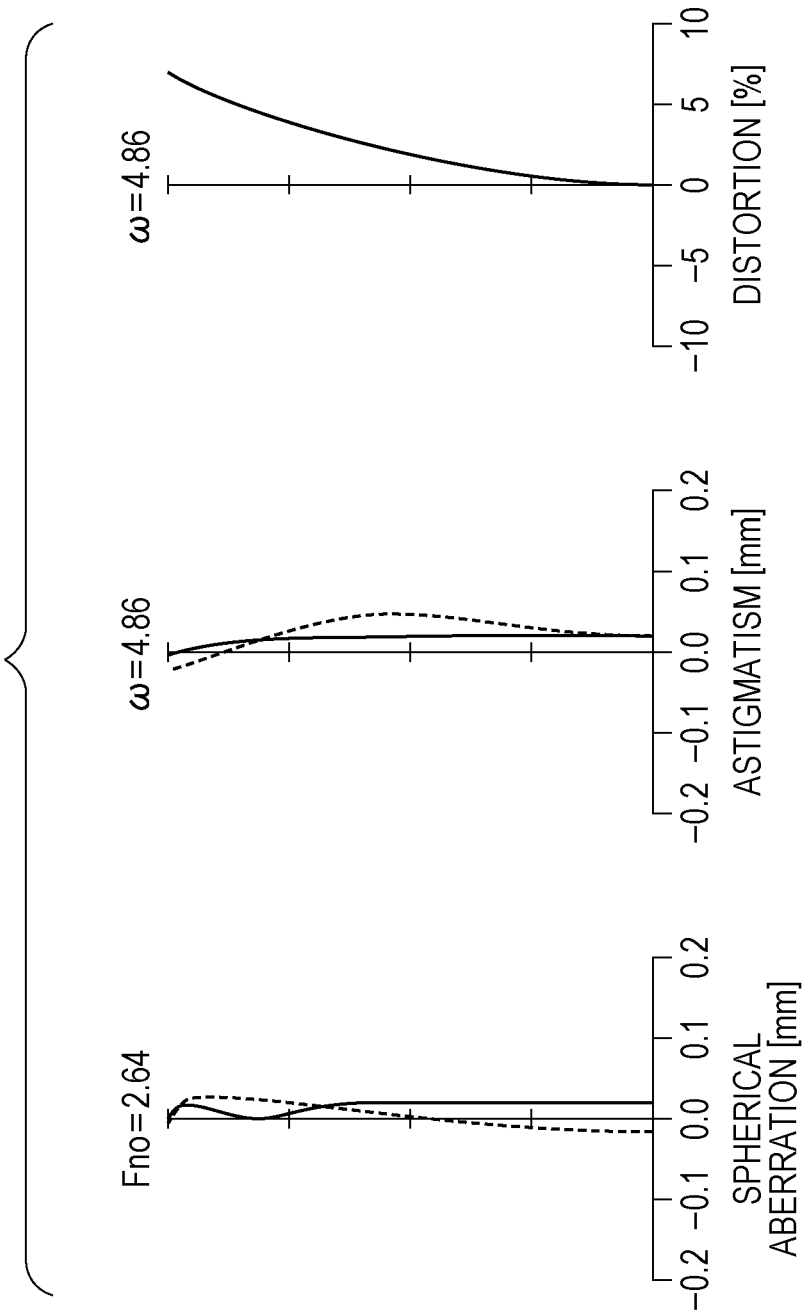
FIG. 20 is a diagram illustrating spherical aberration, astigmatism and distortion at a telephoto end in a numerical example obtained by applying specific numerical values to the fifth embodiment.

FIG. 18 illustrates spherical aberration, astigmatism and distortion at a wide angle end in the numerical example 5, FIG. 19 illustrates spherical aberration, astigmatism and distortion at an intermediate focal length in the numerical example 5, and FIG. 20 illustrates spherical aberration, astigmatism and distortion at a telephoto end in the numerical example 5.

In FIGS. 18 to 20, in the spherical aberration, a solid line represents a value of a d-line (587.56 nm) and a dashed line represents a value of a g-line (435.84 nm); in the astigmatism, a solid line represents a value of a sagittal image plane of a d-line and a dashed line represents a value of a meridional image plane of a d-line; and in the distortion, a solid line represents a value of the d-line.

From the aberration diagrams, in the numerical example 5, it is apparent that aberrations are well corrected and an excellent image forming performance is achieved, and high resolution performance is realized while securing miniaturization, a high zoom ratio and a large aperture ratio.

Sixth Embodiment

Figure 21:
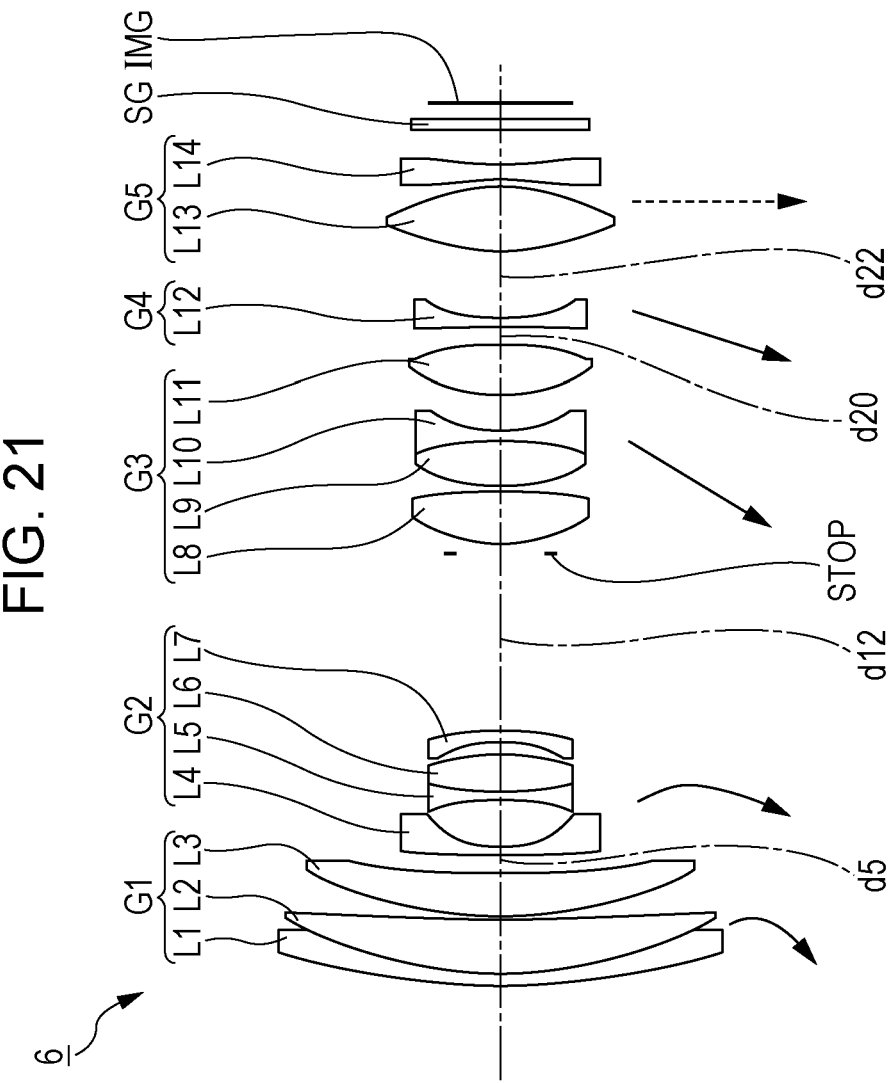
FIG. 21 is a diagram illustrating a lens configuration according to a sixth embodiment of a zoom lens.

FIG. 21 is a diagram illustrating a lens configuration of a zoom lens 6 according to a sixth embodiment of the present technology.

The zoom lens 6 has a zoom ratio of 7.3.

The zoom lens 6 has 14 lenses, and is configured with a first lens group G1 having positive refractive power, a second lens group G2 having negative refractive power, a third lens group G3 having positive refractive power, a fourth lens group G4 having negative refractive power, and a fifth lens group G5 having positive refractive power, which are arranged in order from an object side to an image side.

In the zoom lens 6, during zooming, the first lens group G1, the second lens group G2, the third lens group G3, and the fourth lens group G4 are moved in an optical axis direction. At the telephoto end rather than at the wide-angle end, the first lens group G1, the second lens group G2, the third lens group G3, and the fourth lens group G4 are moved to be located on the object side.

The zoom lens 6 is a focusing lens group which performs focusing from infinity to the close range by the fourth lens group G4 being moved in the optical axis direction during focusing.

The first lens group G1 is configured with a cemented lens formed by joining a first lens L1 having negative refractive power and a meniscus shape facing a convex surface toward the object side and a second lens L2 having positive refractive power and a convex surface facing the object side, and a third lens L3 having positive refractive power and a meniscus shape facing a convex surface toward the object side, which are arranged in order from the object side to the image side.

The second lens group G2 is configured with a fourth lens L4 having negative refractive power and a concave surface facing the image side, a cemented lens formed by joining a fifth lens L5 having negative refractive power and a bi-concave shape and a sixth lens L6 having positive refractive power and a bi-convex shape, and a seventh lens L7 having negative refractive power and a concave surface facing the object side, which are arranged in order from the object side to the image side.

The third lens group G3 is configured with an eighth lens L8 having positive refractive power and a bi-convex shape, a cemented lens formed by joining a ninth lens L9 having positive refractive power and a bi-convex shape and a 10th lens L10 having negative refractive power and a bi-concave shape, and an 11st lens L11 having positive refractive power and a bi-convex shape, which are arranged in order from the object side to the image side.

The fourth lens group G4 is configured with only a 12th lens L12 having negative refractive power and a bi-concave shape.

The fifth lens group G5 is configured with a 13th lens L13 having positive refractive power and a bi-convex shape, and a 14th lens L14 having negative refractive power and a bi-concave shape, which are arranged in order from the object side to the image side.

An image plane IMG is disposed on an image side of the fifth lens group G5. A cover glass SG is disposed between the fifth lens group G5 and the image plane IMG.

A diaphragm STOP is disposed between the second lens group G2 and the third lens group G3. During zooming, the diaphragm STOP is moved integrally with the third lens group G3 in the optical axis direction.

The 11st lens L11 which is located on the most image side of the third lens group is displaced in a direction perpendicular to the optical axis direction, and thus a vibration reduction function is realized.

Table 16 shows lens data of a numerical example 6 obtained by applying specific numerical values to the zoom lens 6 according to the sixth embodiment.

TABLE 16

| SURFACE NUMBER | R | D | Nd | ν d |
|---|---|---|---|---|
| 1 | 77.312 | 1.250 | 1.847 | 23.784 |
| 2 | 48.338 | 6.320 | 1.497 | 81.607 |
| 3 | 2007.501 | 0.200 | | |
| 4 | 46.401 | 4.834 | 1.729 | 54.673 |
| 5 | 152.532 | (d5) | | |
| 6(ASP) | 174.594 | 0.800 | 1.801 | 45.449 |
| 7(ASP) | 9.816 | 5.500 | | |
| 8 | −21.708 | 0.650 | 1.729 | 54.673 |
| 9 | 47.353 | 4.000 | 2.003 | 19.317 |
| 10 | −23.616 | 1.500 | | |
| 11(ASP) | −16.981 | 1.000 | 1.821 | 24.058 |
| 12(ASP) | −50.992 | (d12) | | |
| 13(STOP) | ∞ | 1.000 | | |
| 14(ASP) | 18.082 | 6.062 | 1.592 | 67.022 |
| 15(ASP) | −38.553 | 0.400 | | |
| 16 | 20.539 | 5.000 | 1.487 | 70.440 |
| 17 | −32.928 | 0.900 | 1.8061 | 33.269 |
| 18 | 15.977 | 4.000 | | |
| 19(ASP) | 17.129 | 5.512 | 1.58913 | 61.250 |
| 20(ASP) | −24.910 | (d20) | | |
| 21(ASP) | −68.409 | 1.000 | 1.768 | 49.241 |
| 22(ASP) | 29.536 | (d22) | | |
| 23(ASP) | 24.468 | 7.000 | 1.592 | 67.022 |
| 24(ASP) | −17.331 | 0.800 | | |
| 25(ASP) | −63.389 | 1.500 | 1.622625 | 58.1632 |
| 26 | 50.251 | 3.141 | | |
| 27 | ∞ | 0.300 | 1.5168 | 64.1664 |
| 28 | ∞ | 1.950 | | |
| 29 | ∞ | 0.500 | 1.5168 | 64.1664 |
| 30 | ∞ | 1.000 | | |
| IMG | ∞ | 0.000 | | |

In the zoom lens 6, both surfaces (a sixth surface and a seventh surface) of the fourth lens L4 of the second lens group G2, both surfaces (an 11st surface and a 12th surface) of the seventh lens L7 of the second lens group G2, both surfaces (a 14th surface and a 15th surface) of the eighth lens L8 of the third lens group G3, both surfaces (a 19th surface and a 20th surface) of the 11st lens L11 of the third lens group G3, both surfaces (a 21st surface and a 22nd surface) of the 12th lens L12 of the fourth lens group G4, both surfaces (a 23rd surface and 24th surface) of the 13th lens L13 of the fifth lens group G5 and a surface (a 25th surface) on the object side of the 14th lens L14 of the fifth lens group G5 are formed as an aspherical surface. The fourth, sixth, eighth, and 10th order aspherical surface coefficients A4, A6, A8, and A10 along with the conic constants κ of the aspherical surfaces in the numerical example 6 are shown in Table 17.

TABLE 17

| SURFACE NUMBER | κ | A | B | C | D |
|---|---|---|---|---|---|
| s6 | 0.00000E+00 | −2.66020E−05 | 3.29081E−07 | −1.12876E−09 | 0.00000E+00 |
| s7 | 0.00000E+00 | −6.50679E−05 | −1.30441E−07 | −1.73854E−09 | 9.23251E−11 |
| s11 | 0.00000E+00 | −9.01424E−05 | 1.33075E−06 | −7.17060E−09 | 0.00000E+00 |
| s12 | 0.00000E+00 | −1.06626E−04 | 1.30123E−06 | −8.78104E−09 | 0.00000E+00 |
| s14 | 0.00000E+00 | −2.36702E−05 | 1.54639E−07 | −6.54825E−10 | 1.71169E−11 |
| s15 | 0.00000E+00 | 8.61180E−06 | 2.24677E−07 | −1.44566E−09 | 2.78724E−11 |
| s19 | 0.00000E+00 | −4.12728E−05 | 2.42216E−07 | −4.63225E−09 | 4.64580E−11 |
| s20 | 0.00000E+00 | 2.27294E−05 | 3.96807E−07 | −6.95096E−09 | 6.32197E−11 |
| s21 | 0.00000E+00 | 1.31220E−04 | −1.10068E−06 | 8.04805E−09 | −2.99846E−11 |
| s22 | 0.00000E+00 | 1.50908E−04 | −1.17720E−06 | 1.06289E−08 | −4.67027E−11 |
| s23 | 0.00000E+00 | 1.24812E−05 | −4.66830E−08 | −1.83263E−09 | 3.65679E−12 |
| s24 | 0.00000E+00 | 1.53778E−04 | −1.05316E−06 | 4.89448E−09 | −8.21349E−12 |
| s25 | 0.00000E+00 | 6.75552E−07 | −1.59128E−07 | 3.42309E−09 | 9.12806E−13 |

The focal lengths f, the open f-numbers Fno and the half angles of view ω and the variable distances of an entire lens system in the numerical example 6 are shown in Table 18.

TABLE 18

| SURFACE NUMBER | WIDE ANGLE END | INTERMEDIATE FOCAL LENGTH | TELEPHOTO END |
|---|---|---|---|
| f | 9.290 | 25.182 | 68.274 |
| Fno | 2.912 | 2.912 | 2.913 |
| ω | 41.286 | 16.739 | 6.357 |
| d5 | 1.920 | 18.022 | 37.208 |
| d12 | 19.872 | 8.534 | 4.000 |
| d20 | 2.001 | 4.343 | 3.606 |
| d22 | 7.497 | 21.840 | 32.630 |

Figure 22:
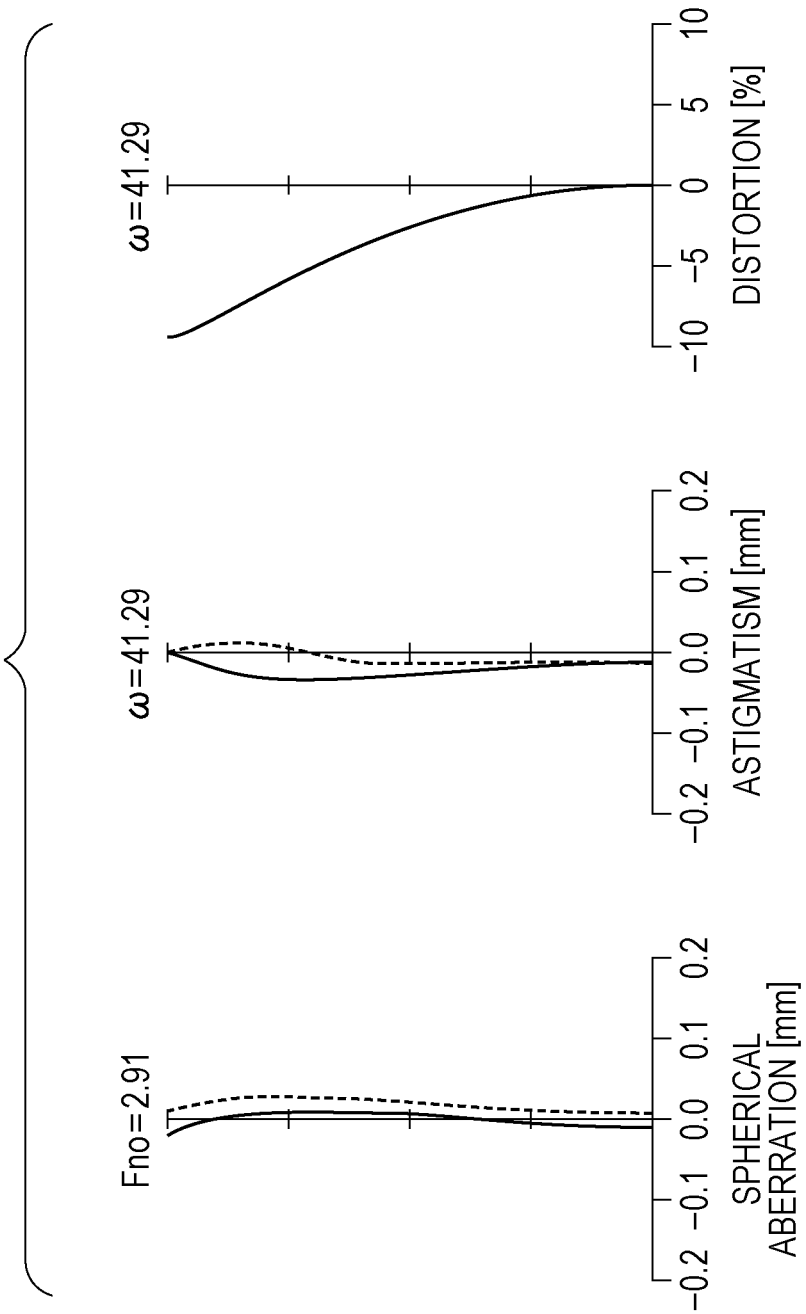
FIG. 22 is a diagram illustrating spherical aberration, astigmatism and distortion at a wide angle end in a numerical example obtained by applying specific numerical values to the sixth embodiment.
Figure 23:
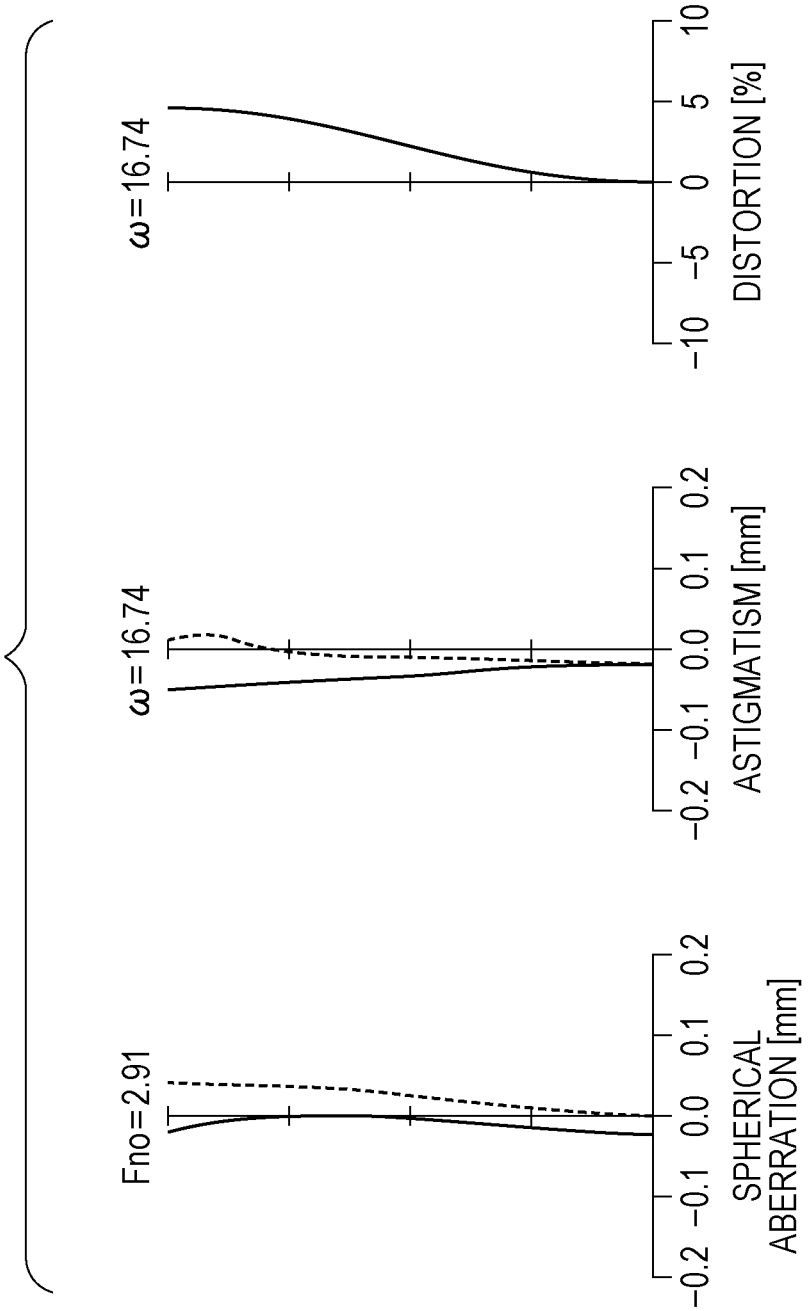
FIG. 23 is a diagram illustrating spherical aberration, astigmatism and distortion at an intermediate focal length in a numerical example obtained by applying specific numerical values to the sixth embodiment.
Figure 24:
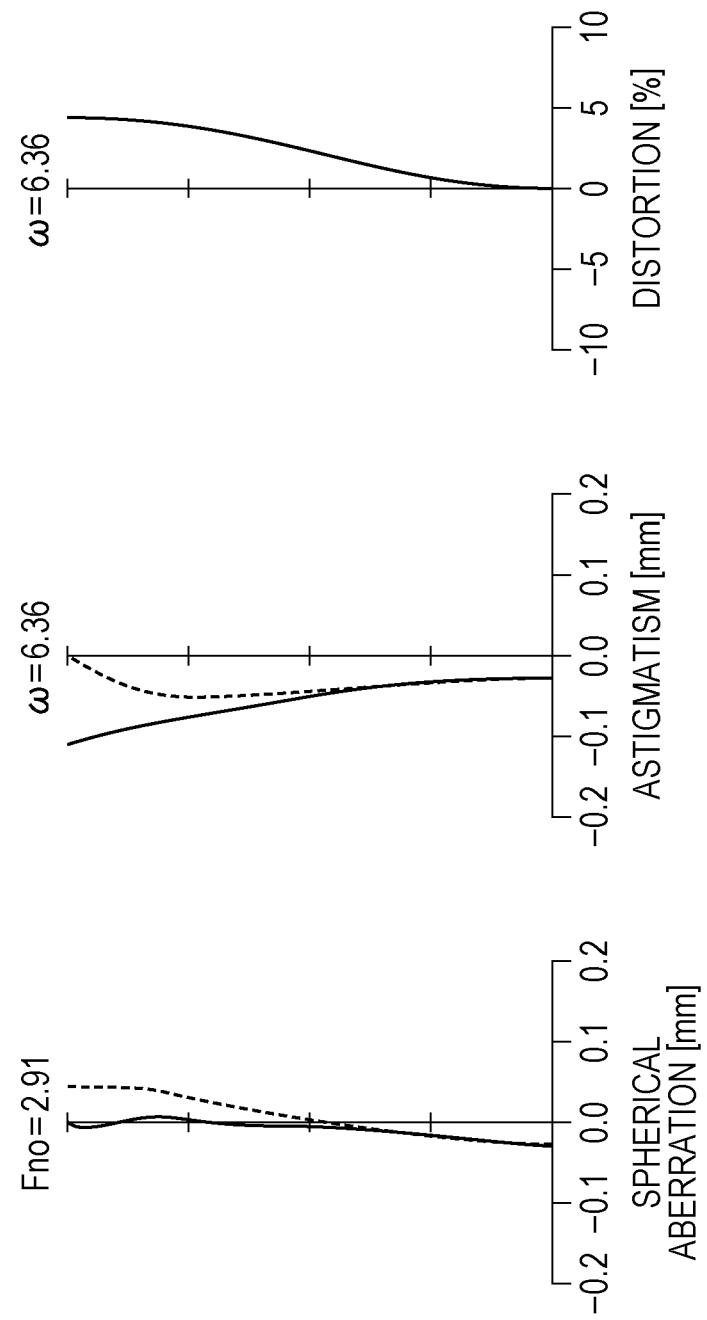
FIG. 24 is a diagram illustrating spherical aberration, astigmatism and distortion at a telephoto end in a numerical example obtained by applying specific numerical values to the sixth embodiment.

FIG. 22 illustrates spherical aberration, astigmatism and distortion at a wide angle end in the numerical example 6, FIG. 23 illustrates spherical aberration, astigmatism and distortion at an intermediate focal length in the numerical example 6, and FIG. 24 illustrates spherical aberration, astigmatism and distortion at a telephoto end in the numerical example 6.

In FIGS. 22 to 24, in the spherical aberration, a solid line represents a value of a d-line (587.56 nm) and a dashed line represents a value of a g-line (435.84 nm); in the astigmatism, a solid line represents a value of a sagittal image plane of a d-line and a dashed line represents a value of a meridional image plane of a d-line; and in the distortion, a solid line represents a value of the d-line.

From the aberration diagrams, in the numerical example 6, it is apparent that aberrations are well corrected and an excellent image forming performance is achieved, and high resolution performance is realized while securing miniaturization, a high zoom ratio and a large aperture ratio.

Seventh Embodiment

Figure 25:
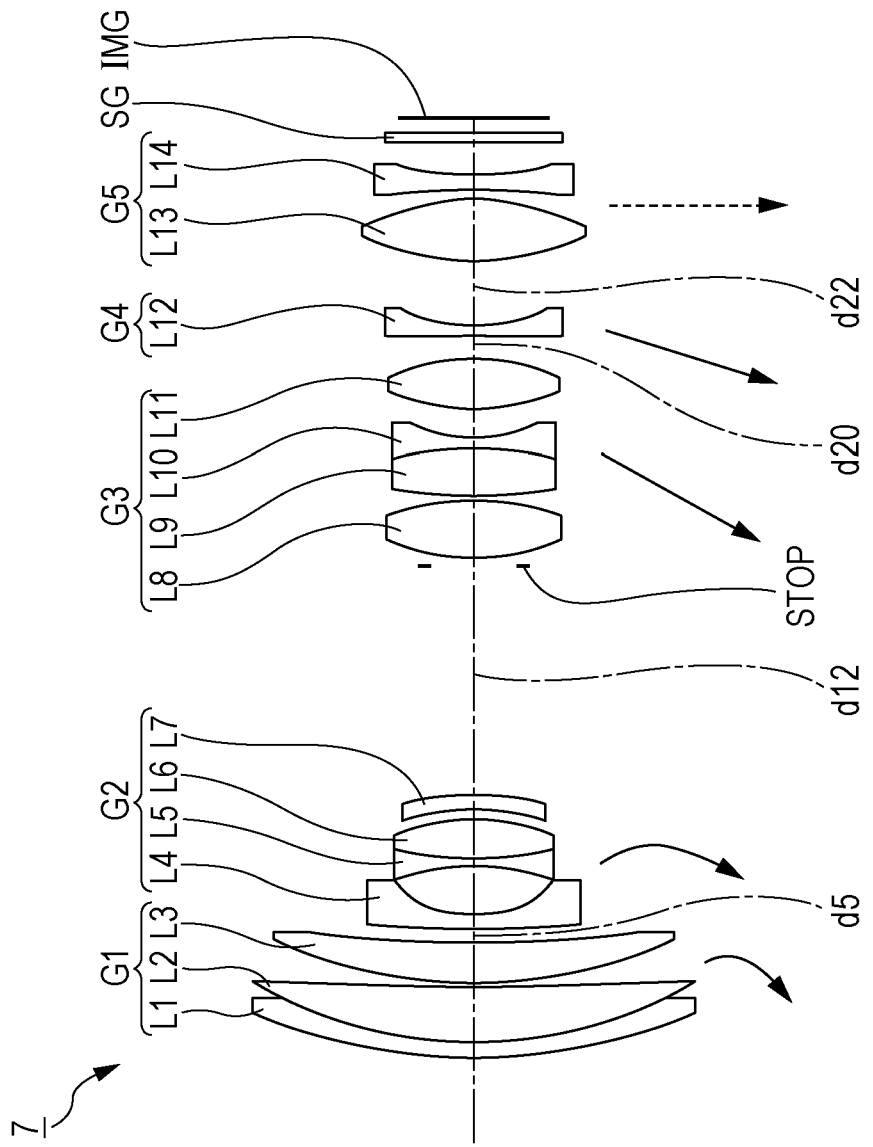
FIG. 25 is a diagram illustrating a lens configuration according to a seventh embodiment of a zoom lens.

FIG. 25 is a diagram illustrating a lens configuration of a zoom lens 7 according to a seventh embodiment of the present technology.

The zoom lens 7 has a zoom ratio of 7.0.

The zoom lens 7 has 13 lenses, and is configured with a first lens group G1 having positive refractive power, a second lens group G2 having negative refractive power, a third lens group G3 having positive refractive power, a fourth lens group G4 having negative refractive power, and a fifth lens group G5 having positive refractive power, which are arranged in order from an object side to an image side.

In the zoom lens 7, during zooming, the first lens group G1, the second lens group G2, the third lens group G3, and the fourth lens group G4 are moved in an optical axis direction. At the telephoto end rather than at the wide-angle end, the first lens group G1, the second lens group G2, the third lens group G3, and the fourth lens group G4 are moved to be located on the object side.

The zoom lens 7 is a focusing lens group which performs focusing from infinity to the close range by the fourth lens group G4 being moved in the optical axis direction during focusing.

The first lens group G1 is configured with a cemented lens formed by joining a first lens L1 having negative refractive power and a meniscus shape facing a convex surface toward the object side and a second lens L2 having positive refractive power and a convex surface facing the object side, and a third lens L3 having positive refractive power and a meniscus shape facing a convex surface toward the object side, which are arranged in order from the object side to the image side.

The second lens group G2 is configured with a fourth lens L4 having negative refractive power and a concave surface facing the image side, a cemented lens formed by joining a fifth lens L5 having negative refractive power and a bi-concave shape and a sixth lens L6 having positive refractive power and a bi-convex shape, and a seventh lens L7 having negative refractive power and a concave surface facing the object side, which are arranged in order from the object side to the image side.

The third lens group G3 is configured with an eighth lens L8 having positive refractive power and a bi-convex shape, a cemented lens formed by joining a ninth lens L9 having positive refractive power and a bi-convex shape and a 10th lens L10 having negative refractive power and a bi-concave shape, and an 11st lens L11 having positive refractive power and a bi-convex shape, which are arranged in order from the object side to the image side.

The fourth lens group G4 is configured with only a 12th lens L12 having negative refractive power and a bi-concave shape.

The fifth lens group G5 is configured with a 13th lens L13 having positive refractive power and a bi-convex shape and a 14th lens L14 having negative refractive power and a bi-concave shape, which are arranged in order from the object side to the image side.

An image plane IMG is disposed on an image side of the fifth lens group G5. A cover glass SG is disposed between the fifth lens group G5 and the image plane IMG.

A diaphragm STOP is disposed between the second lens group G2 and the third lens group G3. During zooming, the diaphragm STOP is moved integrally with the third lens group G3 in the optical axis direction.

The 11st lens L11 which is located on the most image side of the third lens group is displaced in a direction perpendicular to the optical axis direction, and thus a vibration reduction function is realized.

Table 19 shows lens data of a numerical example 7 obtained by applying specific numerical values to the zoom lens 7 according to the seventh embodiment.

TABLE 19

| SURFACE NUMBER | R | D | Nd | ν d |
|---|---|---|---|---|
| 1 | 63.103 | 1.300 | 1.847 | 23.784 |
| 2 | 46.489 | 6.400 | 1.497 | 81.607 |
| 3 | 570.000 | 0.200 | | |
| 4 | 49.720 | 4.500 | 1.593 | 67.001 |
| 5 | 149.486 | (d5) | | |
| 6(ASP) | 300.000 | 0.800 | 1.803 | 45.570 |
| 7(ASP) | 10.415 | 5.630 | | |
| 8 | −24.535 | 0.850 | 1.729 | 54.673 |
| 9 | 39.600 | 4.000 | 2.001 | 25.458 |
| 10 | −24.356 | 1.520 | | |
| 11(ASP) | −16.109 | 1.000 | 1.834 | 37.285 |
| 12(ASP) | −35.036 | (d12) | | |
| 13(STOP) | ∞ | 1.000 | | |
| 14(ASP) | 18.617 | 6.200 | 1.592 | 67.138 |
| 15(ASP) | −32.540 | 0.400 | | |
| 16 | 37.588 | 5.300 | 1.487 | 70.440 |
| 17 | −29.355 | 1.200 | 1.806 | 33.269 |
| 18 | 18.005 | 2.860 | | |
| 19(ASP) | 17.843 | 5.500 | 1.589 | 61.177 |
| 20(ASP) | −23.092 | (d20) | | |
| 21(ASP) | −87.000 | 0.820 | 1.168 | 49.241 |
| 22(ASP) | 26.061 | (d22) | | |
| 23(ASP) | 25.131 | 7.000 | 1.592 | 67.022 |
| 24(ASP) | −16.000 | 0.800 | | |

TABLE 19-continued

| SURFACE NUMBER | R | D | Nd | ν d |
|---|---|---|---|---|
| 25(ASP) | −102.890 | 1.500 | 1.619 | 63.533 |
| 26 | 36.750 | 2.630 | | |
| 27 | ∞ | 0.300 | 1.517 | 64.166 |
| 28 | ∞ | 1.950 | | |
| 29 | ∞ | 0.500 | 1.517 | 64.166 |
| 30 | ∞ | 1.000 | | |
| IMG | ∞ | 0.000 | | |

In the zoom lens 7, both surfaces (a sixth surface and a seventh surface) of the fourth lens L4 of the second lens group G2, both surfaces (an 11st surface and a 12th surface) of the seventh lens L7 of the second lens group G2, both surfaces (a 14th surface and a 15th surface) of the eighth lens L8 of the third lens group G3, both surfaces (a 19th surface and a 20th surface) of the 11st lens L11 of the third lens group G3, both surfaces (a 21st surface and a 22nd surface) of the 12th lens L12 of the fourth lens group G4, both surfaces (a 23rd surface and 24th surface) of the 13th lens L13 of the fifth lens group G5, and a surface (a 25 surface) on the object side of the 14th lens L14 of the fifth lens group G5 are formed as an aspherical surface. The fourth, sixth, eighth, and 10th order aspherical surface coefficients A4, A6, A8, and A10 along with the conic constants κ of the aspherical surfaces in the numerical example 7 are shown in Table 20.

TABLE 20

| | κ | A | B | C | D |
|---|---|---|---|---|---|
| s6 | 0.00000E+00 | −3.93629E−05 | 3.95479E−07 | −1.09912E−09 | 0.00000E+00 |
| s7 | 0.00000E+00 | −7.86178E−05 | −1.27061E−07 | −1.97636E−09 | 5.44302E−11 |
| s11 | 0.00000E+00 | 4.69636E−05 | −1.01321E−06 | 9.68569E−09 | 0.00000E+00 |
| s12 | 0.00000E+00 | 1.71182E−05 | −8.70926E−07 | 7.13914E−09 | 0.00000E+00 |
| s14 | 0.00000E+00 | −4.28289E−05 | −6.05947E−08 | −6.34692E−10 | −3.14342E−11 |
| s15 | 0.00000E+00 | −1.39722E−05 | 1.34774E−07 | −4.09781E−09 | −5.61077E−12 |
| s19 | 0.00000E+00 | −6.10744E−05 | 6.49748E−07 | −1.21690E−08 | 5.57526E−11 |
| s20 | 0.00000E+00 | 6.06683E−06 | 6.56512E−07 | −1.16512E−08 | 5.19636E−11 |
| s21 | 0.00000E+00 | 7.86577E−05 | −7.12349E−07 | 1.05051E−08 | −6.55397E−11 |
| s22 | 0.00000E+00 | 9.18156E−05 | −1.06249E−06 | 2.03069E−08 | −1.45685E−10 |
| s23 | 0.00000E+00 | 4.00117E−06 | −2.08628E−07 | 1.18572E−09 | −3.42647E−12 |
| s24 | 0.00000E+00 | 1.38672E−04 | −4.09166E−07 | 1.49433E−09 | −3.22392E−14 |
| s25 | 0.00000E+00 | −7.74228E−05 | 1.48954E−06 | −1.12176E−08 | 4.31348E−11 |

The focal lengths f, the open f-numbers Fno and the half angles of view ω and the variable distances of an entire lens system in the numerical example 7 are shown in Table 21.

TABLE 21

| SURFACE NUMBER | WIDE ANGLE END | INTERMEDIATE FOCAL LENGTH | TELEPHOTO END |
|---|---|---|---|
| f | 9.193 | 24.376 | 64.678 |
| Fno | 2.912 | 2.912 | 2.912 |
| ω | 40.990 | 16.779 | 6.465 |
| d5 | 1.920 | 18.225 | 39.492 |
| d12 | 25.033 | 9.558 | 4.784 |
| d20 | 2.974 | 6.090 | 4.759 |
| d22 | 6.789 | 17.332 | 29.926 |

Figure 26:
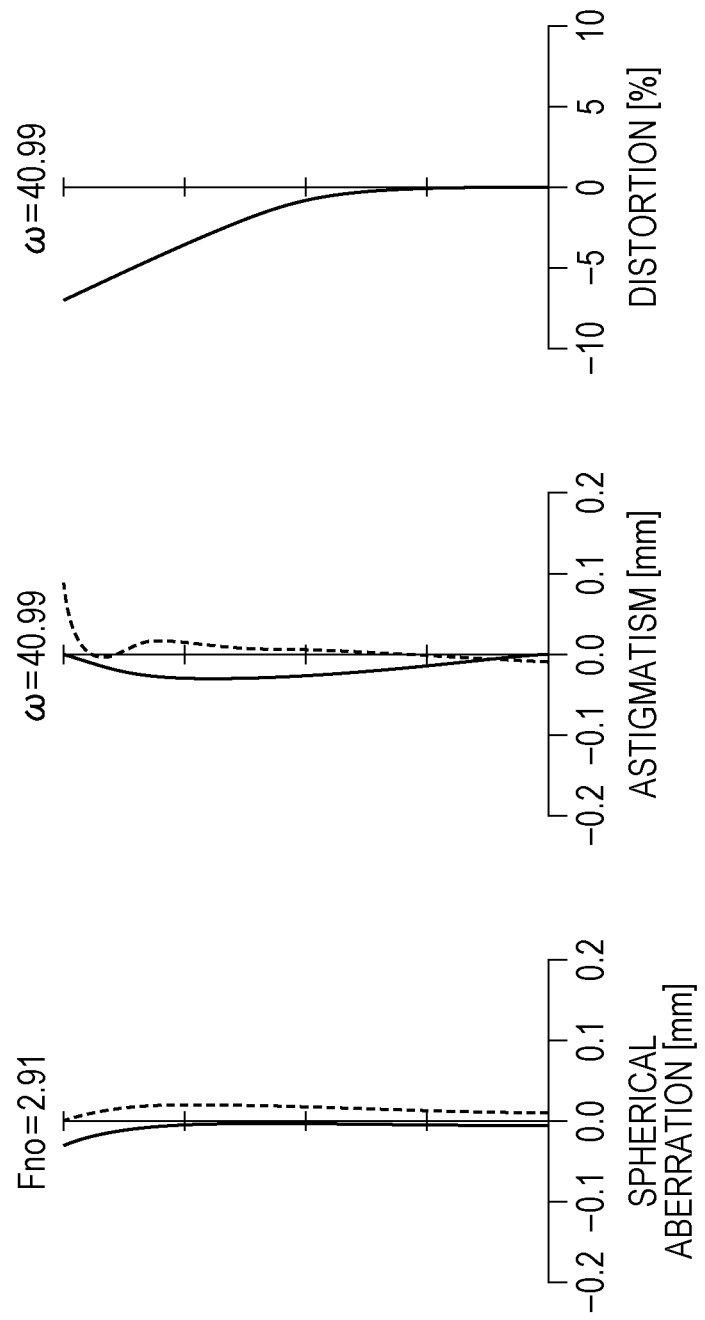
FIG. 26 is a diagram illustrating spherical aberration, astigmatism and distortion at a wide angle end in a numerical example obtained by applying specific numerical values to the seventh embodiment.
Figure 27:
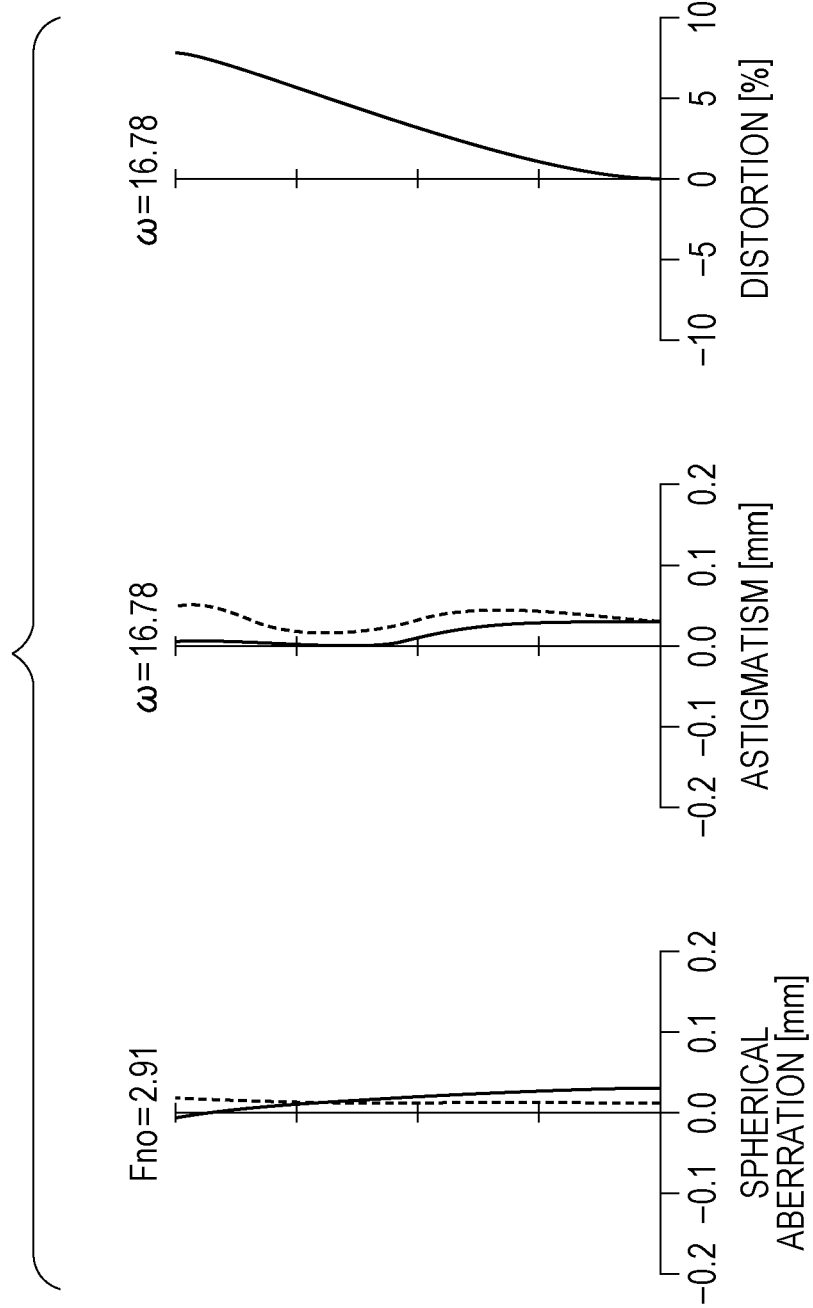
FIG. 27 is a diagram illustrating spherical aberration, astigmatism and distortion at an intermediate focal length in a numerical example obtained by applying specific numerical values to the seventh embodiment.
Figure 28:
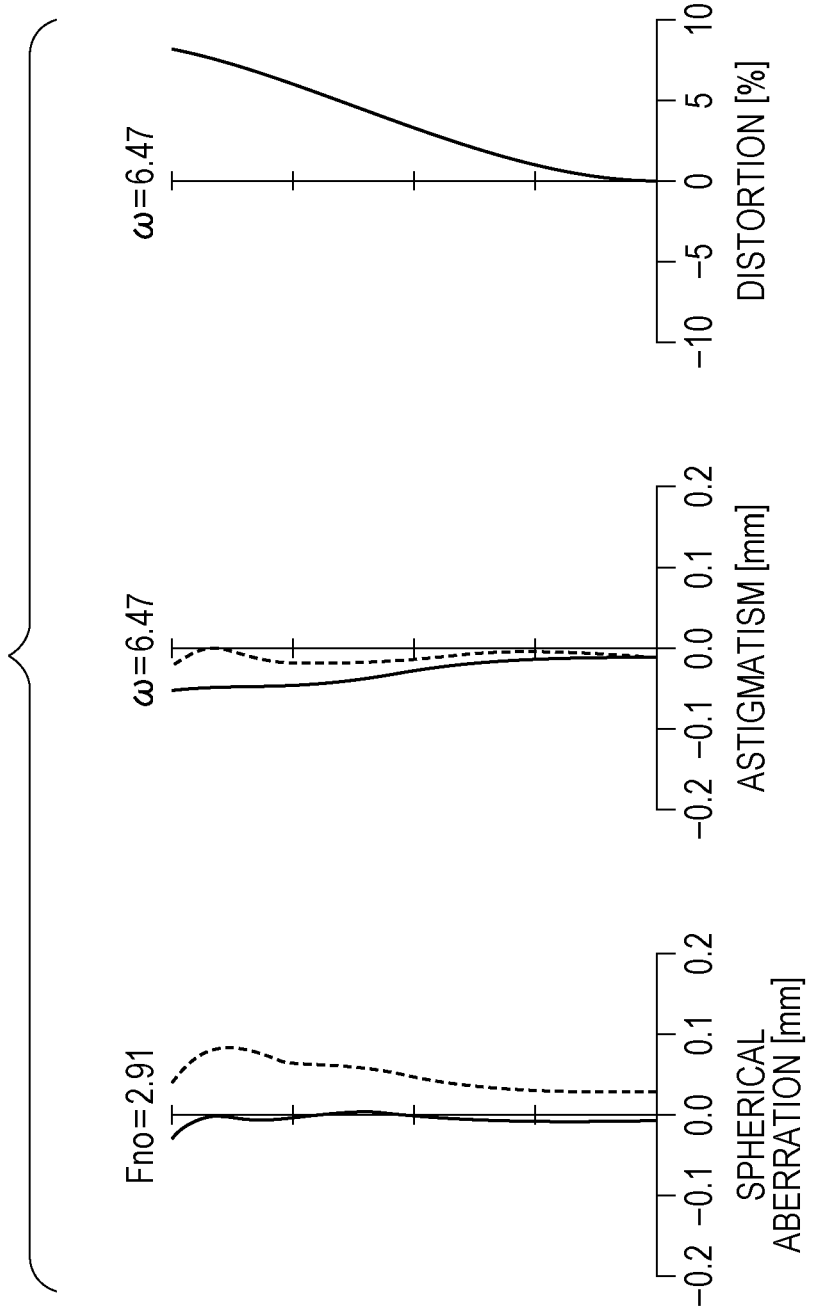
FIG. 28 is a diagram illustrating spherical aberration, astigmatism and distortion at a telephoto end in a numerical example obtained by applying specific numerical values to the seventh embodiment.

FIG. 26 illustrates spherical aberration, astigmatism and distortion at a wide angle end in the numerical example 7, FIG. 27 illustrates spherical aberration, astigmatism and distortion at an intermediate focal length in the numerical example 7, and FIG. 28 illustrates spherical aberration, astigmatism and distortion at a telephoto end in the numerical example 7.

In FIGS. 26 to 28, in the spherical aberration, a solid line represents a value of a d-line (587.56 nm) and a dashed line represents a value of a g-line (435.84 nm); in the astigmatism, a solid line represents a value of a sagittal image plane of a d-line and a dashed line represents a value of a meridional image plane of a d-line; and in the distortion, a solid line represents a value of the d-line.

From the aberration diagrams, in the numerical example 7, it is apparent that aberrations are well corrected and an excellent image forming performance is achieved, and high resolution performance is realized while securing miniaturization, a high zoom ratio and a large aperture ratio.

Eighth Embodiment

Figure 29:
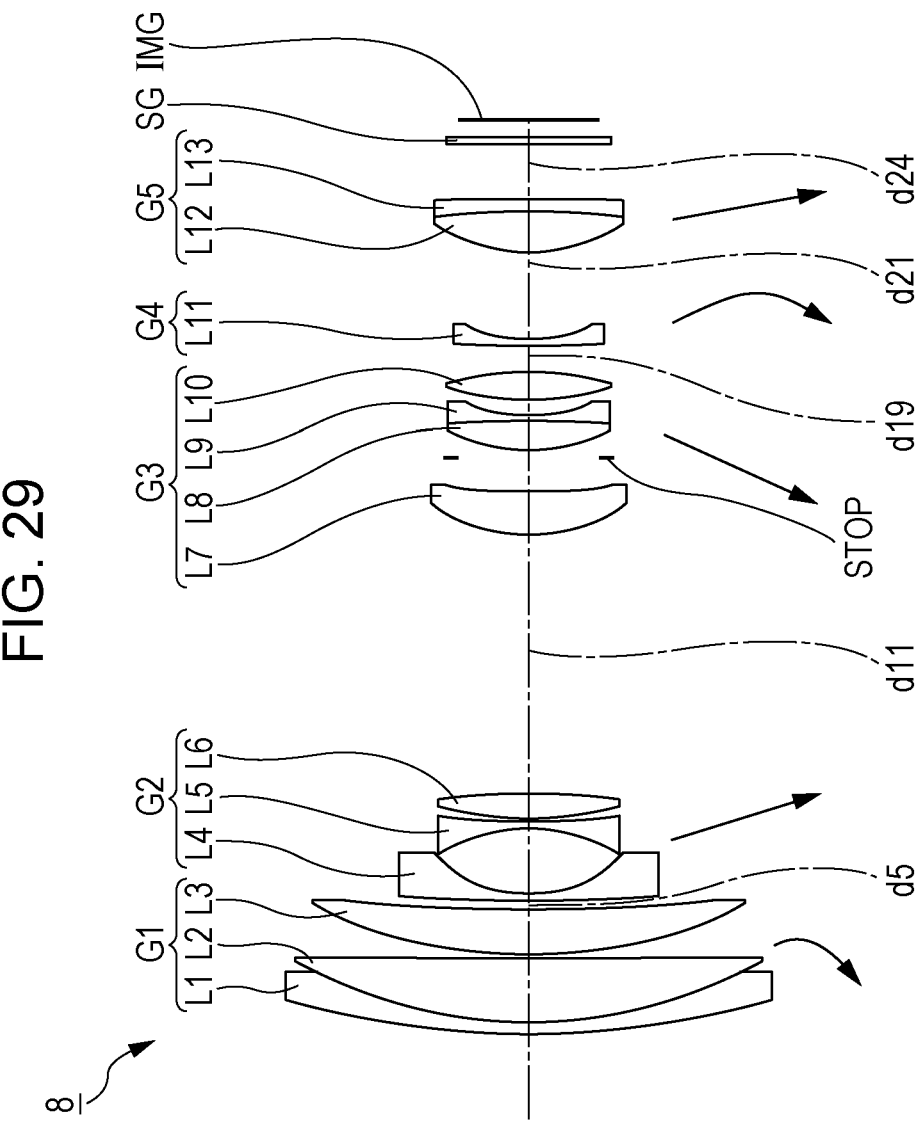
FIG. 29 is a diagram illustrating a lens configuration according to an eighth embodiment of a zoom lens.

FIG. 29 is a diagram illustrating a lens configuration of a zoom lens 8 according to an eighth embodiment of the present technology.

The zoom lens 8 has a zoom ratio of 8.8.

The zoom lens 8 has 13 lenses, and is configured with a first lens group G1 having positive refractive power, a second lens group G2 having negative refractive power, a third lens group G3 having positive refractive power, a fourth lens group G4 having negative refractive power, and a fifth lens group G5 having positive refractive power, which are arranged in order from an object side to an image side.

In the zoom lens 8, during zooming, the first lens group G1, the second lens group G2, the third lens group G3, the fourth lens group G4 and the fifth lens group G5 are moved in an optical axis direction. At the telephoto end rather than at the wide-angle end, the first lens group G1, the third lens group G3, the fourth lens group G4 are moved to be located on the object side, and the second lens group G2 and the fifth lens group G5 are moved to be located on the image side.

The zoom lens 8 is a focusing lens group which performs focusing from infinity to the close range by the fourth lens group G4 being moved in the optical axis direction during focusing.

The first lens group G1 is configured with a cemented lens formed by joining a first lens L1 having negative refractive power and a meniscus shape facing a convex surface toward the object side and a second lens L2 having positive refractive power and a bi-convex shape, and a third lens L3 having positive refractive power and a meniscus shape facing a convex surface toward the object side, which are arranged in order from the object side to the image side.

The second lens group G2 is configured with a fourth lens L4 having negative refractive power and a bi-concave shape, a fifth lens L5 having negative refractive power and a bi-concave shape and a sixth lens L6 having positive refractive power and a bi-convex shape, which are arranged in order from the object side to the image side.

The third lens group G3 is configured with a seventh lens L7 having positive refractive power and a convex surface facing the object side, a cemented lens formed by joining an eighth lens L8 having positive refractive power and a bi-convex shape and a ninth lens L9 having negative refractive power and a bi-concave shape, and a 10th lens L10 having positive refractive power and a bi-convex shape, which are arranged in order from the object side to the image side.

The fourth lens group G4 is configured with only an 11st lens L11 having negative refractive power and a concave surface facing the image side.

The fifth lens group G5 is configured with a cemented lens formed by joining a 12th lens L12 having positive refractive power and a bi-convex shape and a 13th lens L13 having negative refractive power and a bi-concave shape, and the 12th lens L12 is located on the object side and the 13th lens L13 is located on the image side.

An image plane IMG is disposed on an image side of the fifth lens group G5. A cover glass SG is disposed between the fifth lens group G5 and the image plane IMG.

A diaphragm STOP is disposed between the seventh lens L7 and the eighth lens L8 of the third lens group G3. During zooming, the diaphragm STOP is moved integrally with the third lens group G3 in the optical axis direction.

The 10th lens L10 which is located on the most image side of the third lens group is displaced in a direction perpendicular to the optical axis direction, and thus a vibration reduction function is realized.

Table 22 shows lens data of a numerical example 8 obtained by applying specific numerical values to the zoom lens 8 according to the eighth embodiment.

TABLE 22

| SURFACE NUMBER | R | D | Nd | ν d |
|---|---|---|---|---|
| 1 | 56.529 | 0.850 | 1.847 | 23.784 |
| 2 | 32.266 | 4.500 | 1.593 | 68.623 |
| 3 | −1007.545 | 0.150 | | |
| 4 | 33.944 | 3.100 | 1.697 | 55.459 |
| 5 | 128.124 | (d5) | | |
| 6(ASP) | −910.127 | 0.450 | 1.773 | 49.466 |
| 7(ASP) | 8.855 | 4.611 | | |
| 8 | −11.105 | 0.400 | 1.773 | 49.624 |
| 9 | 35.864 | 0.200 | | |
| 10(ASP) | 21.838 | 1.654 | 2.002 | 19.325 |
| 11(ASP) | −99.893 | (d11) | | |
| 12(ASP) | 12.403 | 2.869 | 1.755 | 51.157 |
| 13(ASP) | 208.668 | 2.377 | | |
| 14(STOP) | ∞ | 0.550 | | |

TABLE 22-continued

| SURFACE NUMBER | R | D | Nd | ν d |
|---|---|---|---|---|
| 15 | 12.817 | 1.763 | 1.593 | 67.001 |
| 16 | −140.019 | 0.500 | 1.847 | 23.784 |
| 17 | 11.192 | 1.072 | | |
| 18(ASP) | 16.618 | 1.868 | 1.697 | 55.460 |
| 19(ASP) | −21.055 | (d19) | | |
| 20(ASP) | 68.584 | 0.400 | 1.619 | 63.854 |
| 21(ASP) | 10.068 | (d21) | | |
| 22(ASP) | 11.473 | 2.800 | 1.773 | 49.466 |
| 23 | −47.395 | 0.500 | 1.689 | 31.160 |
| 24 | 64.974 | (d24) | | |
| 25 | ∞ | 0.360 | 1.5168 | 64.1664 |
| 26 | ∞ | 1.201 | | |
| IMG | ∞ | 0.000 | | |

In the zoom lens 8, both surfaces (a sixth surface and a seventh surface) of the fourth lens L4 of the second lens group G2, both surfaces (a 10th surface and a 11st surface) of the sixth lens L6 of the second lens group G2, both surfaces (a 12th surface and a 13th surface) of the seventh lens L7 of the third lens group G3, both surfaces (an 18th surface and a 19th surface) of the 10th lens L10 of the third lens group G3, both surfaces (a 20th surface and a 21st surface) of the 11st lens L11 of the fourth lens group G4, and a surface (a 22nd surface) on the object side of the 12th lens L12 of the fifth lens group G5 are formed as an aspherical surface. The fourth, sixth, eighth, and 10th order aspherical surface coefficients A4, A6, A8, and A10 along with the conic constants κ of the aspherical surfaces in the numerical example 8 are shown in Table 23.

TABLE 23

| SURFACE NUMBER | κ | A | B | C | D |
|---|---|---|---|---|---|
| s6 | 0.00000E+00 | 1.31720E−04 | −3.58986E−07 | −4.25154E−09 | 3.61951E−11 |
| s7 | 0.00000E+00 | 9.04639E−06 | 1.08332E−06 | 1.68947E−08 | 3.68270E−10 |
| s10 | 0.00000E+00 | −1.28009E−04 | −8.66879E−08 | 5.27771E−08 | −3.44400E−10 |
| s11 | 0.00000E+00 | −3.68314E−05 | −7.69376E−07 | 3.24911E−08 | 8.40437E−11 |
| s12 | 0.00000E+00 | 1.96332E−05 | 2.82183E−06 | −6.71605E−08 | 1.95263E−09 |
| s13 | 0.00000E+00 | 1.40120E−04 | 3.77813E−06 | −9.97989E−08 | 3.14055E−09 |
| s18 | 0.00000E+00 | −6.86610E−05 | −3.76811E−06 | 1.94270E−07 | −4.46588E−09 |
| s19 | 0.00000E+00 | 3.97903E−05 | −3.88602E−06 | 2.01417E−07 | −4.45917E−09 |
| s20 | 0.00000E+00 | 1.76562E−04 | −2.09807E−06 | −6.42928E−09 | −1.79151E−10 |
| s21 | 0.00000E+00 | 1.63020E−04 | −2.07256E−07 | −3.56053E−08 | −1.28926E−10 |
| s22 | 0.00000E+00 | −4.68034E−05 | 9.71811E−07 | −4.41989E−09 | −2.72247E−11 |

The focal lengths f, the open f-numbers Fno and the half angles of view ω and the variable distances of an entire lens system in the numerical example 8 are shown in Table 24.

TABLE 24

| SURFACE NUMBER | WIDE ANGLE END | INTERMEDIATE FOCAL LENGTH | TELEPHOTO END |
|---|---|---|---|
| f | 5.873 | 17.483 | 51.732 |
| Fno | 1.690 | 2.173 | 2.615 |
| ω | 39.733 | 14.415 | 4.884 |
| d5 | 0.500 | 12.275 | 23.634 |
| d11 | 17.778 | 5.314 | 0.600 |
| d19 | 1.750 | 7.910 | 8.134 |
| d21 | 5.944 | 4.500 | 9.414 |
| d24 | 4.084 | 3.718 | 2.600 |

Figure 30:
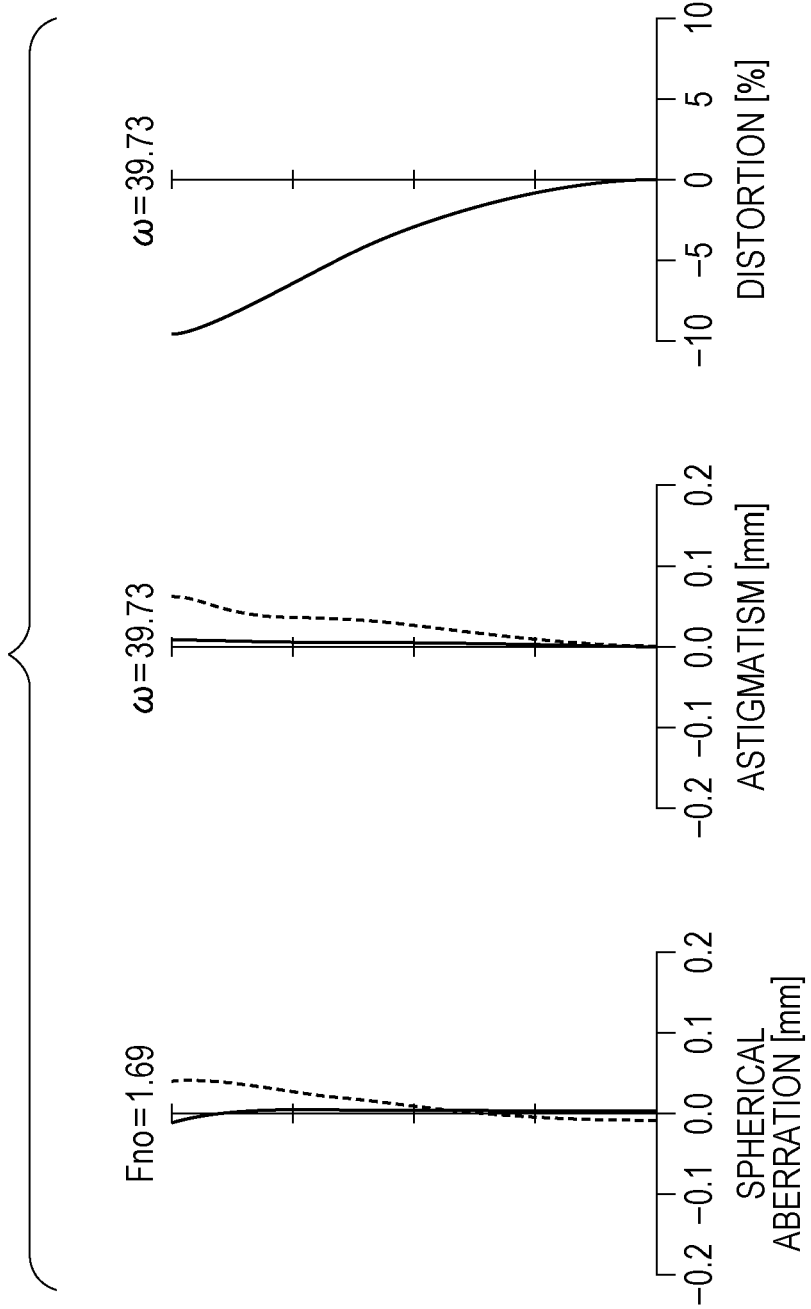
FIG. 30 is a diagram illustrating spherical aberration, astigmatism and distortion at a wide angle end in a numerical example obtained by applying specific numerical values to the eighth embodiment.
Figure 31:
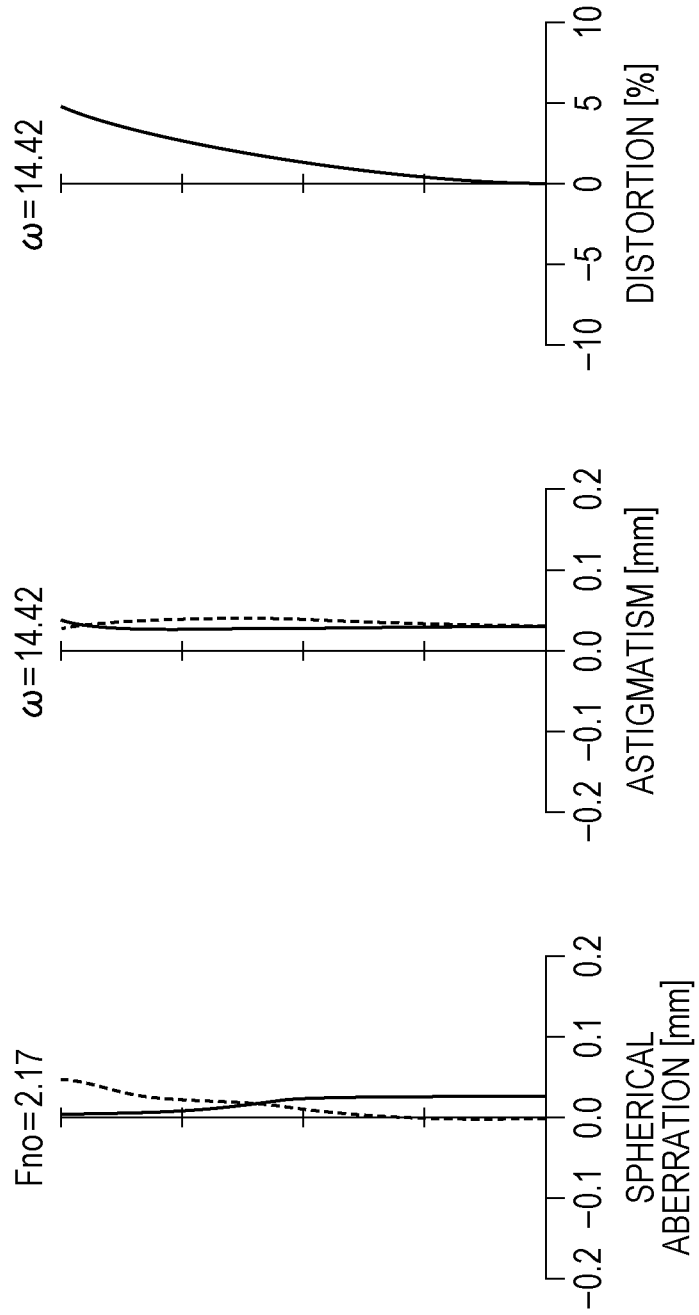
FIG. 31 is a diagram illustrating spherical aberration, astigmatism and distortion at an intermediate focal length in a numerical example obtained by applying specific numerical values to the eighth embodiment.
Figure 32:
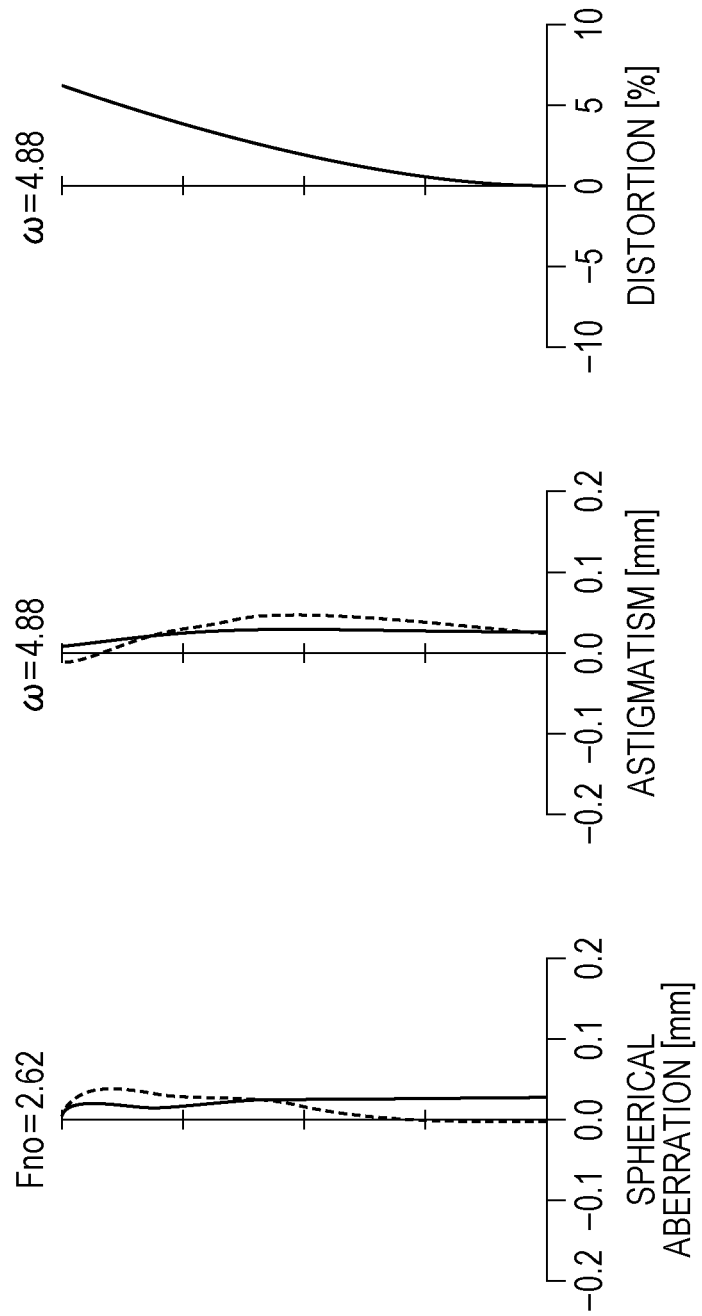
FIG. 32 is a diagram illustrating spherical aberration, astigmatism and distortion at a telephoto end in a numerical example obtained by applying specific numerical values to the eighth embodiment.

FIG. 30 illustrates spherical aberration, astigmatism and distortion at a wide angle end in the numerical example 8, FIG. 31 illustrates spherical aberration, astigmatism and distortion at an intermediate focal length in the numerical example 8, and FIG. 32 illustrates spherical aberration, astigmatism and distortion at a telephoto end in the numerical example 8.

In FIGS. 30 to 32, in the spherical aberration, a solid line represents a value of a d-line (587.56 nm) and a dashed line represents a value of a g-line (435.84 nm); in the astigmatism, a solid line represents a value of a sagittal image plane of a d-line and a dashed line represents a value of a meridional image plane of a d-line; and in the distortion, a solid line represents a value of the d-line.

From the aberration diagrams, in the numerical example 8, it is apparent that aberrations are satisfactorily corrected and an excellent image forming performance is achieved, and high resolution performance is realized while securing miniaturization, a high zoom ratio and a large aperture ratio.

SUMMARY OF EMBODIMENTS

With the above configurations, zoom ratios 7 times to 9 times or so are achieved in respective numerical examples 1 to 8, the open f-number at the wide-angle end is equal to or less than 2.0 in the numerical examples 1, 4, 5, and 8, and the open f-number at the telephoto end is equal to or less than 3.0 in the numerical examples 1, 2, 3, 5, 6, 7, and 8. Accordingly, in respective numerical examples 1 to 8, the reduction in the weight of the focus lens group and the shortening of the movement amount are realized while securing a high zoom ratio and a large aperture ratio.

Further, in all respective numerical examples 1 to 8, the spherical aberration and the astigmatism are corrected satisfactorily, and thus high resolution performance can be secured. Further, a slight correction remainder of distortion is seen in respective drawings, but this is because an electronic correction is assumed. In this manner, it is possible to enhance, in particular, refractive power of the second lens group G2 and to miniaturize the optical system, by allowing the correction remainder of the distortion.

Further, in all respective numerical examples 1 to 8, the shortening of stroke during focusing and the high resolution performance in a close range are achieved by appropriately setting the ratio of the lateral magnification of the fourth lens group G4 and the fifth lens group G5 to the refractive power of the fourth lens group G4 and the fifth lens group G5.

Further, in respective numerical examples 1 to 8 described above, a vibration reduction function is realized by displacing the entirety or a part of the third lens group G3 in the direction perpendicular to the optical axis direction, but for example, the vibration reduction function may be realized by displacing the entirety or a part of the second lens group G2, the fourth lens group G4, or the fifth lens group G5 in the direction perpendicular to the optical axis direction.

Respective Values of Conditional Expressions of Zoom Lens

In the following description, respective values of the conditional expressions of the zoom lens according to the present technology will be described.

Table 25 represents respective values of the conditional expression (1), the conditional expression (2), the conditional expression (3), the conditional expression (4) and the conditional expression (5) in the numerical example 1 to the numerical example 8 of the zoom lens 1 to the zoom lens 8.

TABLE 25

|  |  | EXAMPLE 1 | EXAMPLE 2 | EXAMPLE 3 | EXAMPLE 4 |
|---|---|---|---|---|---|
|  | Fno_w | 1.817 | 2.921 | 2.876 | 1.849 |
|  | Y | 4.988 | 8.0,91 | 8.091 | 4.973 |
|  | β 4_w | 1.918 | 2.005 | 2.015 | 1.754 |
|  | β 5_w | 0.563 | 0.600 | 0.573 | 0.636 |
| Conditional Expression (1) | $Fno\_w \times Y/[(1 - \beta 4\_w^2) \times \beta 5\_w^2]$ | −10.677 | −21.760 | −23.127 | −10.957 |
|  | Fno_t | 2.837 | 2.894 | 2.955 | 3.558 |
|  | β 4_t | 1.850 | 2.734 | 2.453 | 1.839 |
|  | β 5_t | 0.647 | 0.599 | 0.661 | 0.636 |
| Conditional Expression (2) | $Fno\_t \times Y/[(1 - \beta 4\_t^2) \times \beta 5\_t^2]$ | −13.937 | −10.086 | −10.915 | −18.351 |
|  | f4 | −19.868 | −26.232 | −29.159 | −20.230 |
|  | f5 | 16.611 | 27.208 | 29.137 | 18.477 |
| Correctional Expression (3) | f4/f5 | −1.196 | −0.964 | −1.001 | −1.095 |
|  | f_w | 5.853 | 9.255 | 9.255 | 5.781 |
|  | f_t | 51.770 | 66.298 | 66.297 | 41.250 |
|  | t4 | 0.350 | 0.950 | 0.950 | 0.450 |
| Conditional Expression (4) | $t4/(f\_w \times f\_t)^{1/2}$ | 0.020 | 0.038 | 0.038 | 0.029 |
| Conditional Expression (5) | (Fno_w + Fno_t)/2 | 2.327 | 2.907 | 2.916 | 2.704 |
|  |  | EXAMPLE 5 | EXAMPLE 6 | EXAMPLE 7 | EXAMPLE 8 |
|  | Fno_w | 1.702 | 2.912 | 2.912 | 1.690 |
|  | Y | 4.878 | 8.157 | 7.989 | 4.881 |
|  | β 4_w | 1.990 | 2.107 | 2.062 | 2.029 |
|  | β 5_w | 0.542 | 0.566 | 0.570 | 0.544 |
| Conditional Expression (1) | $Fno\_w \times Y/[(1 - \beta 4\_w^2) \times \beta 5\_w^2]$ | −9.530 | −21.596 | −22.014 | −8.944 |
|  | Fno_t | 2.638 | 2.913 | 2.912 | 2.615 |
|  | β 4_t | 1.946 | 3.049 | 2.955 | 1.988 |
|  | β 5_t | 0.628 | 0.566 | 0.570 | 0.631 |

TABLE 25-continued

| | | | | | |
|---|---|---|---|---|---|
| Conditional Expression (2) | Fno_t × Y/[(1 − $\beta 4\_t^2$) × $\beta 5\_t^2$] | −11.706 | −8.932 | −9.259 | −10.860 |
| | f4 | −19.535 | −26.613 | −25.904 | −19.120 |
| | f5 | 16.281 | 27.400 | 26.167 | 16.765 |
| Conditional Expression (3) | f4/f5 | −1.200 | −0.971 | −0.990 | −1.140 |
| | f_w | 5.866 | 9.290 | 9.193 | 5.873 |
| | f_t | 51.770 | 68.274 | 64.678 | 51.732 |
| | t4 | 0.350 | 1.000 | 0.820 | 0.040 |
| Conditional Expression (4) | t4/(f_w × f_t)$^{1/2}$ | 0.020 | 0.400 | 0.034 | 0.023 |
| Conditional Expression (5) | (Fno_w + Fno_t)/2 | 2.170 | 2.913 | 2.912 | 2.152 |

As is apparent from Table 25, the zoom lens 1 to zoom lens 8 are configured to satisfy the conditional expression (1), the conditional expression (2), the conditional expression (3), the conditional expression (4) and the conditional expression (5).

Configuration of Imaging Apparatus

An imaging apparatus according to the present technology includes a zoom lens which is configured with a first lens group having positive refractive power, a second lens group having negative refractive power, a third lens group having positive refractive power, a fourth lens group which has negative refractive power and is configured with only a single lens, and a fifth lens group having positive refractive power, which are arranged in order from an object side to an image side.

Further, in the imaging apparatus according to the present technology, in the zoom lens, during zooming, at least the first lens group, the second lens group, the third lens group and the fourth lens group are movable in the optical axis direction, and focusing from infinity to a close range is performed by the fourth lens group being moved in the optical axis direction.

In this manner, in the imaging apparatus according to the present technology, during focusing, the entire lens system is not moved in the optical axis direction and the fourth lens group configured with only a single lens having negative refractive power is moved in the optical axis direction. Accordingly, the weight of the focus lens group is reduced and an actuator for moving the focus lens group is miniaturized, such that it is possible to perform high speed focusing and to reduce the size.

Since the fourth lens group having negative refractive power is smaller in the effective beam diameter than the fifth lens group, it is possible to reduce the weight of the lens and to reduce the size using a lens group that is most suitable for the focusing lens group, by configuring the fourth lens group only with a single lens.

Further, in the imaging apparatus according to the present technology, the zoom lens satisfies at least one of the following conditional expression (1) and the conditional expression (2):

$$-11.0 < \text{Fno}\_w \times Y/\{(1-\beta 4\_w^2) \times \beta 5\_w^2\} < -7.0 \text{ and} \quad (1)$$

$$-11.0 < \text{Fno}\_t \times Y/\{(1-\beta 4\_t^2) \times \beta 5\_t^2\} < -7.0 \quad (2)$$

Where,

Fno_w: an open f-number at a wide-angle end

Fno_t: an open f-number at a telephoto end

Y: a paraxial image height at the wide-angle end represented by fw×tan ω, when fw and ω respectively represent a focal length and a half angle of view of an entire system at the wide-angle end, $\beta 4\_w$: a lateral magnification of the fourth lens group at the wide-angle end, $\beta 4\_t$: a lateral magnification of the fourth lens group at the telephoto end, $\beta 5\_w$: a lateral magnification of the fifth lens group at the wide-angle end, and $\beta 5\_t$: a lateral magnification of the fifth lens group at the telephoto end.

The conditional expression (1) and the conditional expression (2) are equations respectively defining the movement amount of the focus lens group necessary for moving the focus positions at the wide-angle end and at the telephoto end by a certain depth of focus.

In the conditional expressions, each of $\{(1-\beta 4\_w^2) \times \beta 5\_w^2\}$ and $\{(1-\beta 4\_t^2) \times \beta 5\_t^2\}$ represents a focus sensitivity of the focus lens group (a focal movement amount relative to the movement of the focus lens group), and the open f-number and the paraxial image height are factors for determining the depth of focus.

Since the fourth lens group which is the focus lens group has negative refractive power, the focus sensitivity becomes negative, so that the numerical range in the conditional expression (1) and the conditional expression (2) has a negative value.

Since the movement amount of the focus lens group for moving the focus position by a certain depth of focus is reduced by increasing the numerical values in the conditional expression (1) or the conditional expression (2) to be close to 0 (absolute value decreases), it is possible to reduce the movement amount of the entire focus lens group.

In a case where the numerical values in the conditional expression (1) and the conditional expression (2) are respectively below lower limits, the focus sensitivity of the fourth lens group is reduced, which results in an increase in the focus stroke, the size of a focusing unit, and the focusing time.

In contrast, in a case where the numerical values in the conditional expression (1) and the conditional expression (2) respectively exceed upper limits, the movement amount of the focus lens group can be reduced, but it is not desirable because the accuracy of the stop position necessary for the focus lens group is excessively high, an accurate auto-focusing is difficult, and thus an image quality is degraded.

Further, since the operation amplitude is excessively reduced during a wobbling operation used in a moving picture, it is difficult to perform the wobbling operation.

Moreover, the focus movement amount at the wide-angle end becomes a state of being reduced optimally if the conditional expression (1) is satisfied and the focus movement amount at the telephoto end becomes a state of being reduced optimally if the conditional expression (2) is satisfied. When a conditional expression having a larger value (the absolute value is small) between the numerical values of the conditional expression (1) and the conditional expression (2) satisfies a conditional range, it can be said that the focus stroke can be reduced optimally while securing the stop position accuracy during focusing in the entire zooming range.

In addition, which one of the conditional expression (1) and the conditional expression (2) is satisfied or whether both of them are satisfied significantly depends on the setting of the open f-number at the wide-angle end and the telephoto end.

From the above description, it is most desirable to satisfy at least one of the conditional expression (1) and the conditional expression (2) in terms of the focus sensitivity of the focus lens group in order to shorten the focus stroke.

As described above, in the imaging apparatus according to the present technology, the zoom lens includes a first lens group having positive refractive power, a second lens group having negative refractive power, a third lens group having positive refractive power, a fourth lens group which has negative refractive power and is configured with only a single lens, and a fifth lens group having positive refractive power, which are arranged in order from an object side to an image side. Further, during zooming, at least the first lens group, the second lens group, the third lens group, and the fourth lens group are movable in an optical axis direction, focusing from infinity to a close range is performed by the fourth lens group being moved in the optical axis direction, and at least one of following conditional expressions (1) and (2) is satisfied.

Therefore, it is possible to miniaturize a focus lens group, to shorten a focus stroke, and to reduce performance degradation in a close range, while securing miniaturization, a high zoom ratio and a large aperture ratio.

Further, it is desirable that the conditional expression (1) and the conditional expression (2) be respectively set as the following conditional expressions $$-11.0 < Fno\_w \times Y/\{(1-\beta 4\_w^2) \times \beta 5\_w^2\} < -8.5 \text{ and} \quad (1)$$

$$-11.0 < Fno\_t \times Y/\{(1-\beta 4\_t^2) \times \beta 5\_t^2\} < -8.5 \quad (2)$$

If the zoom lens satisfies the conditional expression (1)' and the conditional expression (2)', it is possible further to miniaturize a focus lens group, to shorten a focus stroke and to reduce performance degradation in a close range, while further securing miniaturization, a high zoom ratio and a large aperture ratio.

Embodiment of Imaging Apparatus

Figure 33:
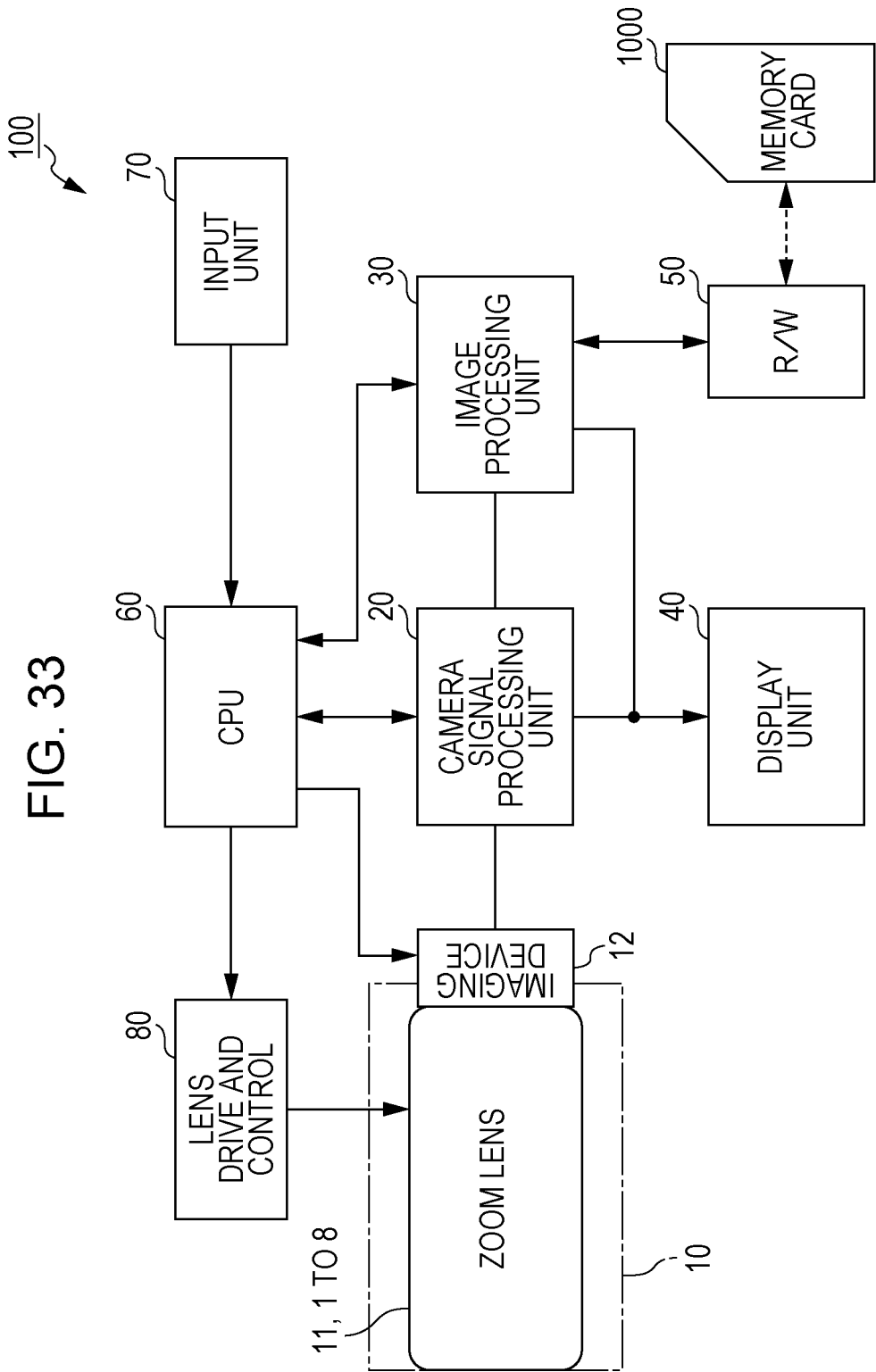
FIG. 33 is a block diagram illustrating an example of an imaging apparatus.

FIG. 33 illustrates a block diagram of a digital still camera of an interchangeable lens type according to an embodiment of an imaging apparatus according to the present technology.

The imaging apparatus (digital still camera) 100 includes a camera block 10 having an imaging function, a camera signal processing unit 20 that performs a signal process during an analog-to-digital conversion of a captured image signal, and an image processing unit 30 that performs a recording and reproducing process of the image signal. Further, the imaging apparatus 100 includes a display unit 40 such as a Liquid Crystal Display (LCD) displaying the captured image and the like, a reader/writer (R/W) 50 that performs a writing and a reading of the image signal to a memory card 1000, a Central Processing Unit (CPU) 60 that controls the entire imaging apparatus 100, an input unit 70 configured with various switches and the like by which a user performs desired operations, and a lens drive and control unit 80 that controls the driving of the lens disposed in the camera block 10.

The camera block 10 is configured with an optical system including a zoom lens 11 (the zoom lens 1 to the zoom lens 8 to which the present technology is applied) and an imaging device 12 such as a Charge Coupled Device (CCD) and a Complementary Metal Oxide Semiconductor (CMOS).

The camera signal processing unit 20 performs various signal processes such as a conversion into a digital signal, noise removal, image quality correction, and conversion into a luminance and color difference signal, with respect to an output signal from the imaging device 12.

The image processing unit 30 performs a compression coding process and a decompression decoding process of the image signal based on a predetermined image data format, and a conversion process of a data specification such as a resolution.

The display unit 40 has a function of displaying various pieces of data such as an operation state by the user for the input unit 70 and a captured image.

The R/W 50 performs a writing of image data subjected to the encoding by the image processing unit 30 to the memory card 1000 and a reading of the image data recorded in the memory card 1000.

The CPU 60 functions as a control processing unit that controls respective circuit blocks provided in the imaging apparatus 100, and controls respective circuit blocks based on an instruction input signal and the like from the input unit 70.

For example, the input unit 70 is configured with a shutter release button for performing a shutter operation, a selection switch for selecting an operation mode, and the like, and outputs an instruction input signal in response to a user's operation to the CPU 60.

The lens drive and control unit 80 controls motors, not shown, or the like that drives respective lenses of the zoom lens 11 based on a control signal from the CPU 60.

For example, the memory card 1000 is a semiconductor memory which is removable to a slot connected to the R/W 50.

Below, the operation of the imaging device 100 will be described.

In a standby state of photographing, under the control of the CPU 60, the image signal captured in the camera block 10 is output to the display unit 40 through the camera signal processing unit 20, and is displayed as a camera through image. Further, when an instruction input signal for zooming from the input unit 70 is input, the CPU 60 outputs a control signal to the lens drive and control unit 80 so as to cause a predetermined lens of the zoom lens 11 to be moved under the control of the lens drive and control unit 80.

If a shutter, not shown, of the camera block 10 is operated according to an instruction input signal from the input unit 70, the captured image signal is output to the image processing unit 30 from the camera signal processing unit 20, and the compression encoding process is performed and the image signal is converted into digital data of a predetermined data format. The converted data is output to the R/W 50, and written to the memory card 1000.

For example, in a case where the shutter release button of the input unit 70 is pressed halfway or is fully pressed for the recording (shooting) or the like, the focusing is performed by the lens drive and control unit 80 moving a predetermined lens of the zoom lens 11 based on a control signal from the CPU 60.

In a case of reproducing the image data recorded on the memory card 1000, predetermined image data is read from the memory card 1000 by the R/W 50 in response to an operation for the input unit 70, the decompression decoding process is performed by the image processing unit 30, and a reproduced image signal is output to the display unit 40 and then a reproduced image is displayed.

Other

In the zoom lens according to the present technology and the imaging apparatus according to the present technology, other optical elements such as lenses having no refractive power may be arranged in addition to the first lens group G1 to the fifth lens group G5. In this case, the lens configuration of the zoom lens according to the present technology has a substantially five-group lens configuration of the first lens group G1 to the fifth lens group G5.

Present Technology

The present technology may be configured as follows:

<1> A zoom lens including: a first lens group having positive refractive power; a second lens group having negative refractive power; a third lens group having positive refractive power; a fourth lens group which has negative refractive power and is configured with only a single lens; and a fifth lens group having positive refractive power, which are arranged in order from an object side to an image side, wherein during zooming, at least the first lens group, the second lens group, the third lens group, and the fourth lens group are movable in an optical axis direction, wherein focusing from infinity to a close range is performed by the fourth lens group being moved in the optical axis direction, and wherein at least one of following conditional expressions (1) and (2) is satisfied.

$$-11.0 < Fno\_w \times Y/\{(1-\beta4\_w^2) \times \beta5\_w^2\} < -7.0 \text{ and} \quad (1)$$

$$-11.0 < Fno\_t \times Y/\{(1-\beta4\_t^2) \times \beta5\_t^2\} < -7.0 \quad (2)$$

where

Fno_w: an open f-number at a wide-angle end

Fno_t: an open f-number at a telephoto end

Y: a paraxial image height at the wide-angle end represented by fw×tan ω, when fw and ω respectively represent a focal length and a half angle of view of an entire system at the wide-angle end, β4_w: a lateral magnification of the fourth lens group at the wide-angle end, β4_t: a lateral magnification of the fourth lens group at the telephoto end, β5_w: a lateral magnification of the fifth lens group at the wide-angle end, and β5_t: a lateral magnification of the fifth lens group at the telephoto end.

<2> The zoom lens according to <1>, wherein during zooming from the wide-angle end to the telephoto end, the first lens group is moved so as to widen a distance to the second lens group and the third lens group is moved so as to narrow a distance to the second lens group, and wherein the first lens group and the third lens group are respectively positioned on the object side at the telephoto end rather than at the wide-angle end.

<3> The zoom lens according to <1> or <2>, wherein an aspherical shape of at least one surface is formed in each of the second lens group, the third lens group and the fourth lens group.

<4> The zoom lens according to any one of <1> to <3>, wherein a following conditional expression (3) is satisfied.

$$-1.3 < f4/f5 < -0.9 \quad (3)$$

where f4: a focal length of the fourth lens group, and f5: a focal length of the fifth lens group <5> The zoom lens according to any one of <1> to <4>, wherein a following conditional expression (4) is satisfied.

$$0.01 < t4/(f\_w \times f\_t)^{1/2} < 0.045 \quad (4)$$

where t4: a center thickness of the fourth lens group, f_w: a focal length of an entire system at the wide-angle end, and f_t: a focal length of an entire system at the telephoto end <6> The zoom lens according to any one of <1> to <5>, wherein the third lens group is configured with a single lens having positive refractive power, a cemented lens which is configured with a positive lens and a negative lens and has negative refractive power, and a single lens having positive refractive power, which are arranged in order from an object side to an image side.

<7> The zoom lens according to any one of <1> to <6>, wherein a following conditional expression (5) is satisfied.

$$(Fno\_w + Fno\_t)/2 < 3.0 \quad (5)$$

<8> The zoom lens according to <6>, wherein the zoom lens has a vibration reduction function by the single lens positioned closest to the image side of the third lens group being displaced in a direction perpendicular to the optical axis, and wherein at least one surface of the single lens positioned closest to the image side is formed as an aspherical surface.

<9> The zoom lens according to any one of <1> to <8>, wherein the fifth lens group is fixed in the optical axis direction and configured with two lenses of at least a positive lens and a negative lens.

<10> The zoom lens according to any one of <1> to <8>, wherein the fifth lens group is movable in the optical axis direction.

<11> The zoom lens according to any one of <1> to <10>, wherein the fourth lens group is moved in the optical axis direction by a driving force of a piezo element.

<12> An imaging apparatus including: a zoom lens; and an imaging device that converts an optical image formed by the zoom lens into an electrical signal, wherein the zoom lens includes a first lens group having positive refractive power; a second lens group having negative refractive power; a third lens group having positive refractive power; a fourth lens group which has negative refractive power and is configured with only a single lens; and a fifth lens group having positive refractive power, which are arranged in order from an object side to an image side, wherein during zooming, at least the first lens group, the second lens group, the third lens group, and the fourth lens group are movable in an optical axis direction, wherein focusing from infinity to a close range is performed by the fourth lens group being moved in the optical axis direction, and wherein at least one of following conditional expressions (1) and (2) is satisfied.

$$-11.0 < Fno\_w \times Y/\{(1-\beta4\_w^2) \times \beta5\_w^2\} < -7.0 \text{ and} \quad (1)$$

$$-11.0 < Fno\_t \times Y/\{(1-\beta4\_t^2) \times \beta5\_t^2\} < -7.0 \quad (2)$$

where

Fno_w: an open f-number at a wide-angle end

Fno_t: an open f-number at a telephoto end

Y: a paraxial image height at the wide-angle end represented by fw×tan ω, when fw and ω respectively represent a focal length and a half angle of view of an entire system at the wide-angle end, β4_w: a lateral magnification of the fourth lens group at the wide-angle end, β4_t: a lateral magnification of the fourth lens group at the telephoto end, β5_w: a lateral magnification of the fifth lens group at the wide-angle end, and β5_t: a lateral magnification of the fifth lens group at the telephoto end.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
a first lens group having positive refractive power;
a second lens group having negative refractive power;
a third lens group having positive refractive power;
a fourth lens group which has negative refractive power and is configured with only a single lens; and
a fifth lens group having positive refractive power,
wherein the first lens group, the second lens group, the third lens group, the fourth lens group, and the fifth lens group are arranged in order from an object side to an image side,
wherein during zooming, at least the first lens group, the second lens group, the third lens group, and the fourth lens group are movable in an optical axis direction,
wherein focusing from infinity to a close range is performed by the fourth lens group being moved in the optical axis direction, and
wherein at least one of following conditional expressions (1) and (2) is satisfied:

$$-11.0 < Fno\_w \times Y/\{(1-\beta4\_w^2) \times \beta5\_w^2\} < -7.0 \text{ and} \quad (1)$$

$$-11.0 < Fno\_t \times Y/\{(1-\beta4\_t^2) \times \beta5\_t^2\} < -7.0 \quad (2)$$

where

Fno_w: an open f-number at a wide-angle end,

Fno_t: an open f-number at a telephoto end,

Y: a paraxial image height at the wide-angle end represented by fw×tan ω, when fw and ω respectively represent a focal length and a half angle of view of an entire system at the wide-angle end, β4_w: a lateral magnification of the fourth lens group at the wide-angle end, β4_t: a lateral magnification of the fourth lens group at the telephoto end, β5_w: a lateral magnification of the fifth lens group at the wide-angle end, and β5_t: a lateral magnification of the fifth lens group at the telephoto end.

2. The zoom lens according to claim 1,
wherein during zooming from the wide-angle end to the telephoto end, the first lens group is moved so as to widen a distance to the second lens group and the third lens group is moved so as to narrow a distance to the second lens group, and
wherein the first lens group and the third lens group are respectively positioned on the object side at the telephoto end rather than at the wide-angle end.

3. The zoom lens according to claim 1,
wherein an aspherical shape of at least one surface is formed in each of the second lens group, the third lens group and the fourth lens group.

4. The zoom lens according to claim 1,
wherein a following conditional expression (3) is satisfied:

$$-1.3 < f4/f5 < -0.9 \quad (3)$$

where f4: a focal length of the fourth lens group, and f5: a focal length of the fifth lens group.

5. The zoom lens according to claim 1,
wherein a following conditional expression (4) is satisfied:

$$0.01 < t4/(f\_w \times f\_t)^{1/2} < 0.045 \quad (4)$$

where t4: a center thickness of the fourth lens group, f_w: a focal length of an entire system at the wide-angle end, and f_t: a focal length of an entire system at the telephoto end.

6. The zoom lens according to claim 1,
wherein the third lens group is configured with a single lens having positive refractive power, a cemented lens which is configured with a positive lens and a negative lens and has negative refractive power, and a single lens having positive refractive power, which are arranged in order from an object side to an image side.

7. The zoom lens according to claim 1,
wherein a following conditional expression (5) is satisfied:

$$(Fno\_w + Fno\_t)/2 < 3.0. \quad (5)$$

8. The zoom lens according to claim 6,
wherein the zoom lens has a vibration reduction function by the single lens positioned closest to the image side of the third lens group being displaced in a direction perpendicular to the optical axis, and
wherein at least one surface of the single lens positioned closest to the image side is formed as an aspherical surface.

9. The zoom lens according to claim 1,
wherein the fifth lens group is fixed in the optical axis direction and configured with two lenses of at least a positive lens and a negative lens.

10. The zoom lens according to claim 1,
wherein the fifth lens group is movable in the optical axis direction.

11. The zoom lens according to claim 1,
wherein the fourth lens group is moved in the optical axis direction by a driving force of a piezo element.

12. An imaging apparatus comprising:
a zoom lens; and
an imaging device that converts an optical image formed by the zoom lens into an electrical signal,
wherein the zoom lens includes a first lens group having positive refractive power; a second lens group having negative refractive power; a third lens group having positive refractive power; a fourth lens group which has negative refractive power and is configured with only a single lens; and a fifth lens group having positive refractive power, wherein the first lens group, the second lens group, the third lens group, the fourth lens group, and the fifth lens group are arranged in order from an object side to an image side,
wherein during zooming, at least the first lens group, the second lens group, the third lens group, and the fourth lens group are movable in an optical axis direction,
wherein focusing from infinity to a close range is performed by the fourth lens group being moved in the optical axis direction, and
wherein at least one of following conditional expressions (1) and (2) is satisfied:

$$-11.0 < Fno\_w \times Y/\{(1-\beta4\_w^2) \times \beta5\_w^2\} < -7.0 \text{ and} \quad (1)$$

$$-11.0 < Fno\_t \times Y/\{(1-\beta4\_t^2) \times \beta5\_t^2\} < -7.0 \quad (2)$$

where

Fno_w: an open f-number at a wide-angle end,

Fno_t: an open f-number at a telephoto end,

Y: a paraxial image height at the wide-angle end represented by fw×tan ω, when fw and ω respectively represent a focal length and a half angle of view of an entire system at the wide-angle end, $β4\_w$: a lateral magnification of the fourth lens group at the wide-angle end, $β4\_t$: a lateral magnification of the fourth lens group at the telephoto end, $β5\_w$: a lateral magnification of the fifth lens group at the wide-angle end, and $β5\_t$: a lateral magnification of the fifth lens group at the telephoto end.

* * * * *